(12) United States Patent
Vaniotis et al.

(10) Patent No.: US 12,731,185 B1
(45) Date of Patent: Sep. 8, 2026

(54) SYSTEMS, METHODS, AND PROGRAM PRODUCTS FOR PROVIDING INTEREST ON DIGITAL ASSETS ON A DIGITAL ASSET EXCHANGE

(71) Applicant: Gemini IP, LLC, New York, NY (US)

(72) Inventors: Thomas Vaniotis, New York, NY (US); Brian Keogh, Rye, NY (US); Noah Cornwell, Berkeley Heights, NJ (US); Neeraj Mishra, Mountain Lakes, NJ (US); Ira Auerbach, Arverne, NY (US); Jack Sutton, New Canaan, CT (US)

(73) Assignee: Gemini IP, LLC, New York, NY (US)

( * ) Notice: Subject to any disclaimer, the term of this patent is extended or adjusted under 35 U.S.C. 154(b) by 300 days.

(21) Appl. No.: 18/096,722

(22) Filed: Jan. 13, 2023

Related U.S. Application Data

(60) Provisional application No. 63/299,819, filed on Jan. 14, 2022.

(51) Int. Cl.
*G06Q 40/04* (2012.01)
*G06Q 40/02* (2023.01)
*H04L 9/00* (2022.01)

(52) U.S. Cl.
CPC ............. *G06Q 40/04* (2013.01); *G06Q 40/02* (2013.01); *G06Q 40/055* (2025.08); *H04L 9/50* (2022.05); *G06Q 2220/00* (2013.01)

(58) Field of Classification Search
CPC .... G06Q 40/04; G06Q 40/02; G06Q 2220/00; G06Q 40/055; H04L 9/50
See application file for complete search history.

(56) References Cited

U.S. PATENT DOCUMENTS

| | | | | |
|---|---|---|---|---|
| 10,929,842 | B1 * | 2/2021 | Arvanaghi | H04L 9/3239 |
| 11,501,370 | B1 * | 11/2022 | Paya | G06Q 20/3676 |
| 12,099,997 | B1 * | 9/2024 | Hoffberg | G06Q 20/065 |
| 2011/0208640 | A1 * | 8/2011 | Geoghegan | G06Q 20/10 705/39 |
| 2016/0275620 | A1 * | 9/2016 | Hernandez | G06Q 40/04 |
| 2019/0333030 | A1 * | 10/2019 | Ramasamy | G06Q 20/3674 |
| 2020/0134143 | A1 * | 4/2020 | Deole | G06F 21/64 |
| 2021/0399893 | A1 * | 12/2021 | Withrow | G06F 21/10 |
| 2022/0335515 | A1 * | 10/2022 | Shah | G06F 16/245 |
| 2023/0110817 | A1 * | 4/2023 | Nieto | G06Q 30/02 726/28 |
| 2023/0342773 | A1 * | 10/2023 | Bose | G06Q 20/401 |

OTHER PUBLICATIONS

Sun, Zhiyuan. "What Are Smart Contracts?" The Motley Fool. < https://www.fool.com/investing/2021/10/07/what-are-smart-contracts/?msockid=1b106eacb3be611a112078b2b2b260b7> Oct. 7, 2021. (Year: 2021).*

(Continued)

*Primary Examiner* — Elda G Milef
(74) *Attorney, Agent, or Firm* — Lee & Hayes, P.C.

(57) ABSTRACT

The present invention generally relates to computer systems, methods and program products that allow a digital asset exchange to provide an option to customers to lend all or a portion of the digital assets associated with at least a first blockchain and held by the exchange on behalf of the customer in exchange for payments such as interest.

18 Claims, 28 Drawing Sheets

(56) References Cited

OTHER PUBLICATIONS

"What Is A Smart Contract and How Does It Work?" <https://www.kucoin.com/blog/what-is-a-smart-contract-and-how-does-it-work> Aug. 20, 2021. (Year: 2021).*

Reiff, Nathan. "Cryptocurrency 'Burning': Can it Manage Inflation?" Nov. 24, 2020 (Year: 2020).*

"What is Token Burning, and Why are Developers Destroying Cryptocurrency" Apr. 19, 2021. Latoken. https://latoken.com/blog/what-is-token-burning-and-why-are-developers-destroying-cryptocurrency/. (Year: 2021).*

"What is Crypto Lending? Key Legal Considerations for Lenders." Dentons; Dec. 10, 2021. (Year: 2021).*

Powell, Sidney. "DeFi 2025-Unsecured Crypto Loans" Medium.com, https://medium.com/swlh/defi-2025-unsecured-crypto-loans-c54262507cc9; Jun. 17, 2019 (Year: 2019).*

Powell, Sidney. "Crypto Lending-The Missing Ingredient." Medium. https://medium.com/swlh/crypto-lending-the-missing-ingredient-4862d54cdf53; Jun. 10, 2019 (Year: 2019).*

* cited by examiner

FIG. 4

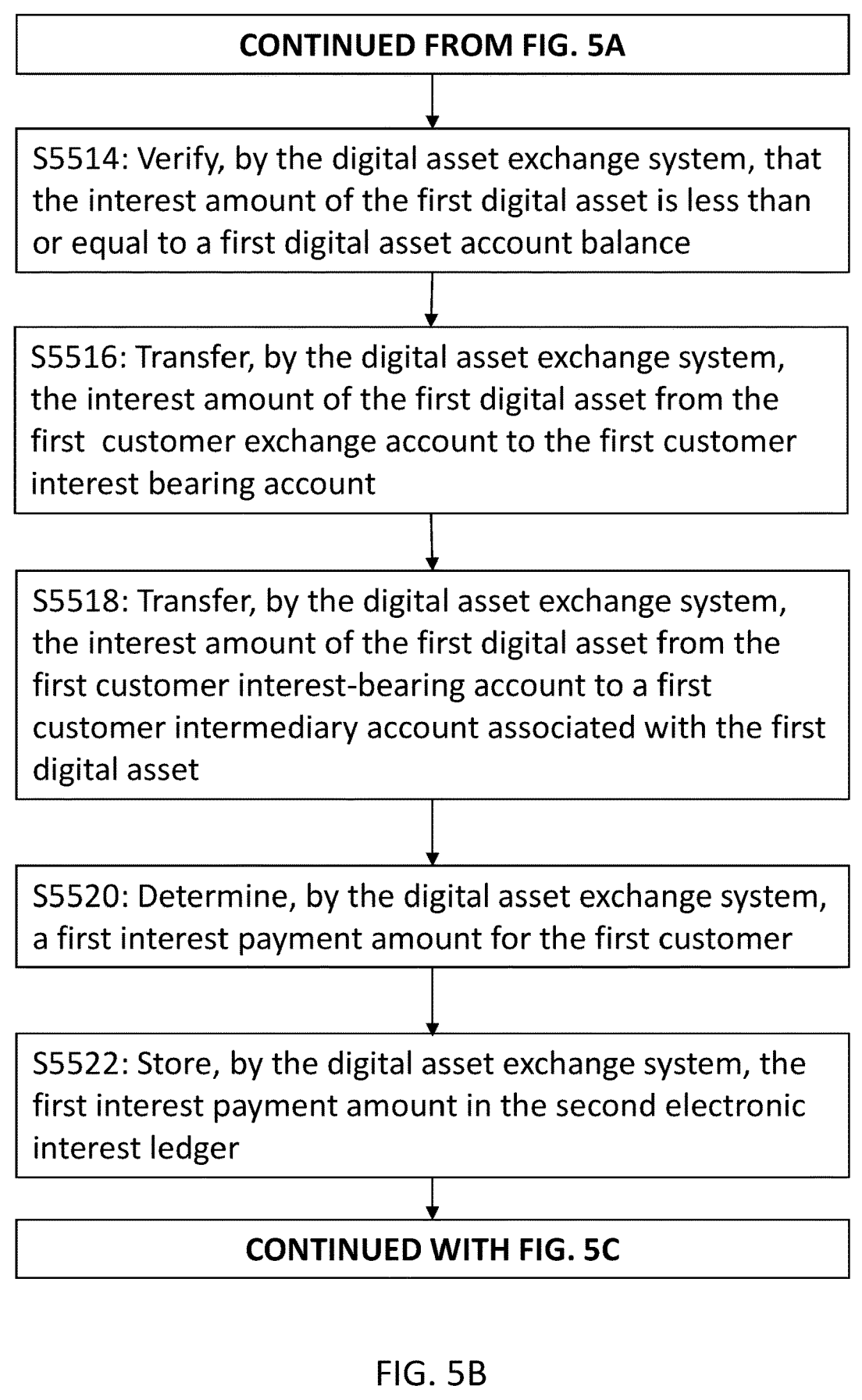

CONTINUED FROM FIG. 5A

S5514: Verify, by the digital asset exchange system, that the interest amount of the first digital asset is less than or equal to a first digital asset account balance S5516: Transfer, by the digital asset exchange system, the interest amount of the first digital asset from the first customer exchange account to the first customer interest bearing account S5518: Transfer, by the digital asset exchange system, the interest amount of the first digital asset from the first customer interest-bearing account to a first customer intermediary account associated with the first digital asset S5520: Determine, by the digital asset exchange system, a first interest payment amount for the first customer S5522: Store, by the digital asset exchange system, the first interest payment amount in the second electronic interest ledger

CONTINUED WITH FIG. 5C

FIG. 5B

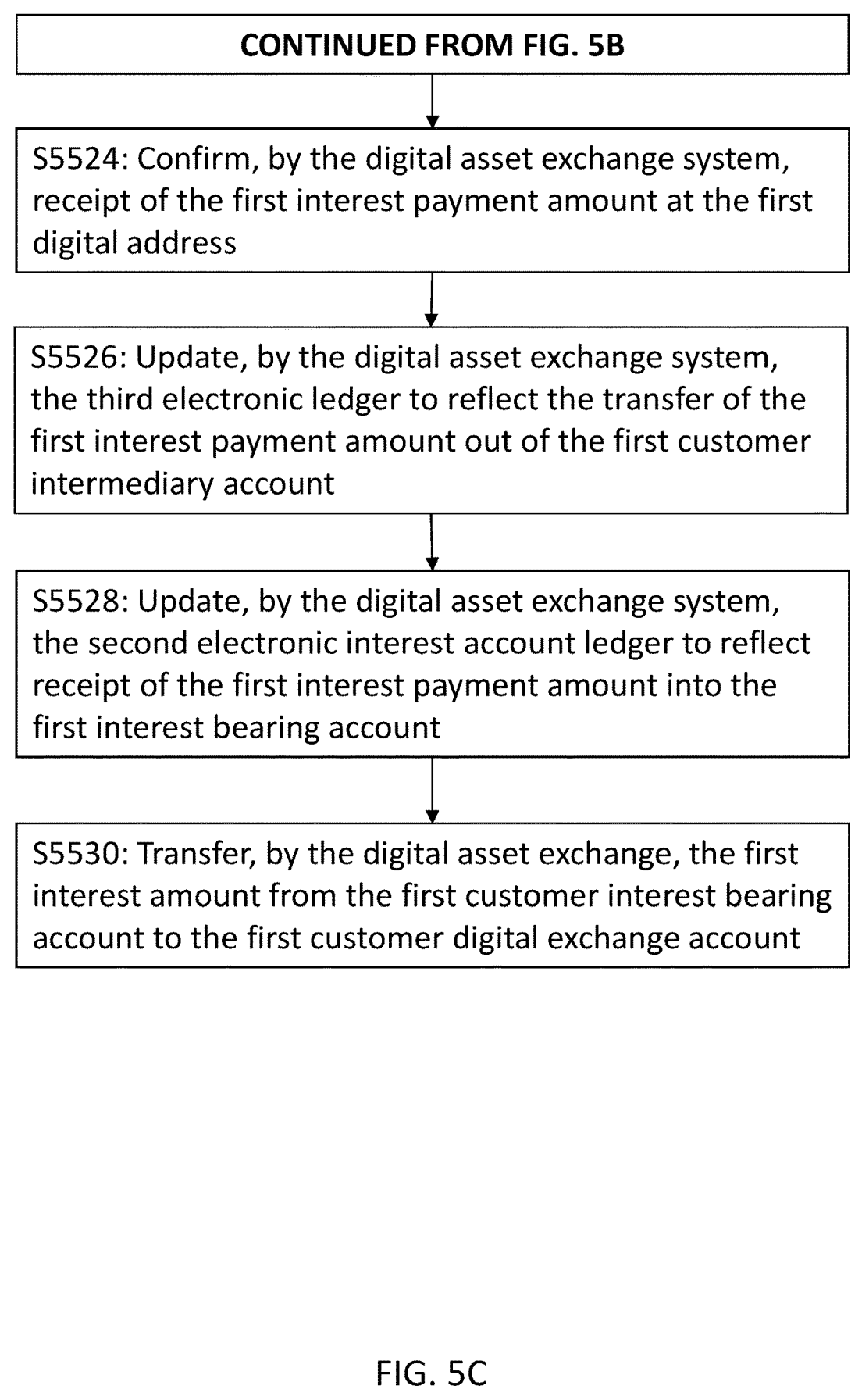

CONTINUED FROM FIG. 5B

S5524: Confirm, by the digital asset exchange system, receipt of the first interest payment amount at the first digital address S5526: Update, by the digital asset exchange system, the third electronic ledger to reflect the transfer of the first interest payment amount out of the first customer intermediary account S5528: Update, by the digital asset exchange system, the second electronic interest account ledger to reflect receipt of the first interest payment amount into the first interest bearing account S5530: Transfer, by the digital asset exchange, the first interest amount from the first customer interest bearing account to the first customer digital exchange account

FIG. 5C

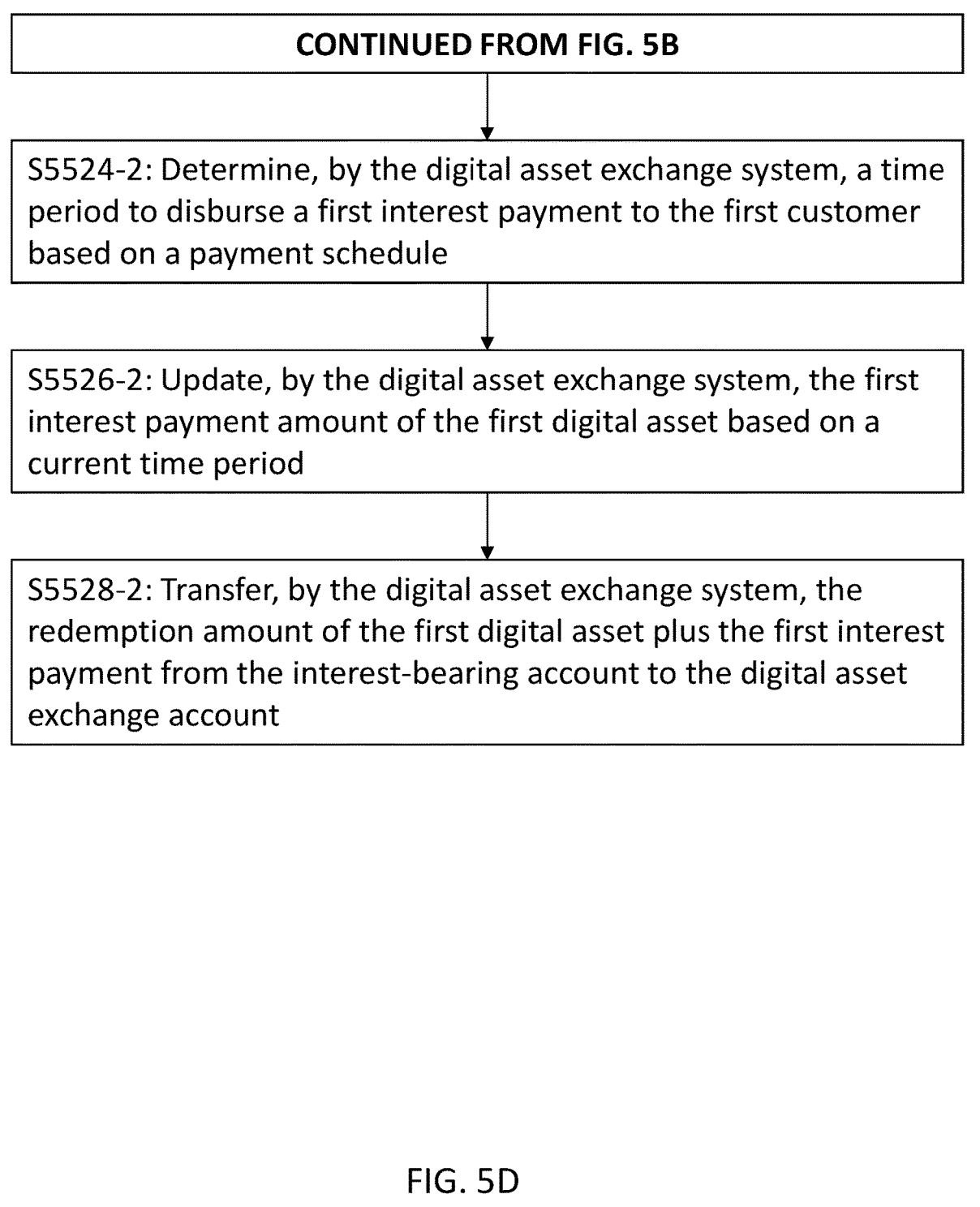

CONTINUED FROM FIG. 5B

S5524-2: Determine, by the digital asset exchange system, a time period to disburse a first interest payment to the first customer based on a payment schedule S5526-2: Update, by the digital asset exchange system, the first interest payment amount of the first digital asset based on a current time period S5528-2: Transfer, by the digital asset exchange system, the redemption amount of the first digital asset plus the first interest payment from the interest-bearing account to the digital asset exchange account

FIG. 5D

S5502: ...the one or more databases including one or more of the following:

(1) one or more electronic exchange digital asset ledger(s) associated with a respective digital asset including, for each customer, exchange account information including a first respective digital asset account balance associated with each respective digital asset;

(2) an electronic interest account ledger associated with the first digital asset including, for each customer, respective interest-bearing account information including a respective digital asset interest account balance associated with an interest amount of the first digital asset and respective interest information;

(3) an electronic intermediary ledger associated with a first intermediary, including, for each customer, intermediary account information including a respective digital asset balance indicating an intermediary amount of the first digital asset and respective return information; and/or (4) an electronic reserve ledger associated with a respective digital asset, including, for each customer, reserve account information including a reserve digital asset balance indicating a reserve amount of the first digital asset.

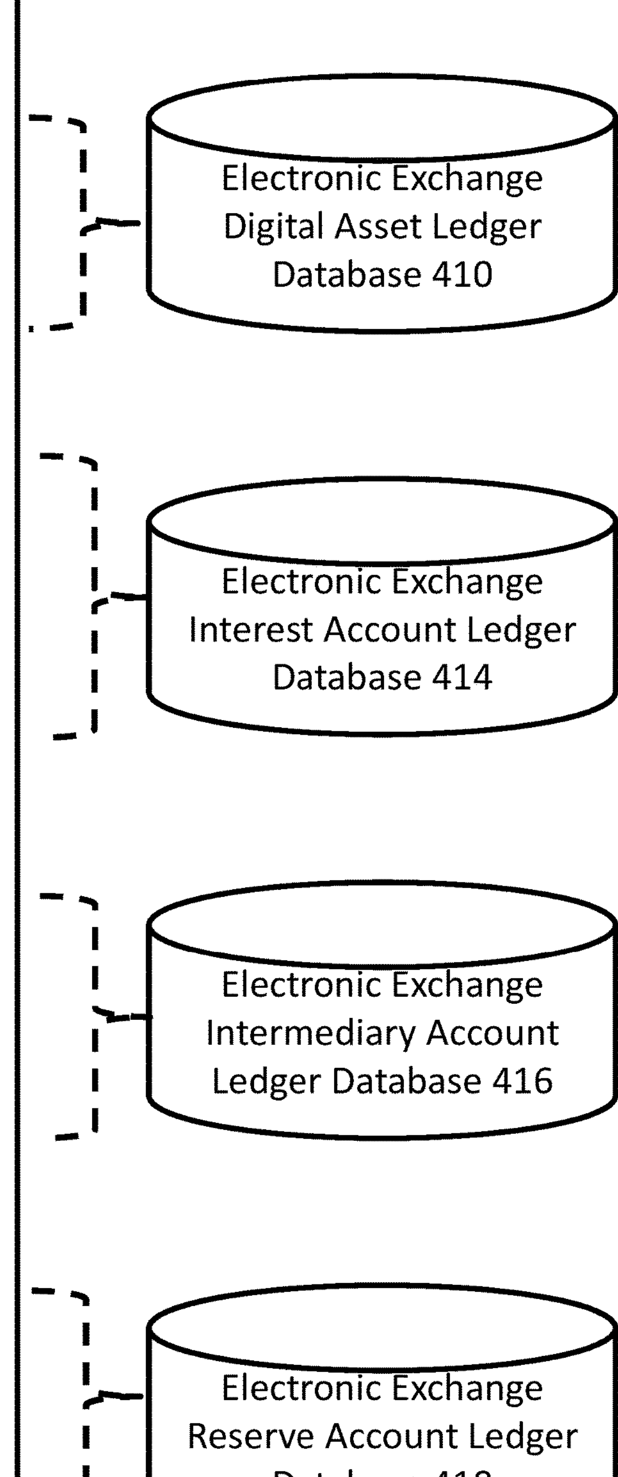

FIG. 5A-1

S5508: ...the first response including one or more of the following:

(1) customer identification information associated with the first customer;

(2) a first digital asset account balance associated with the first customer;

(3) a second digital asset account balance associated with the first customer;

(4) a transfer option to transfer one or more digital assets into an interest-bearing account associated with the first customer;

(5) interest information associated with a second digital asset account associated with the first customer; and/or (6) a purchase option to purchase one or more digital assets into an interest-bearing account associated with the first customer

FIG. 5A-2

Exemplary First Request 5510

Customer Identification No. 12345

Account 1. 10 Digital Assets (Interest 1)
Account 2: 100 Digital Assets (Interest 2)

Transfer Option:
To Account:
[Account 1 or 2]
From Account:
[Account 1 or 2]

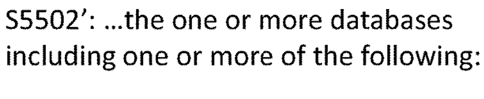

S5502': ...the one or more databases including one or more of the following:

(1) a first electronic exchange ledger associated with a first digital asset including, for each customer, exchange account information including a first digital asset account balance indicating a first balance amount of the first digital asset;

(2) an electronic interest account ledger associated with the first digital asset including, for each customer, respective interest-bearing account information including a respective digital asset interest account balance associated with an interest amount of the first digital asset and respective interest information;

(3) an electronic intermediary ledger associated with a first intermediary, including, for each customer, intermediary account information including a respective digital asset balance indicating an intermediary amount of the first digital asset and respective return information;

(4) an electronic reserve ledger associated with a respective digital asset, including, for each customer, reserve account information including a reserve digital asset balance indicating a reserve amount of the first digital asset.; and/or (5) an electronic fiat ledger, including, for each customer, fiat account information associated with a respective customer fiat account indicating a first respective fiat account balance held in the respective customer exchange fiat account

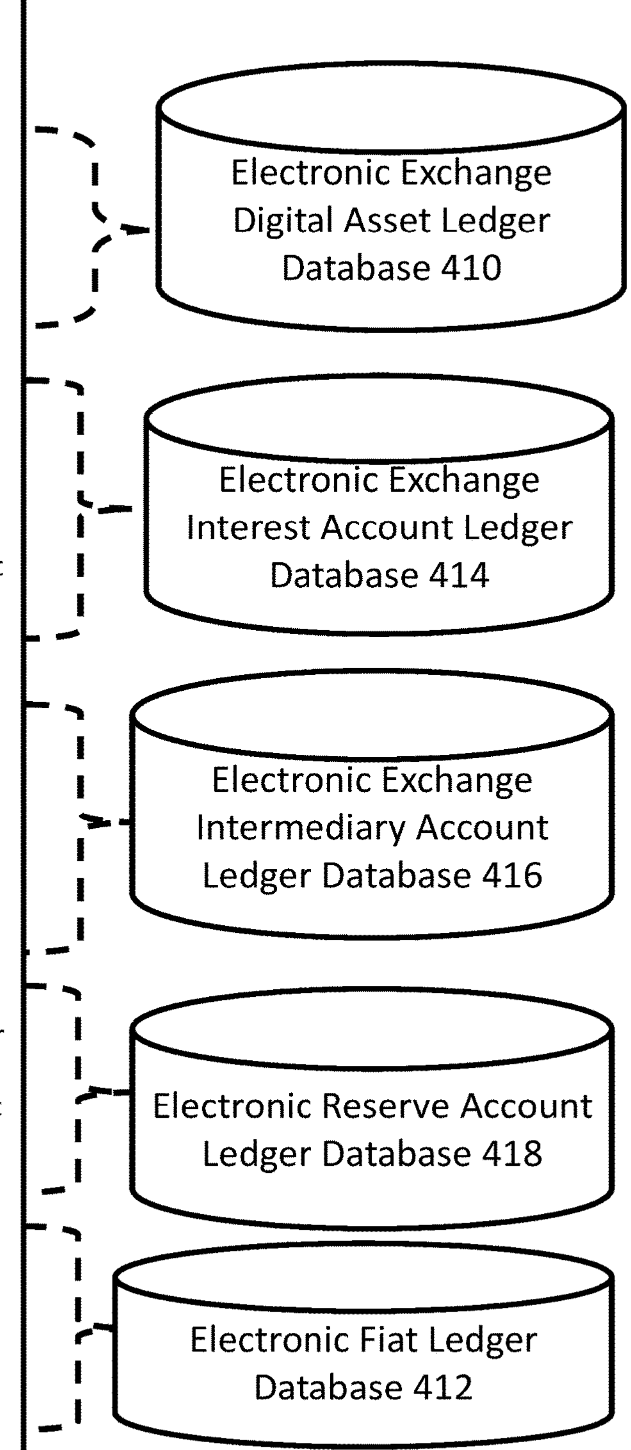

FIG. 5A-5

CONTINUED FROM S5510 OF FIG. 5A

S5512′: Receive, by the digital asset exchange system from the first customer device, a second request to purchase a respective amount of the first digital asset and to deposit the respective amount of the first digital asset into an interest-bearing account associated with the first customer S5514′: Verify, by the digital asset exchange system, the second request S5514′A: Calculate a corresponding amount of fiat based on a conversion rate of the first digital asset to fiat and the respective amount of the first digital asset S5514′B: Confirm, by the digital asset exchange system, the respective customer fiat account has sufficient funds S5514′B-1: Calculate the corresponding amount of fiat based on the conversion rate S5514′B-2: Determine a total amount of fiat based on the sixth amount of fiat and the fourth amount of the first digital asset S5514′B-3: Confirm a respective customer fiat account has sufficient funds for the second request

CONTINUED WITH FIG. 5A-7

FIG. 5A-6

CONTINUED FROM FIG. 5A-6

S5516': Purchase, by the digital asset exchange system, the interest amount of the first digital asset S5516'A: Transfer the total amount of fiat from the respective customer fiat account to an exchange fiat account associated with the digital asset exchange S5516'B: Transfer, by the digital asset exchange system, the interest amount of the first digital asset from the first customer account to the interest-bearing account associated with the first customer CONTINUED WITH S5518 of FIG. 5B

FIG. 5A-7

S5506: Authenticate, by the digital asset exchange system, the first customer

S5506A: Receive, by the digital asset exchange system from the first user device, an authentication request including first user credential information associated with the first user S5506B: Determine, by the digital asset exchange system, that the first user device is authorized to access the digital asset exchange system based at least in part on the first user credential information S5506C: Generate, by the digital asset exchange system, first machine-executable instructions including first graphical user interface information associated with a first graphical user interface S5506D: Transmit, from the digital asset exchange system to the first user device, the first machine-executable instructions

CONTINUED WITH S5508 of FIG. 5A

FIG. 5A-8

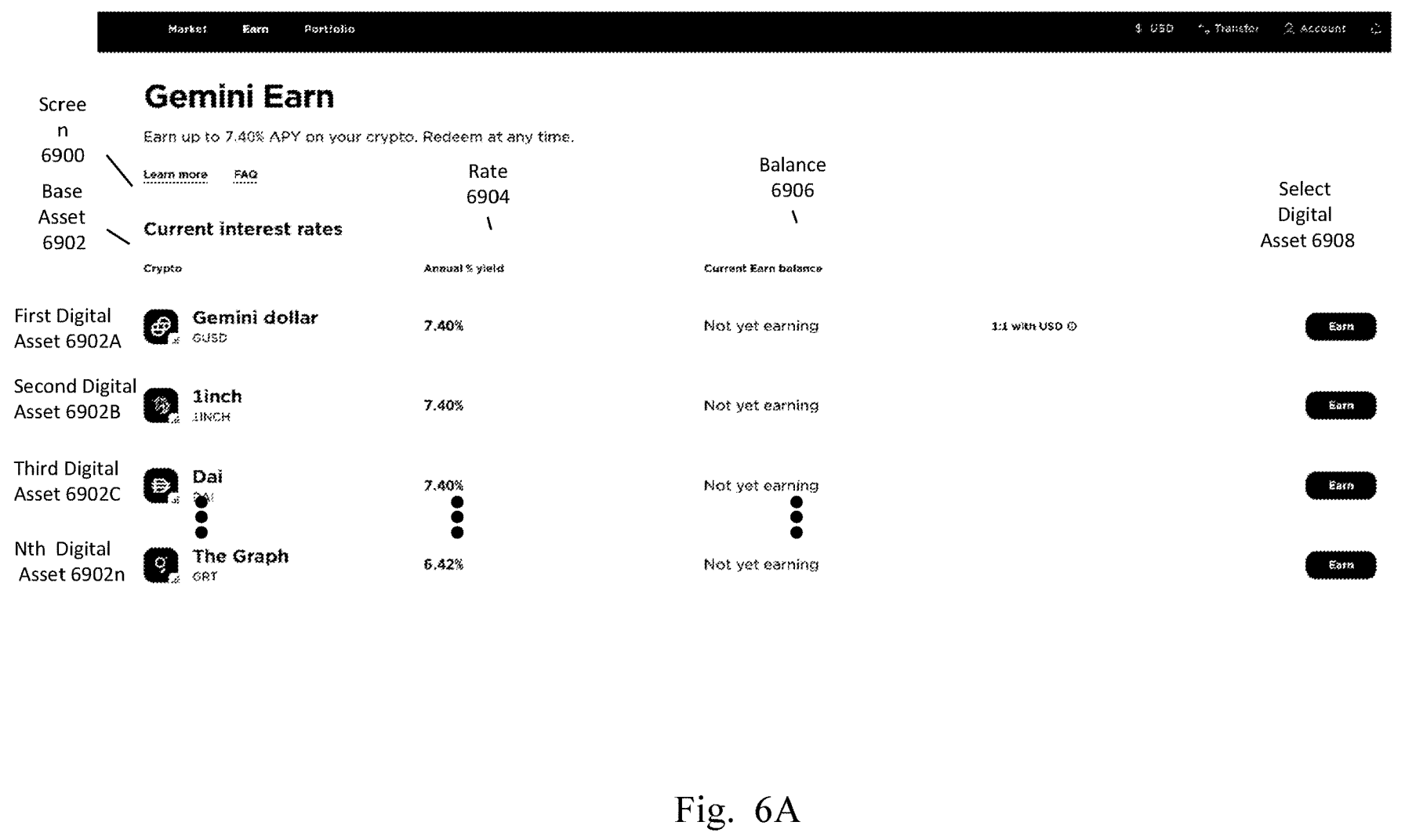

Market Earn Portfolio $ USD Transfer Account

Screen 6900

Gemini Earn

Earn up to 7.40% APY on your crypto. Redeem at any time.

Learn more FAQ

Base Asset 6902

Current interest rates

Rate 6904

Balance 6906

Select Digital Asset 6908

| | Crypto | Annual % yield | Current Earn balance | | |
|---|---|---|---|---|---|
| First Digital Asset 6902A | Gemini dollar GUSD | 7.40% | Not yet earning | 1:1 with USD | Earn |
| Second Digital Asset 6902B | 1inch 1INCH | 7.40% | Not yet earning | | Earn |
| Third Digital Asset 6902C | Dai DAI | 7.40% | Not yet earning | | Earn |
| ⋮ | ⋮ | ⋮ | ⋮ | | |
| Nth Digital Asset 6902n | The Graph GRT | 6.42% | Not yet earning | | Earn |

Fig. 6A

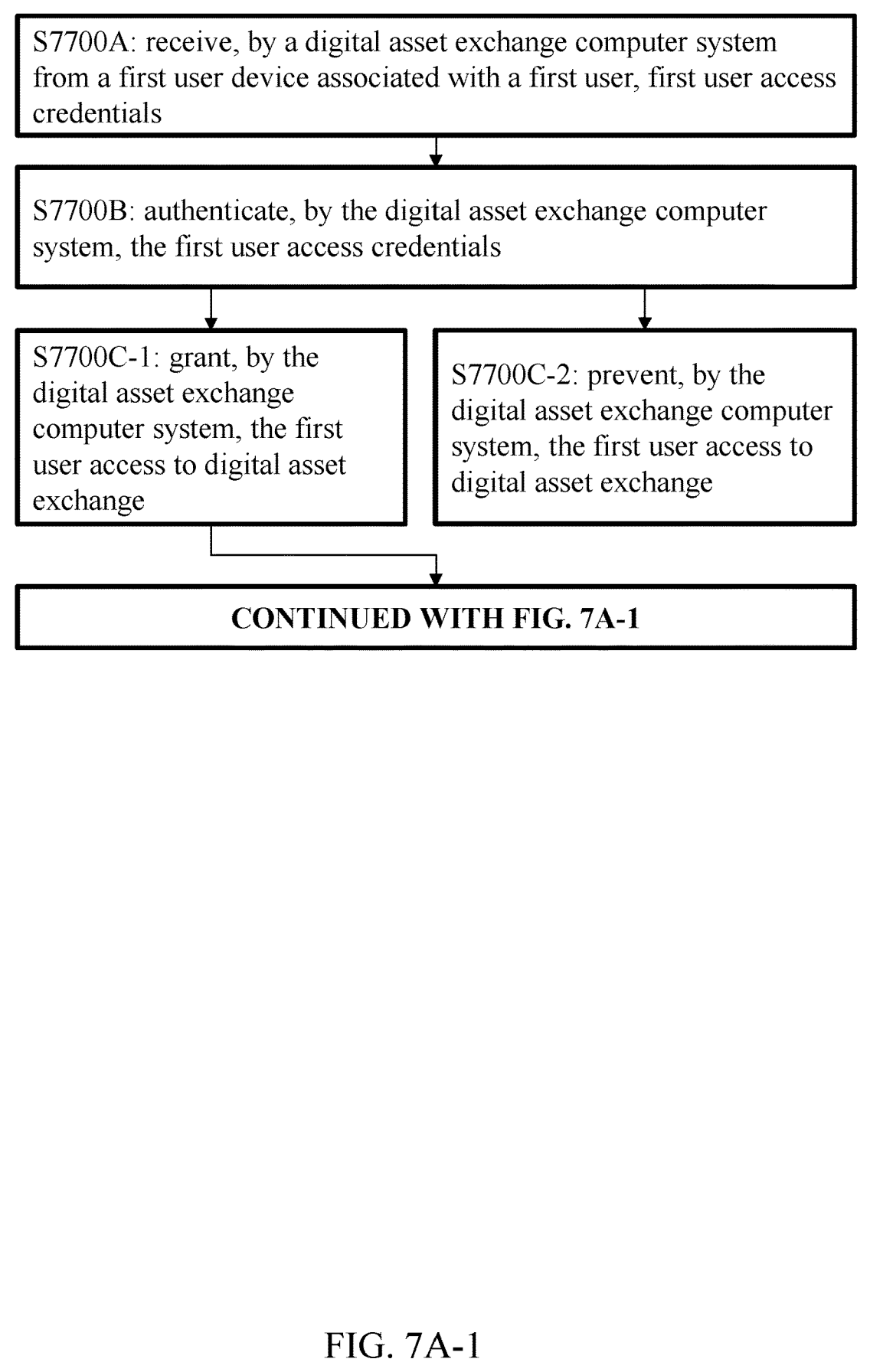

S7700A: receive, by a digital asset exchange computer system from a first user device associated with a first user, first user access credentials S7700B: authenticate, by the digital asset exchange computer system, the first user access credentials S7700C-1: grant, by the digital asset exchange computer system, the first user access to digital asset exchange S7700C-2: prevent, by the digital asset exchange computer system, the first user access to digital asset exchange

CONTINUED WITH FIG. 7A-1

FIG. 7A-1

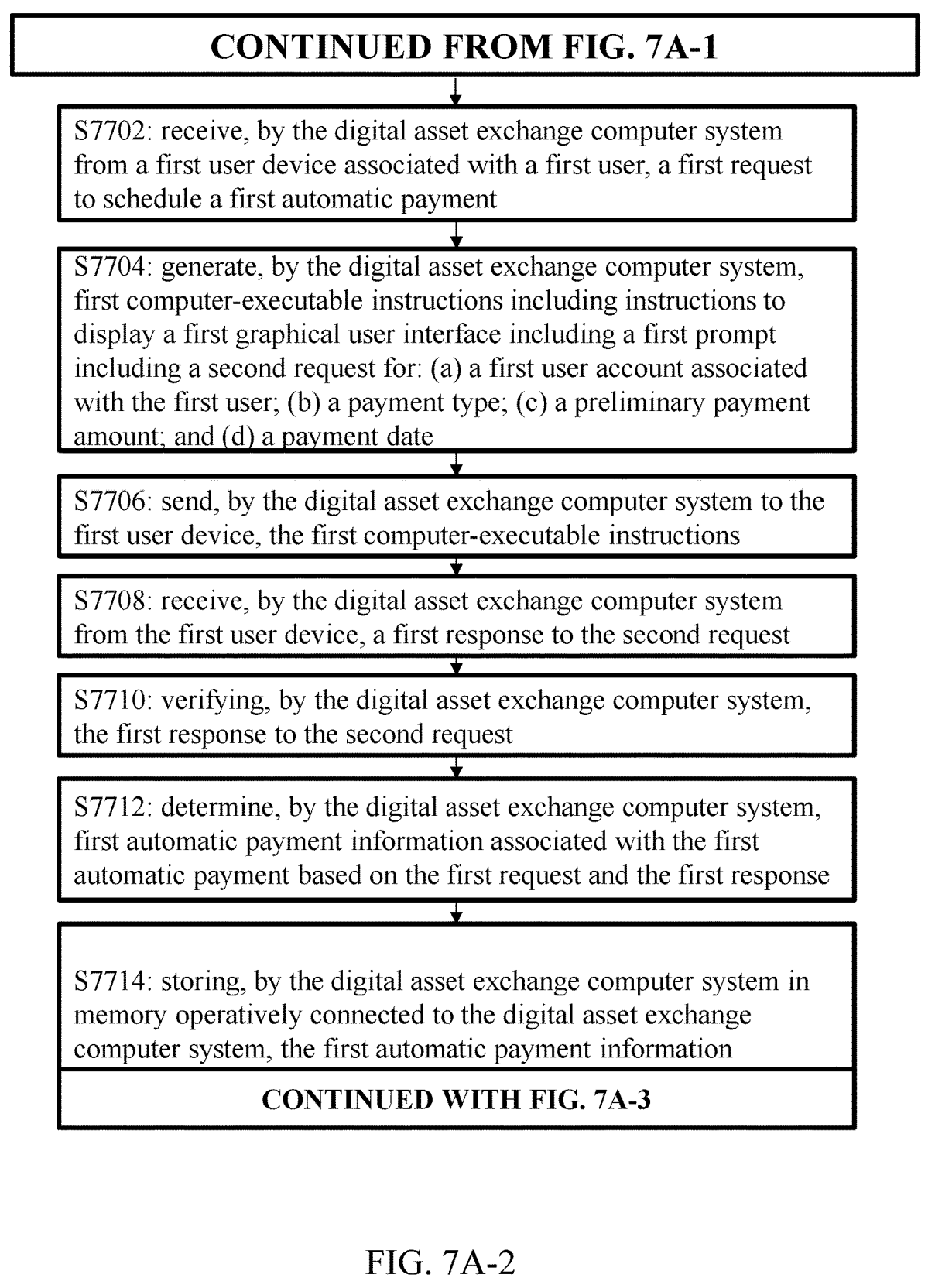

CONTINUED FROM FIG. 7A-1

S7702: receive, by the digital asset exchange computer system from a first user device associated with a first user, a first request to schedule a first automatic payment S7704: generate, by the digital asset exchange computer system, first computer-executable instructions including instructions to display a first graphical user interface including a first prompt including a second request for: (a) a first user account associated with the first user; (b) a payment type; (c) a preliminary payment amount; and (d) a payment date S7706: send, by the digital asset exchange computer system to the first user device, the first computer-executable instructions S7708: receive, by the digital asset exchange computer system from the first user device, a first response to the second request S7710: verifying, by the digital asset exchange computer system, the first response to the second request S7712: determine, by the digital asset exchange computer system, first automatic payment information associated with the first automatic payment based on the first request and the first response S7714: storing, by the digital asset exchange computer system in memory operatively connected to the digital asset exchange computer system, the first automatic payment information

CONTINUED WITH FIG. 7A-3

FIG. 7A-2

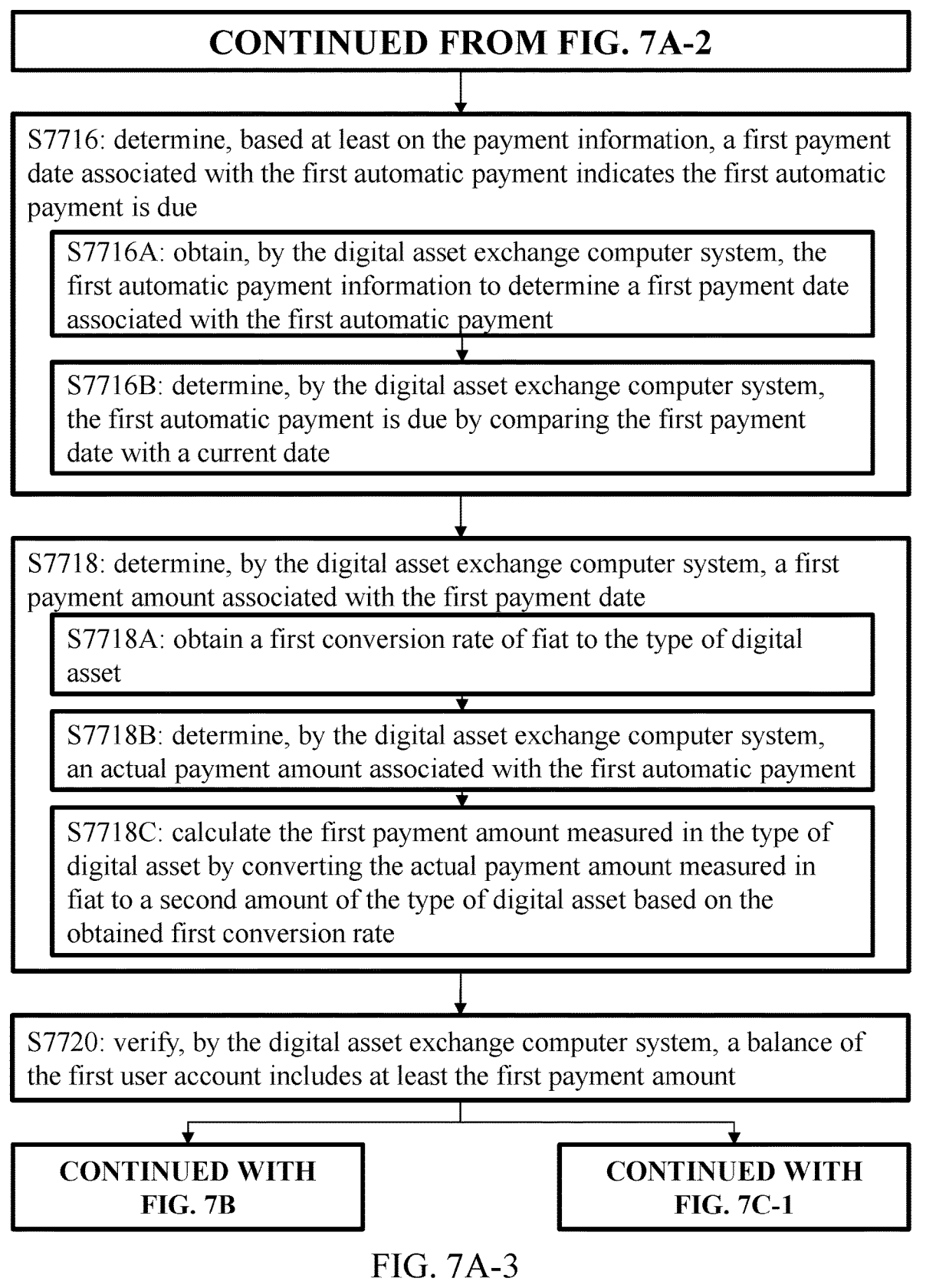

CONTINUED FROM FIG. 7A-2

S7716: determine, based at least on the payment information, a first payment date associated with the first automatic payment indicates the first automatic payment is due S7716A: obtain, by the digital asset exchange computer system, the first automatic payment information to determine a first payment date associated with the first automatic payment S7716B: determine, by the digital asset exchange computer system, the first automatic payment is due by comparing the first payment date with a current date S7718: determine, by the digital asset exchange computer system, a first payment amount associated with the first payment date S7718A: obtain a first conversion rate of fiat to the type of digital asset S7718B: determine, by the digital asset exchange computer system, an actual payment amount associated with the first automatic payment S7718C: calculate the first payment amount measured in the type of digital asset by converting the actual payment amount measured in fiat to a second amount of the type of digital asset based on the obtained first conversion rate S7720: verify, by the digital asset exchange computer system, a balance of the first user account includes at least the first payment amount

CONTINUED WITH FIG. 7B

CONTINUED WITH FIG. 7C-1

FIG. 7A-3

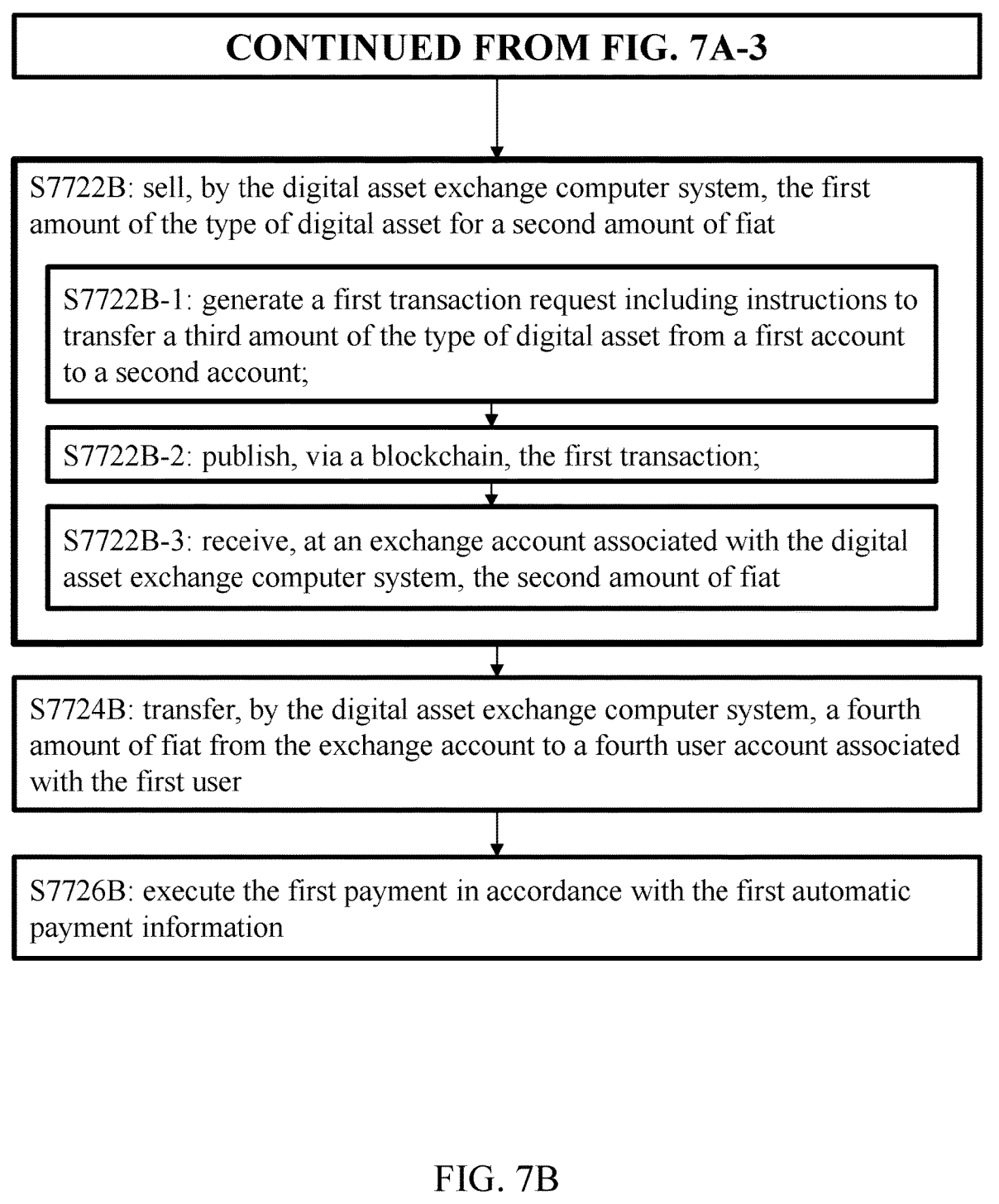

CONTINUED FROM FIG. 7A-3

S7722B: sell, by the digital asset exchange computer system, the first amount of the type of digital asset for a second amount of fiat S7722B-1: generate a first transaction request including instructions to transfer a third amount of the type of digital asset from a first account to a second account;

S7722B-2: publish, via a blockchain, the first transaction;

S7722B-3: receive, at an exchange account associated with the digital asset exchange computer system, the second amount of fiat S7724B: transfer, by the digital asset exchange computer system, a fourth amount of fiat from the exchange account to a fourth user account associated with the first user S7726B: execute the first payment in accordance with the first automatic payment information

FIG. 7B

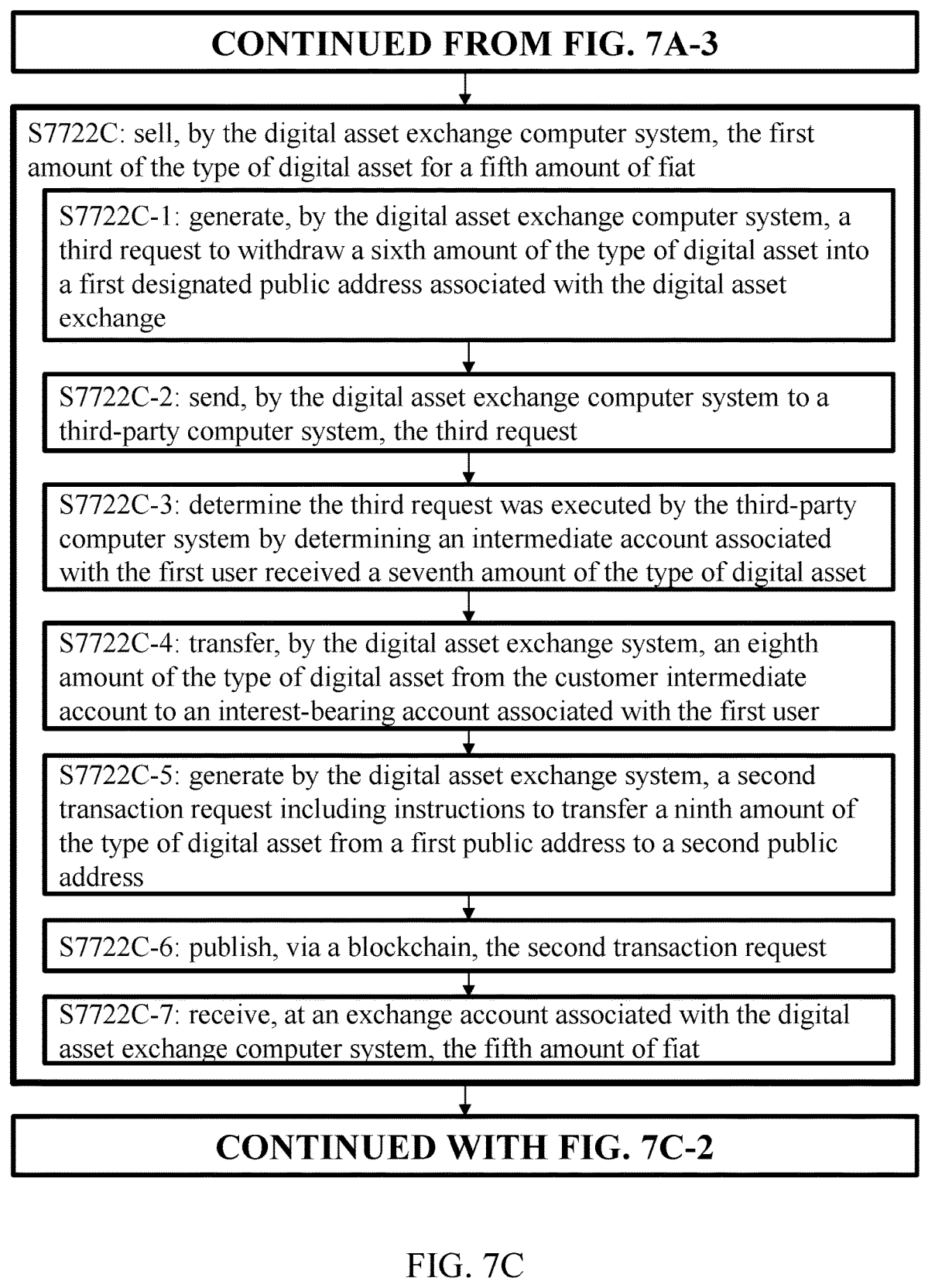

CONTINUED FROM FIG. 7A-3

S7722C: sell, by the digital asset exchange computer system, the first amount of the type of digital asset for a fifth amount of fiat S7722C-1: generate, by the digital asset exchange computer system, a third request to withdraw a sixth amount of the type of digital asset into a first designated public address associated with the digital asset exchange S7722C-2: send, by the digital asset exchange computer system to a third-party computer system, the third request S7722C-3: determine the third request was executed by the third-party computer system by determining an intermediate account associated with the first user received a seventh amount of the type of digital asset S7722C-4: transfer, by the digital asset exchange system, an eighth amount of the type of digital asset from the customer intermediate account to an interest-bearing account associated with the first user S7722C-5: generate by the digital asset exchange system, a second transaction request including instructions to transfer a ninth amount of the type of digital asset from a first public address to a second public address S7722C-6: publish, via a blockchain, the second transaction request S7722C-7: receive, at an exchange account associated with the digital asset exchange computer system, the fifth amount of fiat

CONTINUED WITH FIG. 7C-2

FIG. 7C

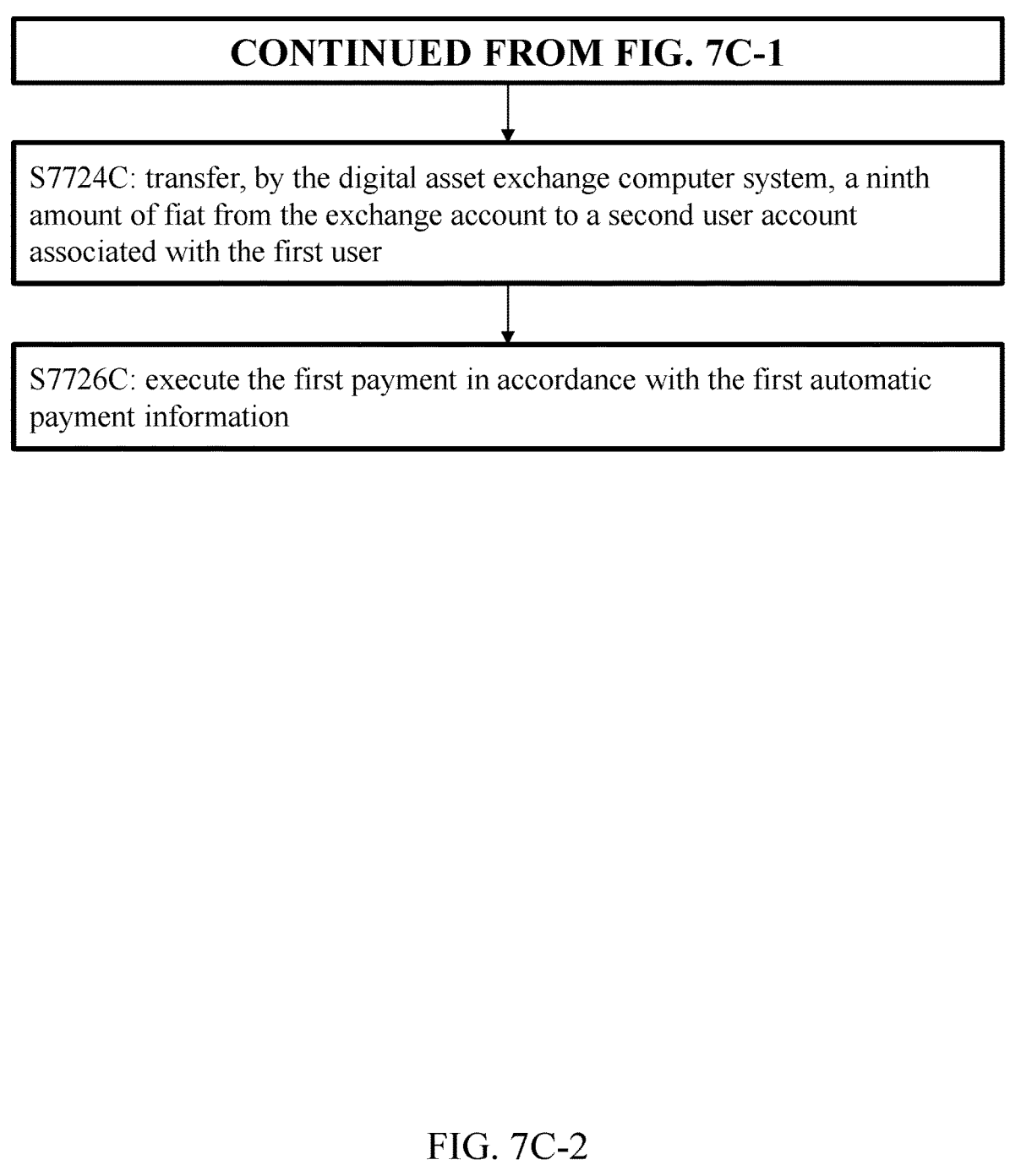

CONTINUED FROM FIG. 7C-1

S7724C: transfer, by the digital asset exchange computer system, a ninth amount of fiat from the exchange account to a second user account associated with the first user S7726C: execute the first payment in accordance with the first automatic payment information

FIG. 7C-2

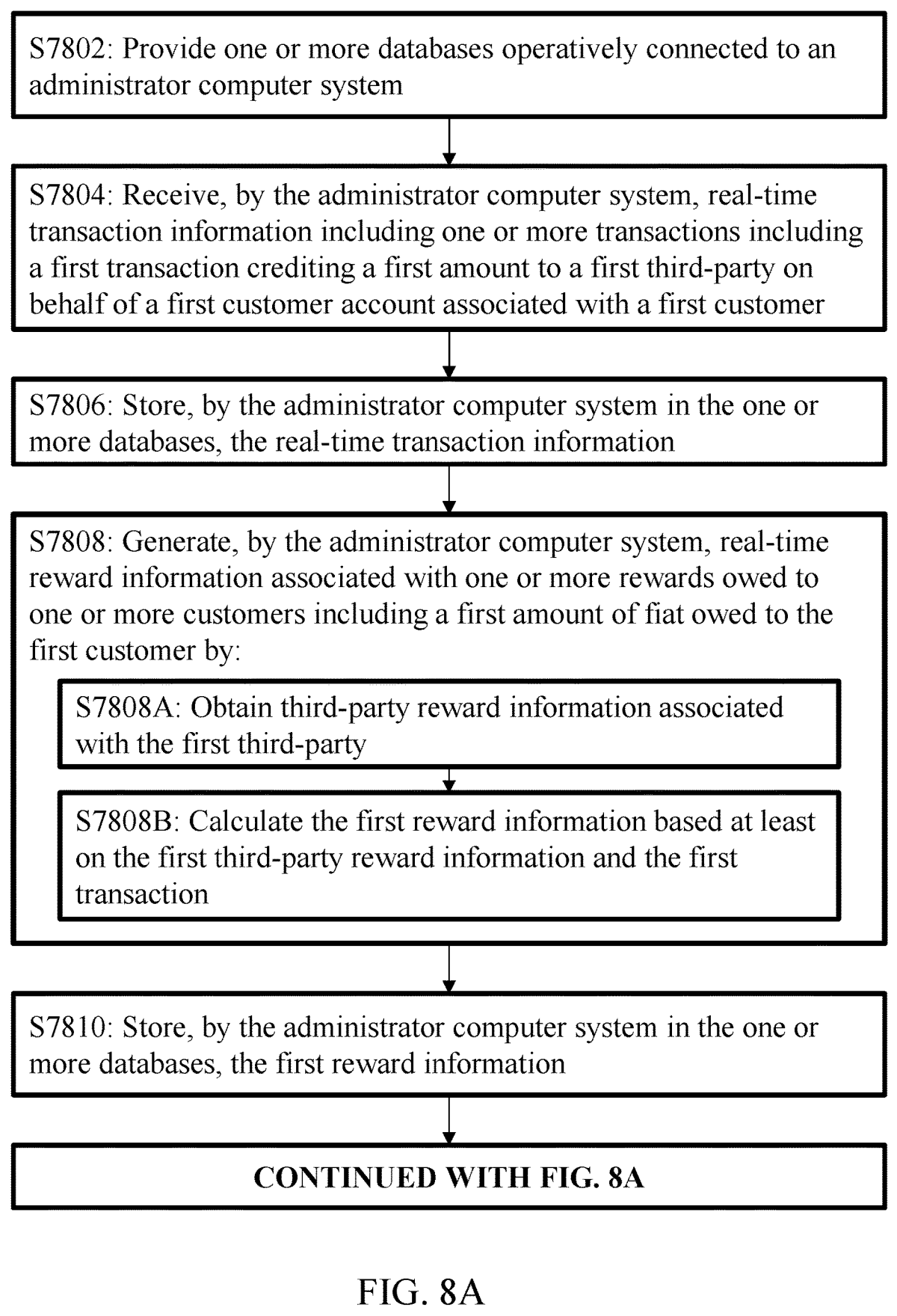

S7802: Provide one or more databases operatively connected to an administrator computer system S7804: Receive, by the administrator computer system, real-time transaction information including one or more transactions including a first transaction crediting a first amount to a first third-party on behalf of a first customer account associated with a first customer S7806: Store, by the administrator computer system in the one or more databases, the real-time transaction information S7808: Generate, by the administrator computer system, real-time reward information associated with one or more rewards owed to one or more customers including a first amount of fiat owed to the first customer by:

S7808A: Obtain third-party reward information associated with the first third-party S7808B: Calculate the first reward information based at least on the first third-party reward information and the first transaction S7810: Store, by the administrator computer system in the one or more databases, the first reward information

CONTINUED WITH FIG. 8A

FIG. 8A

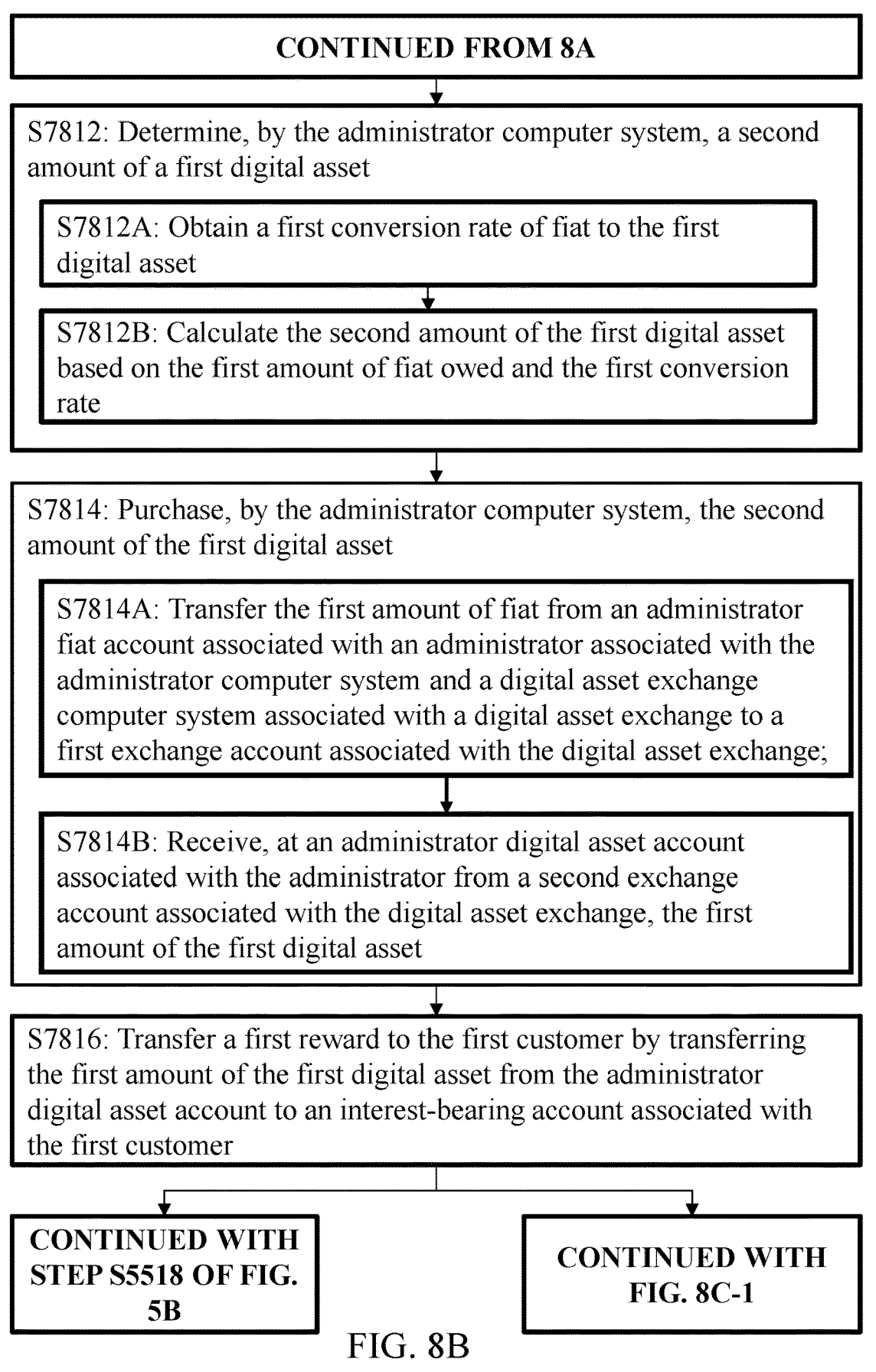

CONTINUED FROM 8A

S7812: Determine, by the administrator computer system, a second amount of a first digital asset S7812A: Obtain a first conversion rate of fiat to the first digital asset S7812B: Calculate the second amount of the first digital asset based on the first amount of fiat owed and the first conversion rate S7814: Purchase, by the administrator computer system, the second amount of the first digital asset S7814A: Transfer the first amount of fiat from an administrator fiat account associated with an administrator associated with the administrator computer system and a digital asset exchange computer system associated with a digital asset exchange to a first exchange account associated with the digital asset exchange;

S7814B: Receive, at an administrator digital asset account associated with the administrator from a second exchange account associated with the digital asset exchange, the first amount of the first digital asset S7816: Transfer a first reward to the first customer by transferring the first amount of the first digital asset from the administrator digital asset account to an interest-bearing account associated with the first customer

CONTINUED WITH STEP S5518 OF FIG. 5B

CONTINUED WITH FIG. 8C-1

FIG. 8B

CONTINUED FROM FIG. 8B

S7818: Receive, by the administrator computer system, settlement transaction information including one or more transactions including a second transaction representing settling the first transaction S7820: Store, by the administrator computer system in the one or more databases, the settlement transaction information S7822: Generate, by the administrator computer system, second reward information associated with the one or more rewards owed to the one or more customers including a second amount of fiat owed to the first customer by:

S7822A: Obtain second third-party reward information associated with the first third-party S7822B: Calculate the second reward information based at least on the second third-party reward information and the second transaction S7824: Store, by the administrator computer system in the one or more databases, the second reward information

CONTINUED WITH FIG. 8C-2

FIG. 8C-1

CONTINUED FROM FIG. 8C-2

S7834: Purchase, by the administrator computer system, the fifth amount of the first digital asset S7834A: Transfer the fourth amount of fiat from the administrator fiat account to the first exchange account S7834B: Receive, at the administrator digital asset account from the second exchange account, the fifth amount of the first amount of the first digital asset

CONTINUED WITH STEP S5518 OF FIG. 5B

FIG. 8C-3

CONTINUED FROM FIG. 8C-2

S7836: Store, by the administrator computer system in the one or more databases, the fifth amount of the first digital asset such that the fifth amount of the first digital asset is recorded as a balance against a second reward associated with the first customer

FIG. 8C-4

SYSTEMS, METHODS, AND PROGRAM PRODUCTS FOR PROVIDING INTEREST ON DIGITAL ASSETS ON A DIGITAL ASSET EXCHANGE

CROSS-REFERENCE TO RELATED APPLICATIONS

This application claims priority to U.S. Provisional Patent Application No. 63/299,819, filed Jan. 14, 2022, titled "SYSTEMS, METHODS, AND PROGRAM PRODUCTS FOR PROVIDING INTEREST ON DIGITAL ASSETS ON A DIGITAL ASSET EXCHANGE," which is related to U.S. Provisional Patent Application Ser. No. 63/122,935 entitled "SYSTEMS, METHODS, AND PROGRAM PRODUCTS FOR NON-CUSTODIAL TRADING OF DIGITAL ASSETS ON A DIGITAL ASSET EXCHANGE," filed on Dec. 8, 2020, the entire content of which is incorporated herein by reference in its entirety. U.S. Provisional Patent Application No. 63/299,819 is also related to U.S. Provisional Patent Application Ser. No. 63/156,736 entitled "SYSTEMS, METHODS, AND PROGRAM PRODUCTS FOR NON-CUSTODIAL TRADING OF DIGITAL ASSETS ON A DIGITAL ASSET EXCHANGE," filed on Mar. 3, 2021, the entire content of which is incorporated herein by reference in its entirety. U.S. Provisional Patent Application No. 63/299,819 is also related to U.S. Provisional Patent Application Ser. No. 63/202,978 entitled "SYSTEMS, METHODS, AND PROGRAM PRODUCTS FOR NON-CUSTODIAL TRADING OF DIGITAL ASSETS ON A DIGITAL ASSET EXCHANGE," filed on Jun. 29, 2021, the entire content of which is incorporated herein by reference in its entirety. U.S. Provisional Patent Application No. 63/299,819 is also related to U.S. Provisional Patent Application Ser. No. 63/299,819 entitled "SYSTEMS, METHODS, AND PROGRAM PRODUCTS FOR NON-CUSTODIAL TRADING OF DIGITAL ASSETS ON A DIGITAL ASSET EXCHANGE," filed Jan. 14, 2022, the entire content of which is incorporated herein by reference in its entirety.

FIELD

The present invention generally relates to computer systems, methods and program products providing interest on digital assets held in custodial accounts on a digital asset exchange.

SUMMARY

Systems, methods, and program products are provided providing interest on digital assets on a digital asset exchange.

In embodiments, a method may comprise: (a) receiving, at a digital asset exchange computer system associated with a digital asset exchange, first customer access credentials from a first customer device associated with a first customer of a plurality of customers of the digital asset exchange, wherein the digital asset exchange computer system is operatively connected to one or more databases, which include: (1) a first electronic exchange ledger associated with a first digital asset including, for each customer of a plurality of customers of the digital asset exchange, exchange account information associated with a respective customer exchange account including a first respective digital asset account balance associated with a first amount of the first digital asset held in the respective customer exchange account that is available for transfer via the digital asset exchange, wherein the first digital asset is maintained on a distributed public transaction ledger maintained in the form of a first blockchain by a first plurality of geographically distributed computer systems in a first blockchain network; (2) a second electronic interest account ledger associated with the first digital asset including, for each customer of the plurality of customers of the digital asset exchange, respective interest-bearing account information associated with a respective customer interest-bearing account including a second respective digital asset interest account balance associated with a second amount of the first digital asset held in the respective customer interest-bearing account and respective interest information; (3) a third electronic intermediary ledger associated with a first intermediary, including, for each customer of the plurality of customers of the digital asset exchange, first respective intermediary account information associated with a respective customer intermediary account including a third respective digital asset balance indicating a third amount of the first digital asset held in the respective customer intermediary account and respective return information; (b) authenticating, by the digital asset exchange computer system, the first customer based on at least the first customer access credentials; (c) receiving, by the digital asset exchange computer system, from the first customer device, a first request to transfer a fourth amount of the first digital asset from a first customer exchange account associated with the first customer to a first customer interest-bearing account associated with the first customer, the first request comprising: i. identification information associated with the first digital asset; and ii. the fourth amount of the first digital asset; (d) verifying, by the digital asset exchange computer system, that the fourth amount of the first digital asset is less than or equal to a first digital asset account balance associated with the first customer; (e) transferring, by the digital asset exchange computer system, the fourth amount of the first digital asset from the first customer exchange account associated with the first customer to the first customer interest-bearing account associated with the first customer, wherein transferring includes: i. updating the first electronic exchange ledger to reflect the transfer of the fourth amount of the first digital asset out of the first customer exchange account; and ii. updating the second electronic interest account ledger to reflect the transfer of the fourth amount of the first digital asset into the first customer interest-bearing account; (f) transferring, by the digital asset exchange computer system, the fourth amount of the first digital asset from the first customer interest-bearing account to a first customer intermediary account associated with the first customer and the first digital asset held by the first intermediary on behalf of the first customer, wherein transferring incudes: i. updating the second electronic interest account ledger to reflect the transfer of the fourth amount of the first digital asset out of the first customer interest-bearing account; ii. generating, by the digital asset exchange computer system, a first transfer message to transfer at least a portion of the fourth amount of the first digital asset, wherein the first transfer message includes: 1. a first digital address associated with a first digital asset exchange private key associated with the first digital asset held by the digital asset exchange on behalf of the respective customer; 2. a second digital address associated with the first customer intermediary account; 3. instructions to transfer the at least a portion of the fourth amount of the first digital asset from the first digital address to the second digital address; and 4. a first digital signature associated with the first digital address; and ii. publishing, by the digital asset exchange computer system to the first blockchain network, the first transfer message, wherein the first plurality of geographically distributed computer systems in the first blockchain network implement the instructions to transfer the at least a portion of the fourth amount of the first digital asset from the first digital address to the second digital address; (g) determining, by the digital asset exchange computer system, a first interest payment amount for the first customer based at least on the respective interest information and the fourth amount of the first digital asset; (h) storing, by the digital asset exchange computer system, the first interest payment amount in the second electronic interest account ledger; (i) confirming, by the digital asset exchange computer system, receipt of the first interest payment amount at the first digital address; (j) updating, by the digital asset exchange computer system, the third electronic intermediary ledger to reflect the transfer of the first interest payment amount out of the first customer intermediary account; (k) updating, by the digital asset exchange computer system, the second electronic interest account ledger to reflect receipt of the first interest payment amount into the first customer interest-bearing account; (l) transferring, by the digital asset exchange, the first interest payment amount from the first customer interest-bearing account to the first customer digital exchange account, wherein transferring includes: i. updating the second electronic interest account ledger to reflect the transfer of the first interest payment amount out of the first customer interest-bearing account; and ii. updating the first electronic exchange ledger to reflect receipt of the first interest payment amount of the first digital asset into the first customer digital exchange account.

In embodiments, the first customer interest-bearing account is an omnibus account including deposits of the first digital asset associated with the plurality of customers.

In embodiments, the interest information includes a first sum amount of interest.

In embodiments, the first sum amount of interest is denominated in the first digital asset.

In embodiments, the first sum amount of interest is denominated in fiat.

In embodiments, the first sum amount of interest is denominated in a second digital asset.

In embodiments, the second digital asset is a stable value token.

In embodiments, the interest information includes a first interest rate.

In embodiments, the first interest rate is applicable for a first period of time.

In embodiments, the interest information includes a second interest rate.

In embodiments, the second interest rate is applicable for a second period of time.

In embodiments, at least a portion of the third amount of the first digital asset is loaned to third parties and the respective return information indicates a respective return to be provided to the respective customer for allowing loaning of the at least a portion of the third amount of the first digital asset.

In embodiments, at least a portion of the third amount of the first digital asset is traded on the digital asset exchange by a third-party associated with the first customer intermediary account and the respective return information indicates a respective return amount to be provided to the respective customer for allowing trading of the at least a portion of the third amount of the first digital asset.

In embodiments, the respective return information includes a first return amount.

In embodiments, the first return amount is denominated in the first digital asset.

In embodiments, the first return amount is denominated in a second digital asset.

In embodiments, the first return amount is denominated in fiat.

In embodiments, the respective return amount is based on a respective return rate.

In embodiments, the respective return rate includes a first return rate for a third period of time.

In embodiments, the respective return rate includes a second return rate for a fourth period of time.

In embodiments, the first interest rate is based on the respective return rate.

In embodiments, the respective return information includes a return payment schedule indicating when disbursements of the respective return amount are to be made to the respective customer.

In embodiments, the return payment schedule indicates disbursements to be made periodically.

In embodiments, the return payment schedule indicates disbursements to be made aperiodically.

In embodiments, the one or more databases further includes a fourth electronic reserve ledger associated with the first digital asset, including, for each customer of the plurality of customers, respective reserve account information associated with a first customer reserve account including a fifth digital asset balance associated with a fifth amount of the first digital asset held in the first customer reserve account.

In embodiments, at least two of the first electronic exchange ledger, the second electronic interest account ledger and the third electronic intermediary ledger are provided in a first database.

In embodiments, the fourth electronic reserve ledger is also provided in the first database.

In embodiments, at least two of the first electronic exchange ledger, the second electronic interest account ledger and third electronic intermediary ledger are provided in at least two different databases.

In embodiments, at least two of the first electronic exchange ledger, the second electronic interest account ledger and third electronic intermediary ledger and the fourth electronic reserve ledger are provided in at least two different databases.

In embodiments, the authenticating step includes associating the first customer access credentials with at least one of the first customer digital asset exchange account and the first customer interest-bearing account associated with the first customer.

In embodiments, the authenticating step includes associating the first customer access credentials with at least one of the first customer digital asset exchange account, the first customer interest-bearing account and the first customer reserve account associated with the first customer.

In embodiments, the method may comprise, after the authenticating step (b): (m) generating, by the digital asset exchange computer system, a first response, including: (1) customer identification information associated with the first customer; (2) the first digital asset account balance associated with the first customer, (3) a second digital asset interest account balance associated with the first customer; (4) a transfer option to transfer digital assets into the respective customer interest-bearing account associated with the first user; and (n) sending, by the digital asset exchange computer system to the first customer device, the first response.

In embodiments, the first response further includes respective interest information associated with the second digital asset interest account balance associated with the first customer.

In embodiments, the first request further comprises first source information associated with the first customer exchange account.

In embodiments, the first request further comprises first destination information associated with the first customer interest-bearing account.

In embodiments, the first source information includes a third digital address associated with the first blockchain network of the first digital asset and the first customer exchange account associated with the first customer.

In embodiments, the third digital address is associated with an omnibus account associated with a plurality of customers of the digital asset exchange.

In embodiments, the third digital address is associated with a segregated account associated with the first customer.

In embodiments, the first destination information includes the first digital address associated with the first blockchain network and the first customer interest-bearing account associated with the first customer.

In embodiments, the first digital address is associated with an omnibus account associated with a plurality of customers of the digital asset exchange.

In embodiments, the first digital address is associated with a segregated account associated with the first customer.

In embodiments, the verifying step further includes confirming an identification of the first customer based on the user identification information.

In embodiments, the method may comprise, after the transferring step (e): (i) calculating a reserve amount of the first digital asset based on at least one reserve requirement and the fourth amount of the first digital asset; (ii) updating the fourth electronic reserve ledger to reflect transfer of the reserve amount of the first digital asset to the first customer reserve account; and (iii) updating the second electronic interest account ledger to reflect transfer of the fourth amount of the first digital asset less the reserve amount of the first digital assert into the first customer interest-bearing account.

In embodiments, the transferring step (e) includes: (i) generating, by the digital asset exchange computer system, a second transfer message including instructions to transfer the fourth amount of the first digital asset from the third digital address to the first digital address; (ii) publishing, by the digital asset exchange computer system to the first blockchain network, the second transfer message, wherein the first plurality of geographically distributed computer systems in the first blockchain network implement the instructions to transfer the fourth amount of the first digital asset from the third digital address to the first digital address.

In embodiments, the transferring step (f) includes: (i) calculating a reserve amount of the first digital asset based on at least one reserve requirement and the fourth amount of the first digital asset, wherein the reserve amount is less than the fourth amount of the first digital asset, wherein the first transfer message further includes: 5. a fourth digital address associated with a first customer reserve account associated with the first customer; 6. instructions to transfer the at least a portion of the fourth amount of the first digital asset less the reserve amount of the first digital asset from the first digital address to the second digital address; 7. instructions to transfer the reserve amount of the first digital asset from the first digital address to the fourth digital address; and wherein the first plurality of geographically distributed computer systems in the first blockchain network implement the instructions to transfer the reserve amount of first digital asset from the first digital address to the fourth digital address.

In embodiments, the second digital address is associated with a smart contract.

In embodiments, the method may comprise after the transferring step (e): (i) calculating a reserve amount of the first digital asset based on at least one reserve requirement and the fourth amount of the first digital asset; (ii) generating, by the digital exchange system, a second transfer message to transfer the reserve amount of the first digital asset from the first customer interest-bearing account to a first customer reserve account, wherein the second transfer message includes: 1. the first digital address; 2. a fourth digital address associated with the first customer reserve account associated with the first customer; 3. instructions to transfer the reserve amount of the first digital asset from the first digital address to the fourth digital address; and 4. a second digital signature associated with the first digital address; and (iii) publishing, by the digital asset exchange computer system to the first blockchain network, the second transfer message, wherein the first plurality of geographically distributed computer systems in the first blockchain network implement the instructions to transfer the reserve amount of first digital asset from the first digital address to the fourth digital address.

In embodiments, the authenticating step (b) further comprises: (1) receiving, by the digital asset exchange computer system from the first user device, an authentication request including the first user credential information associated with the first user; (2) determining, by the digital asset exchange computer system, that the first user device is authorized to access the digital asset exchange computer system based at least in part on the first user credential information; (3) generating, by the digital asset exchange computer system, first machine-executable instructions including first graphical user interface information associated with a first graphical user interface; (4) transmitting, from the digital asset exchange computer system to the first user device, the first machine-executable instructions; wherein, upon execution of the first machine-executable instructions, the first user device displays a first graphical user interface on a display associated with the first user device.

In embodiments, the determining step includes determining the first interest payment amount based on the first sum amount of interest.

In embodiments, the determining step includes determining the first interest payment amount based on the first interest rate and a fifth period of time that the fourth amount of the first digital asset is held in the first customer interest-bearing account.

In embodiments, the first interest rate is used when the fifth period of time that the fourth amount of the first digital asset has been held in the first customer interest-bearing account falls within the first period of time, and wherein the second interest rate is used when the fifth period of time that the fourth amount of the first digital asset has been held in the first customer interest-bearing account falls within the second period of time.

In embodiments, the step of determining the first interest payment amount includes determining a gross interest payment and subtracting a reserve withholding amount based on the fifth digital asset balance.

In embodiments, the determining step further includes determining a second interest payment amount for the first customer based on respective interest information associated with a sixth amount of the first digital asset in the first customer interest-bearing account associated with the first customer that does not include the fourth amount of the first digital asset.

In embodiments, the second interest payment amount is based on a second interest sum amount.

In embodiments, the second interest sum amount is the same as the first interest sum amount.

In embodiments, the second interest sum amount is different from the first interest sum amount.

In embodiments, the second interest payment amount is based on a third interest rate and a sixth period of time that the sixth amount of the first asset is held in the first customer interest-bearing account.

In embodiments, the first interest payment amount is associated with the fourth amount of the first digital asset.

In embodiments, the first interest payment amount is included in the interest information associated with the first customer interest-bearing account associated with the first customer.

In embodiments, the second interest payment amount is stored in the second electronic interest account ledger and associated with the first customer.

In embodiments, the second interest payment amount is included in the interest information associated with the first customer interest-bearing account associated with the first customer.

In embodiments, the first interest payment amount and the second interest payment amount are added together to provide a first total return and stored in the second electronic interest account ledger.

In embodiments, the method may further comprise, prior to step (i) receiving, in the first customer interest-bearing account, the first total return from the first customer intermediary account.

In embodiments, the step of determining the first interest payment amount is based at least on the respective interest information associated with the fourth amount of the first digital asset and the first total return, wherein the first interest payment amount is at least a portion of the first total return.

In embodiments, steps (g)-(l) are performed based on a payment schedule.

In embodiments, the payment schedule indicates that interest payments are to be made periodically.

In embodiments, the payment schedule indicates that interest payments are to be made aperiodically.

In embodiments, the payment schedule indicates that interest payments are made based on receipt, by the first customer interest-bearing account, of a return from the first customer intermediary account.

In embodiments, the payment schedule indicates that the interest payment is made upon a request received from the first customer.

In embodiments, the step of determining the first interest payment amount includes determining when to disburse the second interest payment amount based on a payment schedule.

In embodiments, the payment interest schedule indicates payment of the second interest payment amount with the first interest payment.

In embodiments, the payment schedule indicates that the second interest payment amount is to be paid periodically.

In embodiments, the payment schedule indicates that the second interest payment amount is to be paid aperiodically.

In embodiments, the payment schedule indicates that the second interest payment amount is to be paid based on receipt in the first customer interest-bearing account, a return from the first customer intermediary account.

In embodiments, the payment schedule indicates the second interest payment amount is to be paid upon a request received from the first customer.

In embodiments, the transferring step (l) includes: (i) generating a third transfer message including instructions to transfer a seventh amount of the first digital asset including the first interest payment amount of the first digital asset from the first digital address to the third digital address and a third digital signature associated with the first digital address; and (ii) publishing, by the digital asset exchange computer system to the first blockchain network, the third transfer message, wherein the first plurality of geographically distributed computer systems in the first blockchain network implement the instructions to transfer the first interest payment amount of the first digital asset from the first digital address to the third digital address.

In embodiments, the seventh amount of the first digital asset is the same as the first interest payment amount.

In embodiments, the seventh amount of the first digital asset includes at least a portion of the first interest payment amount.

In embodiments, the seventh amount of the first digital asset includes a second interest payment amount.

In embodiments, the first interest payment amount is denominated in a second digital asset.

In embodiments, the second digital asset is maintained on a second distributed public transaction ledger in the form of a second blockchain by a second plurality of geographically distributed computer systems in a second blockchain network.

In embodiments, the second distributed public transaction ledger is the same as the first distributed public transaction ledger.

In embodiments, the second distributed public transaction ledger is different than the first distributed public transaction ledger.

In embodiments, the method may further comprise a fifth electronic exchange ledger associated with the second digital asset including, for each customer of the plurality of customers of the digital asset exchange, second exchange account information associated with the first customer exchange account including a third respective digital asset account balance associated with a first amount of the second digital asset held in the first customer exchange account that is available for transfer via the digital asset exchange.

In embodiments, the transferring step (l) includes updating the second electronic interest account ledger and the fifth electronic exchange ledger to reflect transfer of the first interest payment amount of the second digital asset from the first customer interest-bearing account to the first customer exchange account.

In embodiments, the transferring step (l) includes: (i) generating a fourth transfer message including instructions to transfer the first interest payment amount of the second digital asset from the first digital address to the third digital address and a fourth digital signature associated with the first digital address; and (ii) publishing, by the digital asset exchange computer system to the second blockchain network, the fourth transfer message, wherein the second plurality of geographically distributed computer systems in the second blockchain network implement the instructions to transfer the at least a portion of the fourth amount of the first digital asset from the first digital address to the third digital address.

In embodiments, the first interest payment amount is denominated in the first digital asset and the second digital asset.

In embodiments, the transferring step (l) includes: (i) updating the second electronic interest account ledger and the first electronic exchange ledger to reflect transfer of a first portion of the first interest payment amount associated with the first digital asset from the first customer interest-bearing account to the first customer exchange account; and (ii) updating the second electronic interest account ledger and the fifth electronic exchange ledger to reflect transfer of a second portion of the first interest payment amount associated with the second digital asset from the first customer interest-bearing account to the first customer exchange account.

In embodiments, the transferring step (l) further includes: (i) generating a fifth transfer message including instructions to transfer the first portion of the first interest payment amount of the first digital asset from the first digital address to the third digital address and the second portion of the first interest payment of the second digital asset from the first digital address to the third digital address and a fifth digital signature associated with the first digital address; and (ii) publishing, by the digital asset exchange computer system to the first blockchain network and the second blockchain network, the fifth transfer message, wherein the first plurality of geographically distributed computer systems in the first blockchain network implement the instructions to transfer the first portion of the first interest payment amount of the first digital asset from the first digital address to the third digital address and the second plurality of geographically distributed computer systems in the second blockchain network implement the instructions to transfer the second portion of the first interest payment amount of the second digital asset from the first digital address to the third digital address.

In embodiments, the one or more databases further including a sixth electronic fiat ledger associated with a first fiat, including, for each customer of the plurality of customers of the digital asset exchange, respective fiat account information associated with a respective customer exchange fiat account including a first respective fiat account balance associated with a first amount of the first fiat held in the respective customer exchange fiat account.

In embodiments, the transferring step (l) includes updating the sixth electronic fiat ledger to include the first interest payment amount of the first fiat in a first customer exchange fiat account associated with the first customer.

In embodiments, the one or more databases further include at least a seventh electronic intermediary ledger associated with a second intermediary, including, for each customer of the plurality of customers of the digital asset exchange, second respective intermediary account information associated with a second respective customer intermediary account including a fourth respective digital asset account balance associated with a sixth amount of the first digital asset held in a second respective customer intermediary account and respective return information.

In embodiments, a second customer intermediary account is associated with the first customer and the first digital asset held by the second intermediary on behalf of the first customer.

In embodiments, the first request includes intermediary selection information identifying at least one of the first intermediary and the second intermediary.

In embodiments, the transferring step (f) further includes: i. generating, by the digital asset exchange computer system, a sixth transfer message to transfer at least a second portion of the fourth amount of the first digital asset, wherein the sixth transfer message includes: 1. the first digital address; 2. a fifth digital address associated with the second customer intermediary account; 3. instructions to transfer the at least a second portion of the fourth amount of the first digital asset from the first digital address to the fifth digital address; and 4. a sixth digital signature associated with the first digital address; ii. publishing, by the digital asset exchange computer system to the first blockchain network, the sixth transfer message, wherein the first plurality of geographically distributed computer systems in the first blockchain network implement the instructions to transfer the at least a second portion of the fourth amount of the first digital asset from the first digital address to the fifth digital address.

In embodiments, the method further comprises updating, by the digital asset exchange computer system, the seventh electronic intermediary ledger to reflect the transfer of the first interest payment amount out of the second customer intermediary account.

In embodiments, the transferring step (e) includes at least one or more of: (1) transferring the fourth amount of the first digital asset from the first customer exchange account to the first customer interest-bearing account when the intermediary selection information identifies the first intermediary; (2) transferring the fourth amount of the first digital asset from the first customer exchange account to a second customer interest-bearing account associated with the first customer when the intermediary selection information identifies the second intermediary; and (3) updating, by the digital asset exchange computer system, the second electronic interest account ledger to reflect the transfer of the fourth amount of the first digital asset from the first customer exchange account to at least one of the first customer interest-bearing account and the second customer interest-bearing account.

In embodiments, the transferring step (e) further includes updating the second electronic interest account ledger to reflect the respective updated interest information associated with the fourth amount of the first digital asset transferred into the first customer interest-bearing account.

In embodiments, the first digital address is associated with a second digital asset exchange private key associated with the first digital asset held by the digital asset exchange on behalf of the respective customer.

In embodiments, the first digital address is associated with a plurality of digital asset exchange private keys associated with the first digital asset held by the digital asset exchange on behalf of the respective customer.

In embodiments, the first digital address may be associated with a plurality of digital signatures associated with a plurality of private keys.

In embodiments, the first digital address may be associated with a multi-party computing account.

BRIEF DESCRIPTION OF THE DRAWINGS

Exemplary embodiments of the present invention will be described with references to the accompanying figures, wherein:

FIG. 4 is a schematic diagram illustrating a digital asset exchange computer system in accordance with exemplary embodiments of the present invention;

FIGS. 5A-D, are flow charts of exemplary processes for providing interest on an amount of a digital asset in accordance with exemplary embodiments of the present invention;

FIG. 5A-1 is an exemplary flow chart illustrating the one or more databases operatively connected to a digital asset exchange computer system in accordance with exemplary embodiments of the present invention;

FIG. 5A-2 is an exemplary flow chart illustrating the information that may be included in the display of the graphical user interface of the first request in accordance with exemplary embodiments of the present invention;

FIG. 5A-3 is an exemplary screenshot illustrating information included in a response to the first request in accordance with exemplary embodiments of the present invention;

FIG. 5A-4 is an exemplary flowchart illustrating a more detailed example of the first smart contract instructions in accordance with exemplary embodiments of the present invention;

FIG. 5A-5 is an exemplary flow chart illustrating the one or more databases operatively connected to a digital asset exchange computer system in accordance with exemplary embodiments of the present invention;

FIG. 5A-6 is an exemplary flow chart of an exemplary process for receiving and verifying a request to transfer a digital asset into an interest-bearing account in accordance with exemplary embodiments of the present invention;

FIG. 5A-7 is an exemplary flow chart of an exemplary process for transferring digital assets into an interest-bearing account in accordance with exemplary embodiments of the present invention;

FIG. 5A-8 is an exemplary flow chart of an exemplary process for authenticating a user by a digital asset exchange computer system in accordance with exemplary embodiments of the present invention;

FIGS. 6A, 6B-1, 6B-2, 6B-3, and 6-C are exemplary diagrams illustrating exemplary graphical user interfaces in accordance with exemplary embodiments of the present invention;

FIG. 7A-1, FIG. 7A-2, and FIG. 7A-3 are exemplary flow charts of a process to set up an automatic payment in accordance with exemplary embodiments of the present invention;

FIG. 7B is an exemplary flow chart of a process to set up an automatic payment in accordance with exemplary embodiments of the present invention;

FIG. 7C and FIG. 7C-2 are exemplary flow charts of a process to set up an automatic payment in accordance with exemplary embodiments of the present invention;

FIG. 8A, FIG. 8B, and FIGS. 8C-1 through 8C-4 are exemplary flow charts of a process for loyalty rewards in accordance with exemplary embodiments of the present invention.

DETAILED DESCRIPTION

Overview

Figure 1:
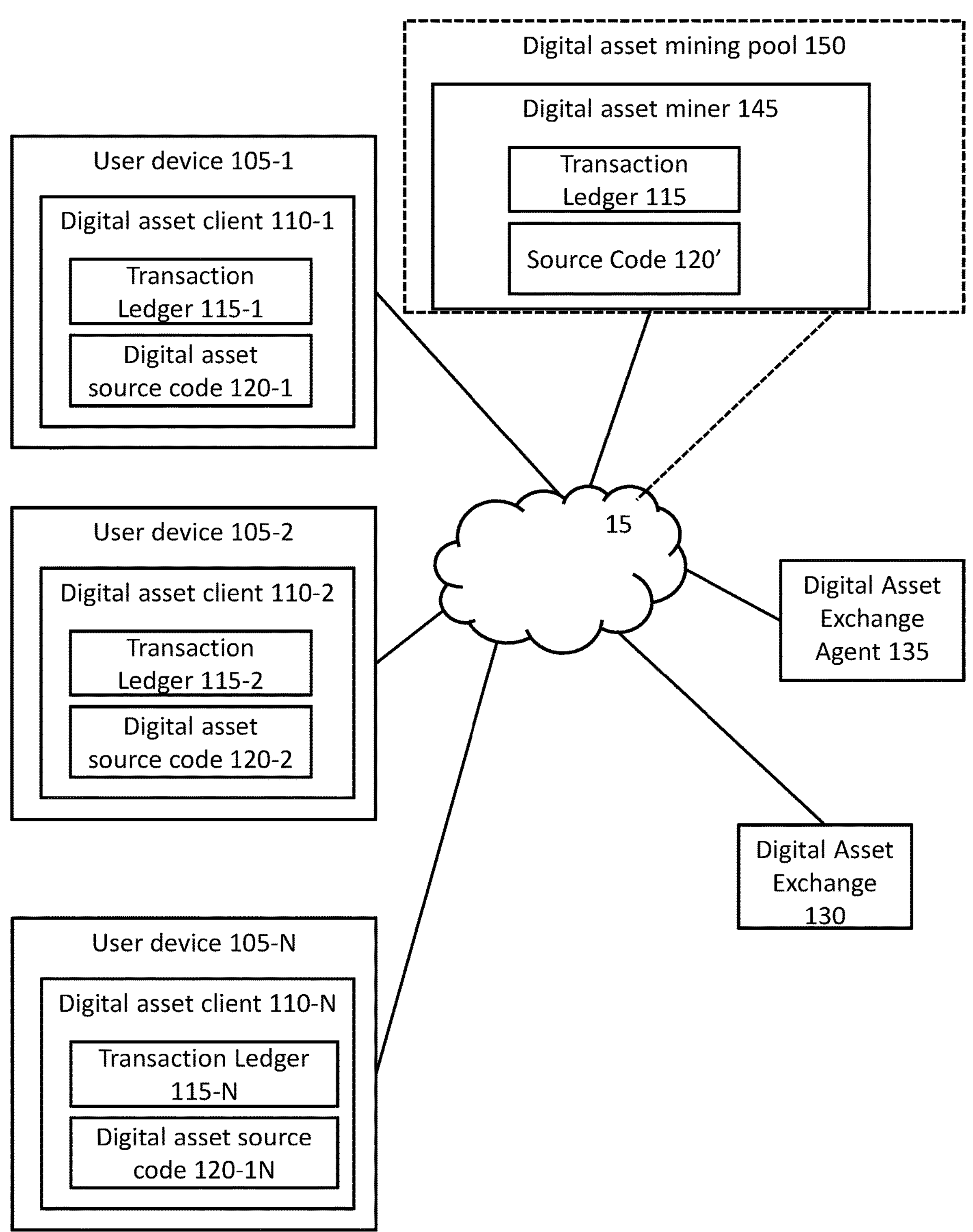
FIG. 1 is a schematic diagram of a conventional digital asset network.

Conventional digital asset exchanges have been established in which client's digital assets and/or fiat currencies are held by a digital asset exchange in custodial accounts. Since access to one or more private keys associated with the public address of the digital asset on a blockchain is a pre-requisite for executing any transaction. Lending digital assets to obtain interest presents unique technological challenges. More particularly, the technology needed to lend digital assets to obtain interest differs greatly from that of a conventional digital asset custodial account, because access to such digital assets is necessarily limited by access to the relevant private key(s).

The present invention provides various technical solutions to overcome these technical problems by enabling a digital asset exchange to provide interest to clients of the digital asset exchange, where such digital assets are kept on a blockchain using private keys to maintain a transaction with such digital assets. In embodiments, the present invention utilizes a unique and unconventional series of off-blockchain and on-blockchain transactions to enable a digital asset exchange computer system to obtain interest for digital assets held by the digital asset exchange in custodial accounts for clients of the digital asset exchange.

In an embodiment, the method and system of the present disclosure allow a user of the digital asset exchange to select at least a portion of the user's digital assets on deposit in a digital asset exchange account associated with one or more customers of the digital asset exchange to be transferred into an interest bearing digital asset account associated with one more customers of the digital asset exchange wherein the digital assets earn interest. In an embodiment, at least a portion of the digital assets in the interest bearing digital asset account are transferred from the interest bearing digital asset account to an intermediary digital asset account associated with one or more customers of the digital asset exchange. In an embodiment, a return amount of digital assets is transferred from the intermediary digital asset account to the interest bearing digital asset account, which may include the portion of the digital assets transferred from the interest bearing digital asset account. Further details of the present invention are described below.

Digital Assets

A digital asset is a computer-generated asset that may be created using a mathematical and/or cryptographic protocol that may, among other things, be created, traded and/or stored in the context of a blockchain maintained on a peer-to-peer network. Often, a digital asset may be exchanged for value and/or may be used to buy and sell goods or pay for services. A digital asset may be a non-tangible asset that is not based upon a governmental rule, law, regulation, and/or backing.

There are different kinds of digital assets consistent with embodiments of the present invention. By way of example, digital assets may be in the form of a native or underlying digital asset supported by its own digital asset network (e.g., BITCOIN is supported by the BITCOIN Network, ETHER is supported by the ETHEREUM Network, NEO supported by the NEO Network, etc.). Such native or underlying digital assets are issued directly by the underlying blockchain protocol on which it runs, and they may be traded, utilized as a medium of exchange, and/or used as a store of value, to name a few.

Digital assets may also be in the form of "digital asset tokens" or "tokens," which, like other digital assets can represent anything from loyalty points to vouchers and IOUs to actual objects in the physical world. A token is generated by a "smart contract," like an ERC-20, ERC-720 or ERC-721 smart contract, to name a few, running on top of an underlying blockchain network (such as the ETHEREUM Blockchain, the EOS Blockchain, the TRON Blockchain, the NEO Blockchain, the IOST Blockchain, the ONTOLOGY Blockchain, to name a few). A smart contract may be a computer protocol intended to digitally facilitate, verify, or enforce the negotiation or performance of credible transactions without third parties. As such, in embodiments, it is a set of code that describes the behavior of the token with an associated database, which may be a table with rows and columns tracking who owns how many tokens. In embodiments, the database may be maintained by an issuer (or some other administrator). In embodiments, the database may be maintained on a sidechain. A sidechain, in embodiments, may refer to a portion of a distributed transaction ledger maintained off-blockchain, but periodically or aperiodically updated to the blockchain. For example, an administrator, user, and/or trusted entity may maintain a portion of the distributed transaction ledger and/or an electronic copy of a portion of the distributed transaction ledger. A trusted entity in embodiments, and as used herein, may refer to one or more of: a digital asset exchange, a portal (e.g., MasterCard, Visa, etc.), an administrator, and/or a custodian, to name a few. In embodiments, a token may also be associated with a series of smart contracts running on the same underlying network, such as GEMINI DOLLAR token running on the ETHEREUM network.

In embodiments, a digital asset token may be a utility token (such as FILECOIN), a stable value token (such as GEMINI DOLLAR, PAXG, EFIL, EDOT, RXTZ, EATOM, to name a few), and/or a security token (such as a token associated with a security, e.g., APPLE stock, IBM stock, to name a few), to name a few.

A digital asset token may come in the form of a fungible token or non-fungible token. Fungibility is the attribute of being mutually interchangeable. Fungibility occurs when a good or service represented by an asset, an asset, or units of an asset are indistinguishable from each other, and so can be interchanged with each other. BITCOIN, for example, is fungible; one BITCOIN is the same as any other BITCOIN with regards to the goods or services it represents.

Non-fungibility means that a specific asset is distinguishable or unique from another asset that is similar in nature. A non-fungible token (NFT) is a specialized type of digital asset token that operates within a blockchain platform and is not interchangeable with any related asset. NFT's are typically indivisible and cannot be divided or altered in any way. NFT's may be created via smart contract technology utilizing, e.g., the ERC-721 token standard. Early examples of NFTs include CRYPTOPUNKS, CRYPTOKITTIES, CURIOUCARDS, and DADA.NYC, to name a few. Other examples of non-fungible tokens include SORARE, DECENTRALAND (and MANA), GODS UNCHAINED, and MY CRYPTO HEROS, to name a few.

Non-fungible tokens can be used in blockchain based gaming (e.g., SANDBOX), or to represent digital and real-world assets like artwork (such as a 2018 auction by Christies' New York to register art by Edward Hopper and Georgia O'Keefe, among others on a blockchain), digital and real-world real-estate, collectibles (e.g., CRYPTOKITTIES), and personal identity, to name a few. In addition to "non-fungibility", non-fungible tokens also may include characteristics such as "rarity" and "indivisibility" characteristics. Rarity reflects the scarcity of each NFT, for example, there may be only one or a limited number (e.g., 5, 10, 50, 100, to name a few) of each unique NFT. While often other forms of digital assets, like BITCOIN, may be divisible into smaller units (e.g., a Satoshi, which is a one-hundred-millionth of a BITCOIN), typically each NFT is transferred, e.g., bought and sold, as an undivided, whole unit. In the context of blockchain gaming, an NFT can include characteristics such as evidencing ownership, provable scarcity, interoperability and/or immutability, to name a few.

Digital Asset Network

As noted briefly above, a digital asset may be based on an open source mathematical and/or cryptographic protocol. The protocol may exist on a digital asset network, such as a BITCOIN network or an ETHEREUM network. The network may be centralized, e.g., run by one or more central servers, or decentralized, e.g., run through a peer-to-peer network. Digital assets may be maintained, tracked, and/or administered by the network.

An exemplary embodiment of a conventional digital asset network is illustrated in FIG. 1. In embodiments, other digital assets can be maintained and/or administered by other digital asset networks. Without meaning to limit the invention, a digital asset network will be discussed with reference to a BITCOIN network by example. Of course, other digital asset networks, such as the ETHEREUM network, can be used with embodiments of the present invention.

A digital asset network, such as a BITCOIN network, may be an online, end-user to end-user network hosting a public transaction ledger 115 (e.g., Transaction Ledger 115-1, Transaction Ledger 115-2, Transaction Ledger 115-N, etc.) and governed by source code 120 comprising cryptologic and/or algorithmic protocols. The public transaction ledger 115 may be saved in the form of a blockchain. A digital asset network can comprise a plurality of end users, 1, 2 . . . . N, each of which may access the network using one or more corresponding user devices 105-1, 105-2, . . . 105-N. In embodiments, user devices 105 may be operatively connected to each other through a data network 15, such as the Internet, a wide area network, a local area network, a telephone network, dedicated access lines, a proprietary network, a satellite network, a wireless network, a mesh network, or through some other form of end-user-to-end-user interconnection, which may transmit data and/or other information. Any participants in a digital asset network may be connected directly or indirectly, as through the data network 15, through wired, wireless, or other connections.

In the exemplary embodiment, still referring to FIG. 1, each user device 105 can run a digital asset client 110, e.g., a BITCOIN client, which can comprise digital asset source code 120 and an electronic transaction ledger 115. The source code 120 can be stored in processor readable memory, which may be accessed by and/or run on one or more processors. The electronic transaction ledger 115 can be stored on the same and/or different processor readable memory, which may be accessible by the one or more processors when running the source code 120. In embodiments, the electronic transaction ledger 115-1 (contained on a user device 105-1) should correspond with the electronic transaction ledgers 115-2 . . . 115-N (contained on user devices 105-2 . . . 105-N), to the extent that the corresponding user device has accessed the Internet and been updated (e.g., downloaded the latest transactions). Accordingly, the electronic transaction ledger may be a public ledger. Exemplary embodiments of digital asset clients 110 for the BITCOIN network (BITCOIN clients) include Bitcoin-Qt and Bitcoin Client, to name a few. In embodiments, some of the transactions on the public ledger may be encrypted or otherwise shielded so that only authorized users may access ledger information about such transactions or clients.

In addition, a digital asset network, such as a BITCOIN network, may be operatively connected to one or more digital asset exchanges 130, such as BITCOIN exchanges (e.g., Gemini, and/or Coinbase, to name a few). Digital asset exchanges may enable or otherwise facilitate the transfer of digital assets, such as BITCOIN, and/or conversions involving digital assets, such as between different digital assets (e.g., BITCOIN for ETHEREUM) and/or between a digital asset and non-digital assets, currencies (e.g., BITCOIN for U.S. Dollar), to name a few. The digital asset network may also be operatively connected to one or more digital asset exchange agents 135, e.g., a BITCOIN exchange agent. Exchanges 130 may interface with financial institutions (e.g., banks) and/or digital asset users. Like the user devices 105, digital asset exchanges 130 may be connected to the data network 15 through wired, wireless, or other connections. They may be connected directly and/or indirectly to each other and/or to one or more user device 105 or other entities participating in the digital asset system. It will be appreciated that other participants in a digital asset network can participate although not expressly shown in FIG. 1 or otherwise described without departing from the letter and intent of the present invention.

In embodiments, the creation and transfer of digital assets can be based on an open source mathematical and/or cryptographic protocol, which may not be managed by any central authority. In typical embodiments, one or more private keys are needed to transfer or prevent transfer of digital assets on a blockchain. For example, digital assets may be associated with a digital asset account, which may be identified by a digital asset address. A public key may be generated from a private key, e.g., using a cryptographic protocol, such as the Elliptic Curve Digital Signature Algorithm ("ECDSA"). A digital asset account can comprise at least one public key and at least one private key, e.g., based on a cryptographic protocol associated with the particular digital asset system. A public address may be generated using one or more private keys.

Digital assets can be transferred between one or more users or between digital asset accounts and/or storage devices (e.g., digital clients) associated with a single user, through a network, such as the Internet, via a computer, smartphone, or other electronic device without an intermediate financial institution, by using the associated one or more private keys. In embodiments, a single digital asset transaction can include amounts from multiple origin accounts transferred to multiple destination accounts. Accordingly, a transaction may comprise one or more input amounts from one or more origin digital asset accounts and one or more output amounts to one or more destination accounts. Origin and destination may be merely labels for identifying the role a digital asset account plays in a given transaction; origin and destination accounts may be the same type of digital asset account. In a typical digital asset transaction involving a blockchain, a message is sent identifying a source account, one or more destination accounts, an amount to be transferred, and in some cases other message information. In some networks, other message information could be instructions to generate a smart contract and/or instructions to interact with a smart contract.

Referring again to FIG. 1, a digital asset network may include digital asset miners 145 (or other forms of validators). In the case of a traditional BITCOIN Network, digital asset miners 145 may perform operations associated with generating or minting new digital assets, and/or operations associated with confirming transactions, to name a few. Digital asset miners 145 may collaborate in one or more digital asset mining pools 150, which may aggregate power (e.g., computer processing power) so as to increase output, increase control, increase likelihood of minting new digital assets, increase likelihood of adding blocks to a blockchain, to name a few.

In embodiments, the processing of digital asset transactions, e.g., BITCOIN transactions, can be performed by one or more computers over a distributed network, such as digital asset miners 145, e.g., BITCOIN miners, and/or digital asset mining pools 150, e.g., BITCOIN mining pools (which may include a plurality of digital asset miners 145), or other validators depending upon the digital asset network. At times, a fee may need to be paid to a digital asset miner 145 and/or digital asset mining pool 150 and/or other validator to ensure that a digital asset transaction is processed as part of a blockchain.

In embodiments, ledgers may be used to archive transactions. In addition to archiving transactions, new addition to a ledger can create or reflect the creation of one or more newly minted digital assets, such as BITCOIN, or a token, such as GEMINI DOLLAR.

Different approaches are possible for reaching consensus on confirming transactions, creating new assets and/or other functions to be performed on a blockchain and/or part of a blockchain network. In embodiments, a digital asset network may employ, for example, a consensus algorithm to provide a method for verifying transaction, creating new assets, and determining whether and how to improve the blockchain, to name a few. In embodiments, such a consensus algorithm may utilize, for example, a proof of work (e.g., solving calculations, to name a few), a proof of stake (e.g., ownership of a percentage of assets, to name a few), a hybrid of proof of work and proof of stake, a proof of stake velocity system (e.g., ownership of a percentage of assets as a linear and/or an exponential function of time, to name a few), and/or a proof of burn (e.g., destroying assets), from blockchain participants in order to determine consensus.

Digital Asset Exchange

Figure 2:
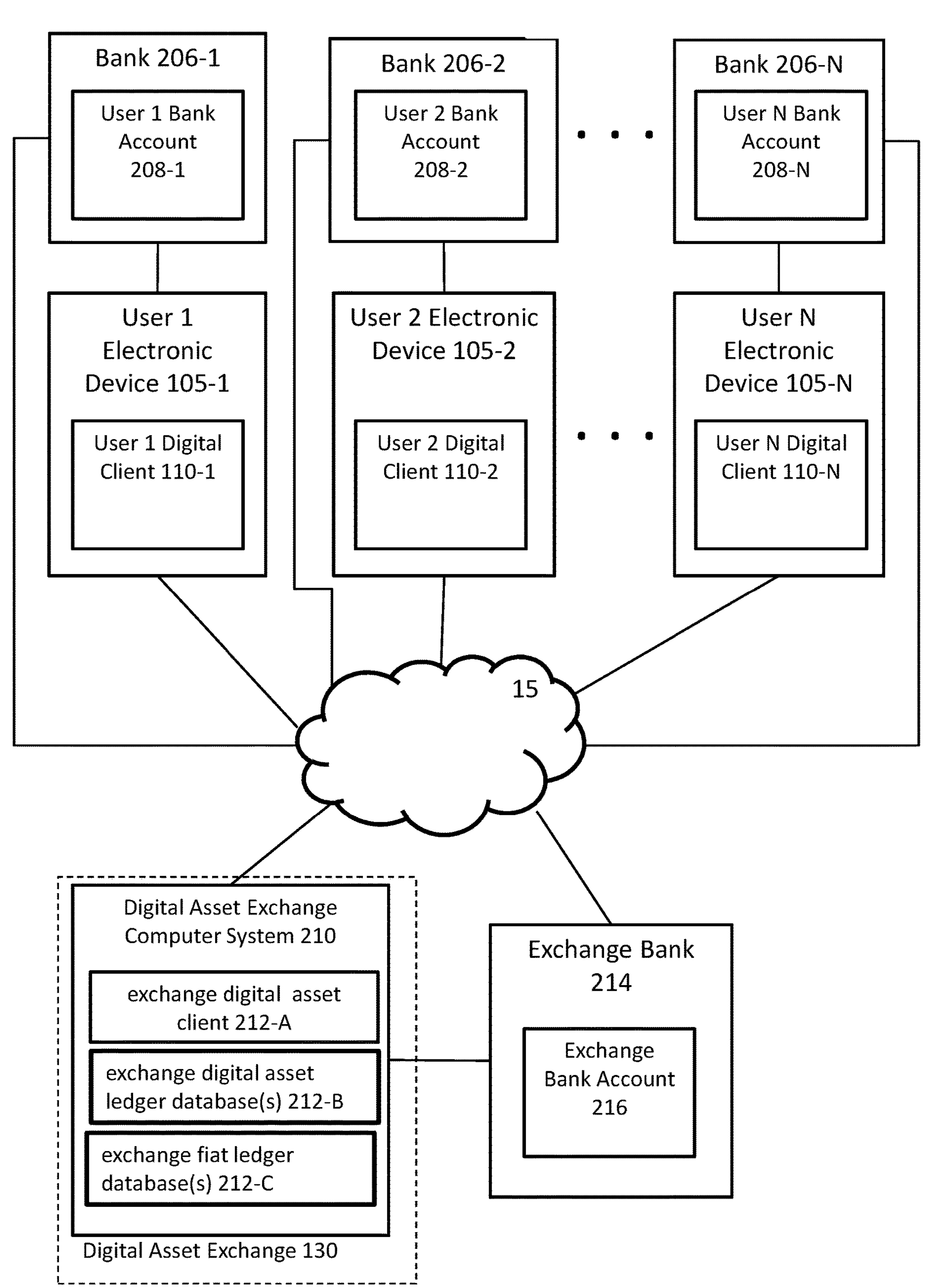
FIGS. 2 and 3 are schematic diagrams illustrating exemplary participants in a conventional system employing a digital asset exchange.

FIG. 2 is a schematic diagram illustrating exemplary participants in a digital asset exchange system suitable for use with the system and method of the present disclosure. In a conventional digital asset exchange 130, one or more customers of the exchange (e.g., User 1, User 2, User 3, etc.) connect via a network 15 (e.g., the Internet, a local area network, a wide area network, etc.) to a digital asset exchange computer system 210, using respective one or more user electronic devices 105 (e.g., 105-1, 105-2, . . . , 105-N), such as computers, laptops, tablet computers, televisions, mobile phones, smartphones, and/or PDAs, etc. Typically, each user may also have user bank accounts 208 held at one or more corresponding banks 206 (e.g., User 1 will have a User 1. Bank Account 208-1 at Bank 208-1, User 2 will have User 2. Bank Account 208-2 at Bank 206-2, User 3 will have a User 3. Bank Account 208-1 at Bank 208-3, etc.), which in turn may be accessed by a corresponding user device (e.g., User 1 electronic device 105-1, User 2 electronic device 105-2, User 3 electronic device 105-3, etc.). In embodiments, a widget may be installed on a bank mobile app, which accesses an application programing interface (API) of one or more exchanges. Similarly, each user may (or may not) also maintain a digital client (e.g., User 1 digital client 110-1, User 2 digital client 110-2, User 3 digital client 110-3, etc.), either on their respective user electronic device (e.g., User 1 electronic device 105-1, User 2 electronic device 105-2, User 3 electronic-device 105-3, etc.) or in some cases off-line, to facilitate access to their respective bank accounts from a user electronic device 105 and/or from a digital client 110 or digital address associated therewith.

The participants may be connected directly and/or indirectly, such as through a data network 15, as discussed herein. Users of a digital asset exchange may be customers of the digital asset exchange, such as digital asset buyers and/or digital asset sellers. Digital asset buyers may pay fiat (e.g., U.S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few) in exchange for digital assets. Digital asset sellers may exchange digital assets for fiat or other digital assets.

Typically, the digital asset exchange computer systems 210 will track the users' respective digital assets in the one or more exchange digital asset ledger databases 212-B associated with the respective digital asset. For example, respective users' BITCOIN assets available for trading will be tracked in a BITCOIN exchange ledger. In turn, the respective digital assets themselves will be maintained in exchange digital clients that are controlled by the one or more private keys associated with each digital client.

Similarly, the digital asset exchange computer system 210 will track the users' respective fiat in one or more exchange fiat databases 212-C associated with the respective fiat. For example, respective users' U.S. Dollar assets available for trading will be tracked in a U.S. Dollar exchange ledger. In turn, the respective fiat will be maintained in one or more exchange bank accounts 216 in respective exchange bank(s) 214, that are typically held in the name of the digital asset exchange on behalf of its customers. A digital asset exchange 130 may have one or more bank accounts, e.g., bank account 216, held at one or more banks 214, such as exchange banks or exchange partner banks, which are banks associated with and/or in partnership with the digital asset exchange 130. In embodiments, exchanges may access other repositories for fiat currency. An exchange bank account 214 may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third-party. Upon receipt by the appropriate recipient of the requisite amount of digital assets, the digital asset exchange 130 may authorize the release of the fiat currency to the digital asset seller. In embodiments, an exchange may hold, e.g., as a custodian, fiat in bank accounts and digital assets in digital clients at associated digital asset addresses. In embodiments, instead of using bank accounts, other stable investment instruments such as money market mutual funds, treasury bills, CDs, low risk bonds, to name a few, may be used.

A digital asset exchange may have one or more digital asset exchange computer systems 210, which can include software running on one or more processors, as discussed herein, as well as computer-readable memory comprising one or more databases. A digital asset exchange 130 can include one or more exchange digital clients, e.g., digital client 212-A. Exchange digital client may be used to store digital assets in one or more denominations from one or more parties to a transaction. In embodiments, the exchange digital clients may store digital assets owned by the digital asset exchange 130, which may be used when an exchange is a counterparty to an exchange transaction, and which can allow exchange transactions to occur even when a buyer and a seller are not otherwise both available and in agreement on transaction terms. Typically, access to such exchange digital clients is controlled by one or more private keys.

Figure 3:
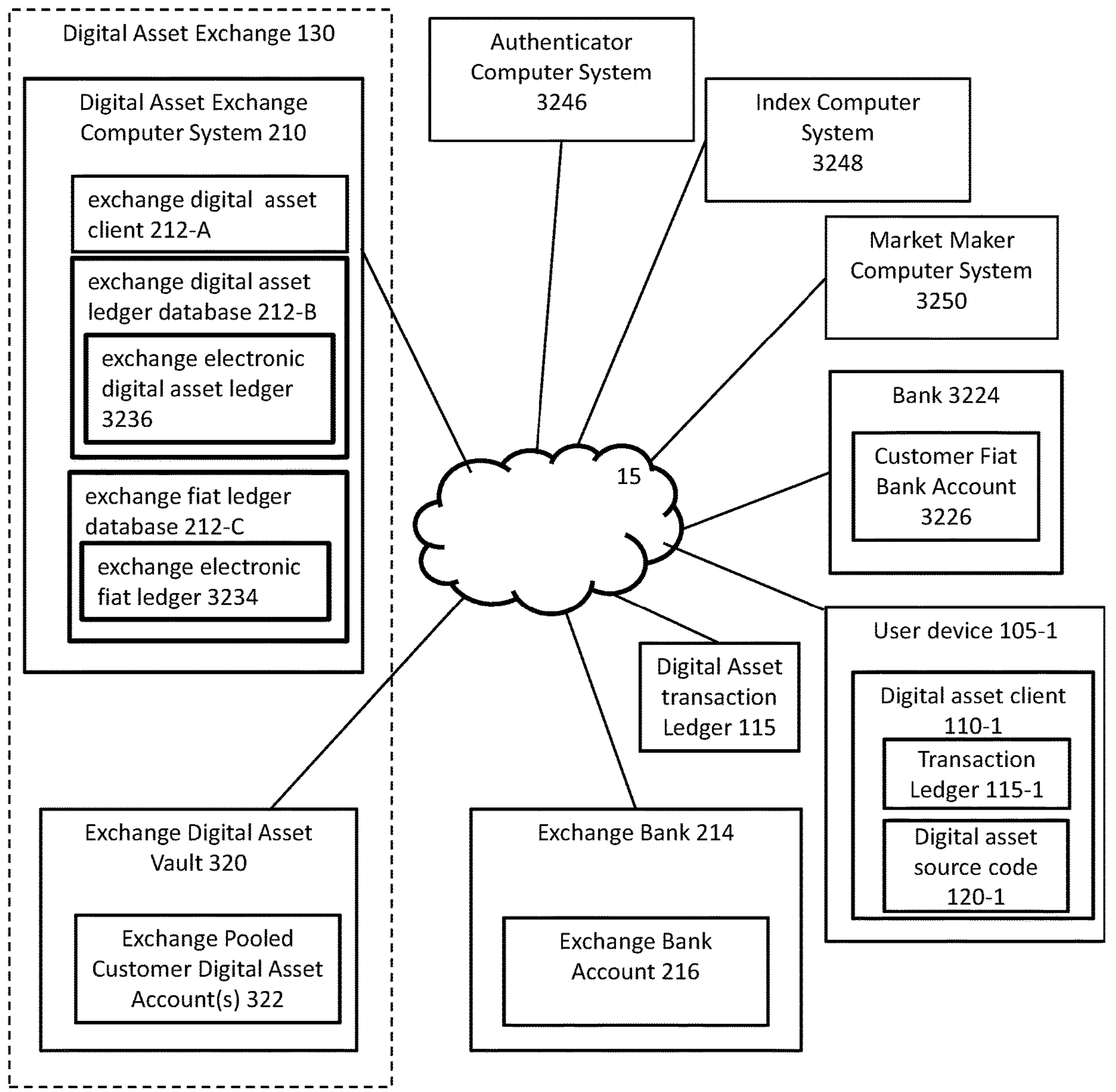

FIG. 3 is schematic diagram illustrating entities associated with a digital asset exchange in an exemplary embodiment of the present invention. Each entity may operate one or more computer systems. Computer systems may be connected directly or indirectly, such as through a data network (e.g., the Internet, a local area network, a wide area network, a proprietary network, to name a few). The digital asset exchange 130 may be associated with a digital asset exchange computer system 210, exchange digital asset clients 212-A, for example, associated with one or more digital asset addresses (e.g., BITCOIN clients, ETHEREUM clients, LITECOIN clients, to name a few), customer banks 3224 having customer fiat bank accounts 3226, a digital asset network transaction ledger 115 (e.g., the BITCOIN blockchain, the ETHEREUM blockchain, the LITECOIN blockchain, to name a few), a digital asset network (e.g., the BITCOIN network, the ETHEREUM network, the LITECOIN network, to name a few), one or more exchange customers using one or more customer user device 105 (e.g., 105-1), one or more exchange digital asset electronic ledger(s) 212-B one or more exchange digital asset vaults 320, one or more exchange fiat electronic ledger databases (s) 212-C, and one or more exchange partner banks 214, which can have exchange bank account(s) 216 for holding pooled customer fiat, to name a few. The exchange digital asset vaults 320 can store a plurality of digital asset clients, which may be pooled exchange customer digital asset accounts 322 with associated digital asset addresses. In embodiments, the digital asset exchange 130 may have one or more partner banks 214, each with one or more respective exchange bank account(s) 216. Such account(s) may be associated with insurance protection, such as FDIC insurance protection in the U.S. In embodiments, the digital asset exchange 130 may also communicate with an authenticator computer system 3246 (to authenticate users, e.g., using multi-factor authentication and/or comparisons to databases of flagged users, to name a few), an index computer system 3248 (e.g., for generating and/or providing a digital asset index, which may be a price index), and/or a market maker computer system 3250, to name a few. A market maker may be an exchange user, like a broker dealer or other entity, that provides liquidity for the digital asset exchange 130 by purchasing or selling digital assets.

The digital asset exchange 130 may employ an electronic ledger system to track customer digital assets and/or customer fiat holdings. Such a system may allow rapid electronic transactions among exchange customers and/or between exchange customers and the digital asset exchange 130 itself using its own digital asset and fiat holdings or those of its sponsor or owner. In embodiments, the electronic ledger system may facilitate rapid computer-based automated trading, which may comprise use by one or more computer systems of a trading API provided by the digital asset exchange 130. In embodiments, the electronic ledger system may also be used in conjunction with hot client digital asset security systems (e.g., where one or more private keys are maintained on a computer system that is immediately accessible), and/or cold storage digital asset security systems by the digital asset exchange 130 (e.g., where one or more private keys are maintained on a computer system that is off-line), to name a few. Fiat (e.g., USD) and digital assets (e.g., BITCOIN, ETHER, LITECOIN, to name a few) can be electronically credited and/or electronically debited from respective (e.g., fiat and digital asset) electronic ledgers.

Clearing of transactions may be recorded nearly instantaneously on the electronic ledgers. Deposits of fiat with the digital asset exchange 130 and withdrawals from the digital asset exchange 130 may be recorded on the exchange electronic fiat ledger 3234, which may be provided in the exchange electronic fiat ledger database 212-C, while deposits and withdrawals of digital assets may be recorded on the exchange electronic digital asset ledger 3236, which may be provided in the exchange digital asset ledger database 212-B. Electronic ledgers may be maintained using one or more computers operated by the digital asset exchange 130, its sponsor and/or agent, and stored on non-transitory computer-readable memory operatively connected to such one or more computers. In embodiments, electronic ledgers can be in the form of a database.

Interest on Digital Assets

As noted briefly above, conventional digital asset exchanges face technical challenges due to the technical implementation of conventional custodial accounts held at digital asset exchanges. In particular, it had not been possible to loan out digital assets from custodial accounts in order to obtain interest or some other form of return on unused or idle digital assets on deposit, because access to one or more private keys associated with the public address of the digital asset on a blockchain is a pre-requisite to perform a transaction with such digital assets. Specifically, there had not been a way to provide access to the digital asset while also providing a return on top of the digital asset. The present invention offers various technical solutions as illustrated herein to this technical problem.

In embodiments, the digital asset exchange 130 may provide an option for customers to transfer an amount of a first digital asset on deposit with the digital asset exchange in one or more digital asset exchange accounts associated with the customers of the digital asset exchange into one or more customer interest bearing accounts associated with the customers of the digital asset exchange. In embodiments, at least a portion of the digital assets provided in the one or more customer interest bearing accounts may be transferred to one or more customer intermediary accounts associated with the first digital asset held by a third-party institution (e.g., an intermediary) on behalf of the respective one or more users in order to earn interest on one or more digital assets. Third-party institutions, or intermediaries, in embodiments, may include one or more of the following: banks, credit unions, registered investment advisors, broker-dealers, brokerage institutions, asset managers, alternative trading systems, "DeFi" smart contracts, trust companies, retirement programs, additional institutions providing interest-bearing accounts (insured or not insured) or other investment accounts (e.g., money fund, exchange traded fund, etc.), other financial institutions or intermediaries, and/or a combination thereof, to name a few. Additional institutions may include, by way of example, institutions holding, managing, and/or providing cash management vehicles and/or cash management accounts, such as demand deposit accounts (DDAs), money market deposit accounts (MMDAs), negotiable order of withdrawal accounts (NOWs) accounts, CDs, stable value funds, credit interest programs, to name a few. In embodiments, the one or more customer intermediary accounts may be one or more third-party omnibus digital exchange accounts associated with the first digital asset and the respective third-party institution or intermediary. In embodiments, intermediaries may be separate but related entities to the digital asset exchange.

In embodiments, the third-party institution or intermediary may lend the one or more digital assets received by the one or more customer intermediary accounts to one or more borrowers. The third-party institution or intermediary, in embodiments, may make one or more interest payments or otherwise provide for a return as a percentage of the one or more digital assets transferred to the respective customer interest-bearing account after one or more periods of time (e.g., an investment of 100 BITCOIN at a 10 percent rate may return 10 BITCOIN after a period of 3 months) to the digital asset exchange 130 and/or the one or more customer interest-bearing accounts. In embodiments, the digital asset exchange 130 may transfer a portion or all of the interest payments from the one or more customer intermediary accounts to the one or more customer interest-bearing accounts (e.g., the 10 BITCOIN minus one or more fees). In embodiments, the third-party institution or intermediary may continue to make payments or provide returns to the digital asset exchange 130 or to the one or more customer interest-bearing accounts until a predetermined amount of time elapses (e.g., one payment over the predetermined amount of time, two payments over the predetermined amount of time . . . n payments over the predetermined time, to name a few). In embodiments, the third-party institution or intermediary may return the original investment (alternatively, the original investment minus one or more fees) to the digital asset exchange 130 or the one or more customer interest-bearing accounts, which may return a portion or all of the original investment to the one or more users (e.g., the 10 BITCOIN minus one or more fees). In embodiments, the digital asset exchange 130 may use the return received from the one or more customer intermediary accounts to pay an amount of interest to the one or more customer interest-bearing accounts. In embodiments, the digital asset exchange 130 may make periodic or aperiodic interest payments to the one or more customer interest-bearing accounts until a predetermined amount of time elapses (e.g., daily, weekly, twice a month, once a month, one a year, to name a few).

In embodiments, the third-party institution or intermediary may provide only one payment to the digital asset exchange 130 or the one or more interest-bearing accounts (i.e., for the purposes of this example, only one payment from the third-party to the digital asset exchange 130). The one payment, in embodiments, may include the interest payment amount and/or the original investment (or minus the one or more fees), to name a few. In embodiments, as described in the above example, the third-party institution or intermediary may provide one or more payments to the digital asset exchange 130 or the one or more customer interest-bearing accounts, and the one or more payments may include one or more of the following: one or more interest payments, a portion of the original investment, the original investment, and/or a combination thereof, to name a few. In embodiments, one or more third-party institutions associated with the digital asset exchange 130 may hold one or more of the following account types: single accounts, certain retirement accounts, joint accounts, revocable trust accounts, irrevocable trust accounts, employee benefit plan accounts, municipalities, corporations, non-profits, individuals, partnerships, retirement accounts, pension accounts, and/or a combination thereof, to name a few. The interaction and transfer of digital assets between the customer digital asset account, the customer interest bearing accounts and the customer intermediary account and return of digital assets back to the customer interest bearing account to provide interest payments to the customer provides the technical solution to the technical problem presented in conventional digital asset exchanges.

In embodiments, a digital asset exchange computer system 400 (see FIG. 4, for example) may hold customer fiat currency and/or digital assets in centralized, pooled accounts or wallets. As discussed herein, the exchange computer system 400 may maintain an electronic ledger to record transactions among users of the exchange, for example the digital asset exchange 130. A separate exchange fiat ledger database 412 and an exchange digital asset ledger database 410 may also be maintained. In embodiments, the exchange fiat ledger database 412 may include one or more electronic fiat ledgers. In embodiments, the exchange digital asset ledger database 410 may include one or more electronic digital asset ledgers. The electronic ledgers may be electronically updated to reflect pending transactions and/or completed transactions, which may involve debiting assets from a user's account and/or crediting assets to a user's account. Broadcast to a digital asset network and confirmation from a digital asset network may not be performed for transactions within the exchange, e.g., transactions between a digital asset seller selling digital assets that are stored by the exchange and a buyer paying with fiat currency that is held in an exchange bank account, such as a pooled account.

Figure 4:
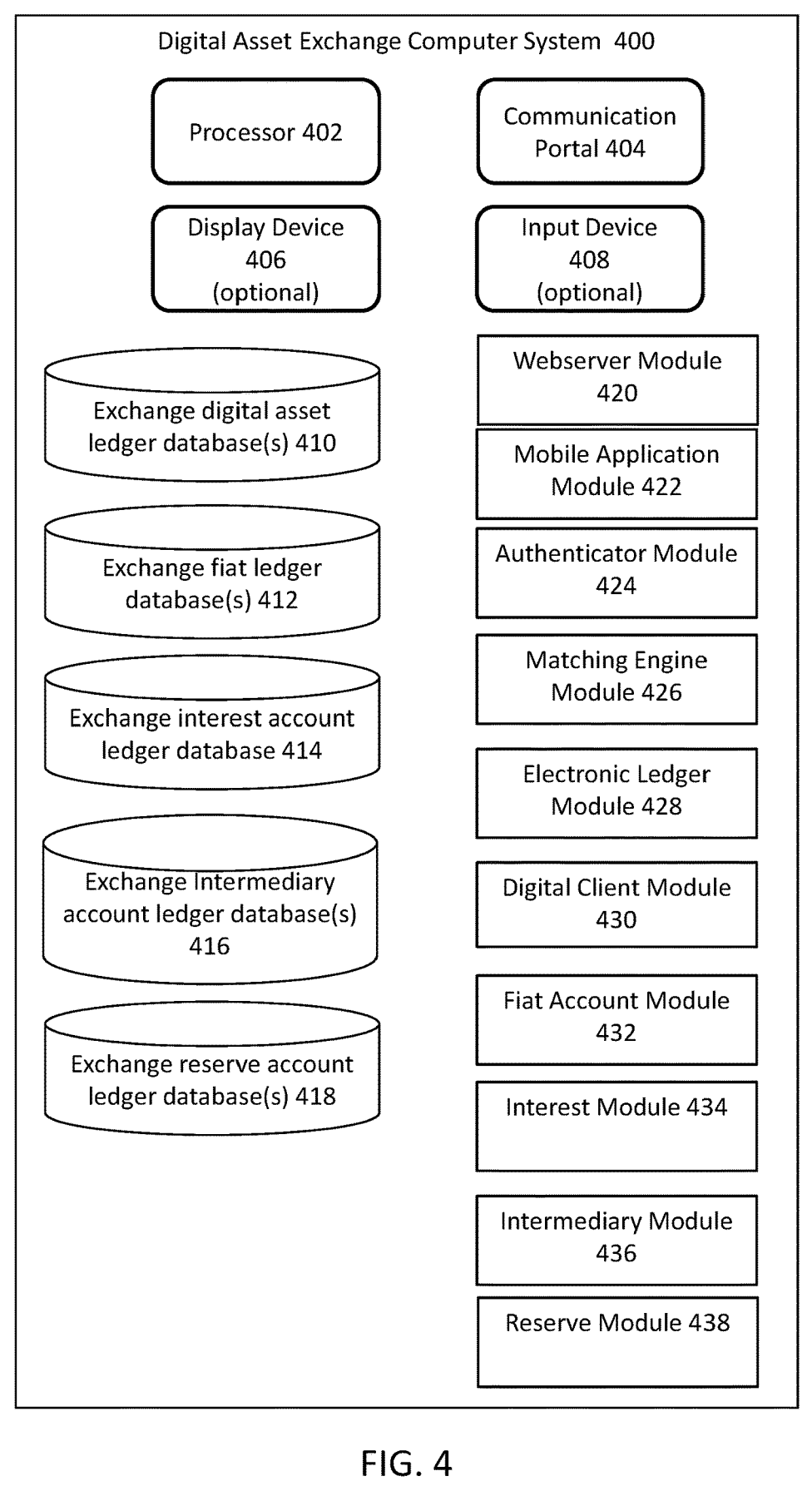

In accordance with the present invention, to implement the innovative and unconventional processes and features described briefly above, which may be employed to overcome the technical challenges associated with conventional digital asset exchange computer systems, a digital asset exchange computer system 400 is improved as illustrated in FIG. 4.

Referring to FIG. 4, the digital asset exchange computer system 400 may include one or more processor(s) 402, one or communication portal(s) 404, one or more optional display device(s) 406, and one or more optional input device(s) 408, to name a few. The one or more processor(s) 402 may be operatively connected to computer-readable memory storing one or more databases used in the operation of the digital asset exchange computer system 400.

With respect to each digital asset on the exchange 130, one or more exchange digital asset ledger database(s) 410 are provided. The exchange digital asset ledger database 410 may include for at least each customer on the exchange holding such digital asset, exchange account information including respective digital asset account, digital asset transaction information and digital asset balance information, to name a few. For example, for BITCOIN, a BITCOIN ledger database would include balance information for each customer holding bitcoin on the exchange. In operation, the exchange digital asset ledger database(s) 410 are used to, inter alia, verify an amount of respective digital assets available to a particular customer to perform an exchange transaction.

Examples of digital assets that may be used in accordance with the present invention include BITCOIN, NAMECOINS, LITECOINS, PPCOINS, TONAL BITCOINS, BITCOIN CASH, ZCASH, IXCOINS, DEVCOINS, FREICOINS, I0COINS, TERRACOINS, LIQUIDCOINS, BBQCOINS, BITBARS, PHENIXCOINS, RIPPLE, DOGECOINS, BARNBRIDGE, POLYGON, SOMNIUM SPACE, OCEAN PROTOCOL, SUSHISWAP, INJECTIVE, LIVEPEER, MASTERCOINS, BLACKCOINS, ETHER, NXT, BITSHARES-PTS, QUARK, PRIMECOIN, FEATHERCOIN, PEERCOIN, FACEBOOK GLOBAL COIN, STELLAR, TOP 100 TOKENS, TETHER; MAKER; CRYPTO.COM CHAIN; BASIC ATTENTION TOKEN; USD COIN; CHAINLINK; BITTORRENT; OMISEGO; HOLO; TRUEUSD; PUNDI X; ZILLIQA; ATOM, AUGUR; 0X; AURORA; PAXOS STANDARD TOKEN; HUOBI TOKEN; IOST; DENT; QUBITICA; ENJIN COIN; MAXIMINE COIN; THORECOIN; MAIDSAFECOIN; KUCOIN SHARES; CRYPTO.COM; SOLVE; STATUS; MIXIN; WALTONCHAIN; GOLEM; INSIGHT CHAIN; DAI; VESTCHAIN; AELF; WAX; DIGIXDAO; LOOM NETWORK; NASH EXCHANGE; LATOKEN; HEDGETRADE; LOOPRING; REVAIN; DECENTRALAND; ORBS; NEXT; SANTIMENT NETWORK TOKEN; POPULOUS; NEXO; CELER NETWORK; POWER LEDGER; ODEM; KYBER NETWORK; QASH; BANCOR; CLIPPER COIN; MATIC NETWORK; POLYMATH; FUNFAIR; BREAD; IOTEX; ECOREAL ESTATE; REPO; UTRUST; ARCBLOCK; BUGGYRA COIN ZERO; LAMBDA; IEXEC RLC; STASIS EURS; ENIGMA; QUARKCHAIN; STORJ; UGAS; RIF TOKEN; JAPAN CONTENT TOKEN; FANTOM; EDUCARE; FUSION; GAS; MAINFRAME; BIBOX TOKEN; CRYPTO20; EGRETIA; REN; SYNTHETIX NETWORK TOKEN; VERITASEUM; CORTEX; CINDICATOR; CIVIC; RCHAIN; TENX; KIN; DAPS TOKEN; SINGULARITYNET; QUANT; GNOSIS; INO COIN; ICONOMI; MEDIBLOC [ERC20]; 0X; AION; ALGORAND; AMP; ARCA; ARWEAVE; AUDIUS; AVALANCHE; BCB; BCC; BITCOIN SV; BLOCKSTACKS; CBAT; CDAI; CELA; CELO; CETH; CHIA; CODA; COSMOS; CWBTC; CZRK; DECRED; DFINITY; EOS; ETH 2.0; FILECOIN; HEDGETRADE; ION; KADENA; KYBER NETWORK; MOBILECION; NEAR; NERVOS; OASIS; OMISEGO; PAXG; POLKADOT; SKALE; SOLANA; STELLAR; TEZOS; THETA; XRP; and/or DEW, to name a few.

With respect to each fiat on the digital asset exchange, one or more exchange fiat ledger database(s) 412 may be provided. Such exchange fiat ledger databases 412 include, for at least each customer on the exchange holding such digital assets, exchange fiat account information including respective fiat account, fiat transaction information and fiat balance information, to name a few for each customer of the digital asset exchange. For example, a U.S. Dollar ledger database may be provided, which includes for at least each customer with a U.S. Dollar balance on the exchange, a transaction history for such customer for transactions involving U.S. Dollar as well as current U.S. Dollar balance information.

Examples of fiat that may be used in accordance with the present invention include U.S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few.

Further with respect to each digital asset for which interest is to be provided in accordance with embodiments of the present invention, one or more exchange interest account ledger database(s) 414 are provided. In embodiments, the respective one or more exchange interest account ledger database(s) 414 includes, for each customer, respective interest-bearing account information including respective digital asset interest account balance associated with each respect digital asset and respective interest information. For example, in embodiments where interest on BITCOIN is provided, an exchange BITCOIN interest account ledger database 414 may be provided to track for each customer with an interest-bearing account for BITCOIN, information about the amount of BITCOIN held by such customer, and the interest earned or being earned by such customer.

For each intermediary, one or more exchange intermediary account ledger database(s) 416 is provided. In embodiments, the respective one or more exchange intermediary account ledger database(s) 416 includes, for each customer with digital assets loaned to the respective intermediary, respective interest-bearing account information including respective digital asset interest account balance associated with each respect digital asset and respective return and/or interest information.

In embodiments, where a reserve may be maintained, for each digital asset in which a reserve is retained, one or more exchange reserve account ledger database(s) 418 is provided. In embodiments, the respective one or more reserve account ledger database(s) 418, includes for each customer with digital assets loaned to the respective intermediary for which a reserve is maintained, respective reserve account information including respective reserve account balance associated with each respect digital asset of each respective customer.

In embodiments, the exchange digital asset ledger database 410, the exchange interest account database 414, the exchange intermediary account ledger database 416, and/or the exchange reserve account ledger database 418 may be combined and/or dispersed between one or more databases. For example, at least two databases may include the exchange digital asset ledger database 410, the exchange interest account database 414, the exchange intermediary account ledger database 416, the electronic reserve account ledger database 418, and/or a combination thereof. As another example, the exchange digital asset ledger database 410, the exchange interest account database 414, and/or exchange reserve account ledger database 418 may be stored in a first database and/or the exchange intermediary account ledger database 416 may be stored in a second database.

Further referring to FIG. 4, the digital asset exchange computer system 400 in accordance with the present invention may include one or more software modules programmed with computer-readable electronic instructions to perform one or more operations associated with the digital asset exchange 130. Each module may be stored on non-transitory computer-readable memory operatively connected one or more computers, including the digital asset exchange computer system 400. In embodiments, digital asset exchange computer system 400 may include webserver module 420, mobile application module 422, authenticator module 424, matching engine module 426, electronic ledger module 428, digital client module 430, fiat account module 432, interest module 434, intermediary module 436, and/or reserve module 438, to name a few.

In embodiments, the webserver module 420 may include computer executable instructions that when executed by one or more processors 402 of the digital asset exchange computer system 400 allow for interaction between a plurality of user devices and the digital asset exchange computer system via the Internet, or other communication network. In embodiments, a mobile application module 422 may include computer executable code that when executed by the one or more processors 402 of the digital asset exchange computer system 400 provide for interaction with a mobile application that may be provided on one or mobile devices associated with the plurality of users of the digital asset exchange to execute communication and transfers. In embodiments, the one or more processors 402 may execute instructions to communicate with a mobile application provided on the one or more user devices associated with users of the digital asset exchange computer system. In embodiments, the processor 402 may execute instructions to receive requests from a mobile device application to call functions in an application programming interface and return information and/or instructions to the mobile device application.

In embodiments, the authenticator module 424 may include computer executable instructions that when executed by one or more processors 402 of the digital asset exchange computer system 400 authenticate one or more users of the digital asset exchange computer system 400 based on credential information provided by one or more mobile device associated with the plurality of users of the digital asset exchange. In embodiments, the computer executable instructions may be implemented by the one or more processors 402 to access one or more databases to retrieve information associated with the one or more users to authenticate users. In embodiments, one or more processors 402 may execute the instructions to compare the credential information provided by a mobile device to stored credential information, accessed and retrieved by the one or more processor from the one or more databases to authenticate the user, wherein the user is authenticated when the credential information corresponds to stored credential information associated with a user. In embodiments, the instructions may execute steps S5504-S5530 discussed below.

In embodiments, the matching engine module 426 may include computer executable instructions that when executed by one or more processors 402 of the digital asset exchange computer system 400 match a contract or trade proposal (e.g., bid/ask) with one or more user responses to set up a trade or transaction between users. In embodiments, the one or more processors 402 may execute the instructions to compare the terms of the trade proposal with the one or more user responses and determine whether the one or more user responses match the terms of the proposal. In embodiments, a match may be determined when one or more terms of the trade proposal correspond to information provided in the user response.

In embodiments, the electronic ledger module 428 may include computer executable instructions that when executed by one or more processors of the digital asset exchange computer system 400 provide for accessing one or more databases to save and retrieve information. In embodiments, the one or more processors 402 may execute the instructions to access the database to create, modify or delete one or more entries in a ledger.

In embodiments, the digital client module 430 may include computer executable instructions that when executed by one or more processors 402 of the digital asset exchange computer system 400 provide for a client of the digital asset exchange computer system. In embodiments, the one or more processors 402 may execute the instructions to provide the client, which may be accessed by the users of the exchanges to create, modify or delete user account information associated with one or more user accounts associated with the user and maintained by the digital asset exchange computer system 400.

In embodiments, the fiat account module 432 may include computer executable instructions that when executed by one or more processors 402 of the digital asset exchange computer system 400 provide for creating, maintaining, and updating fiat account information. In embodiments, the one or more processors 402 may execute the instructions to access one or databases and create, modify or delete fiat account information associated with fiat deposited by users in accounts maintained by the digital asset exchange computer system 400. In embodiments, the one or more processors 402 may access, receive and/or send information to and/or from bank, credit card, debit card and/or other fiat transfer facilities to determine, verify and/or execute transfers of fiat to and from the digital asset exchange.

In embodiments, the interest module 434 may include computer executable instructions that when executed by one or more processors 402 of the digital asset exchange computer system 400 provide for establishing, maintaining, and distributing interest to user accounts. In embodiments the one or more processors 402 may execute the instructions to determine interest payments due to one or more users, and to transfer interest payments to one or more user accounts associated with each user. In embodiments, the transfer may include confirming the amount due and receipt of payments from a third-party intermediary prior to transferring interest payments to the one or more users. In embodiments, the transfer may be a ledger transfer and the one or more processors execute the instructions to modify account information associated with the users to reflect payment of the interest. In embodiments, the transfer of interest may be a blockchain transfer in which digital assets are transferred to digital wallets associated with the users in the blockchain. In embodiments, the one or more processors 402 may execute instructions to determine actual and/or estimated accrued interest during a time period in one or more denominations.

In embodiments, the intermediary module 436, may include computer executable instructions that when executed by one or more processors of the digital asset exchange computer system 400 provide for interaction with a third-party intermediary. In embodiments, the one or more processors may execute the instructions to provide for transfer of digital assets from one or more digital wallets associated with the digital asset exchange to one or more digital wallets associated with the third-party intermediary. In embodiments, the one or more processors may execute the instructions to provide information to the third-party intermediary computer system to allow for receipt of digital assets from one or more digital wallets associated with the third party intermediary.

In embodiments, the reserve module 438 may include computer executable instructions that when executed by one or more processors of the digital asset exchange computer system 400 provide for establishing, maintaining, and updating a reserve account associated with the users of the digital asset exchange. In embodiments, the one or more processors may execute the instructions to calculate a reserve amount and/or provide for a transfer of a portion of the digital assets provided to the interest bearing account into a reserve account. In embodiments, the transfer may be a ledger transfer in which the one or more processors execute instructions to modify the interest bearing account ledger and a reserve account ledger to indicate the transfer. In embodiments, the one or more processors may execute the instructions to provide a blockchain transaction to transfer digital assets from a digital wallet associated with the interest bearing account to a digital wallet associated with the reserve account. In embodiments, the digital wallet associated with the interest bearing account and the digital wallet associated with the reserve account are associated with one or more private keys controlled by the digital asset exchange.

In embodiments, the modules discussed above may perform additional or fewer functions. In embodiments, the functions of modules may be performed by other modules such that fewer modules may be used. In embodiments, additional modules may be added.

Figure 5A:
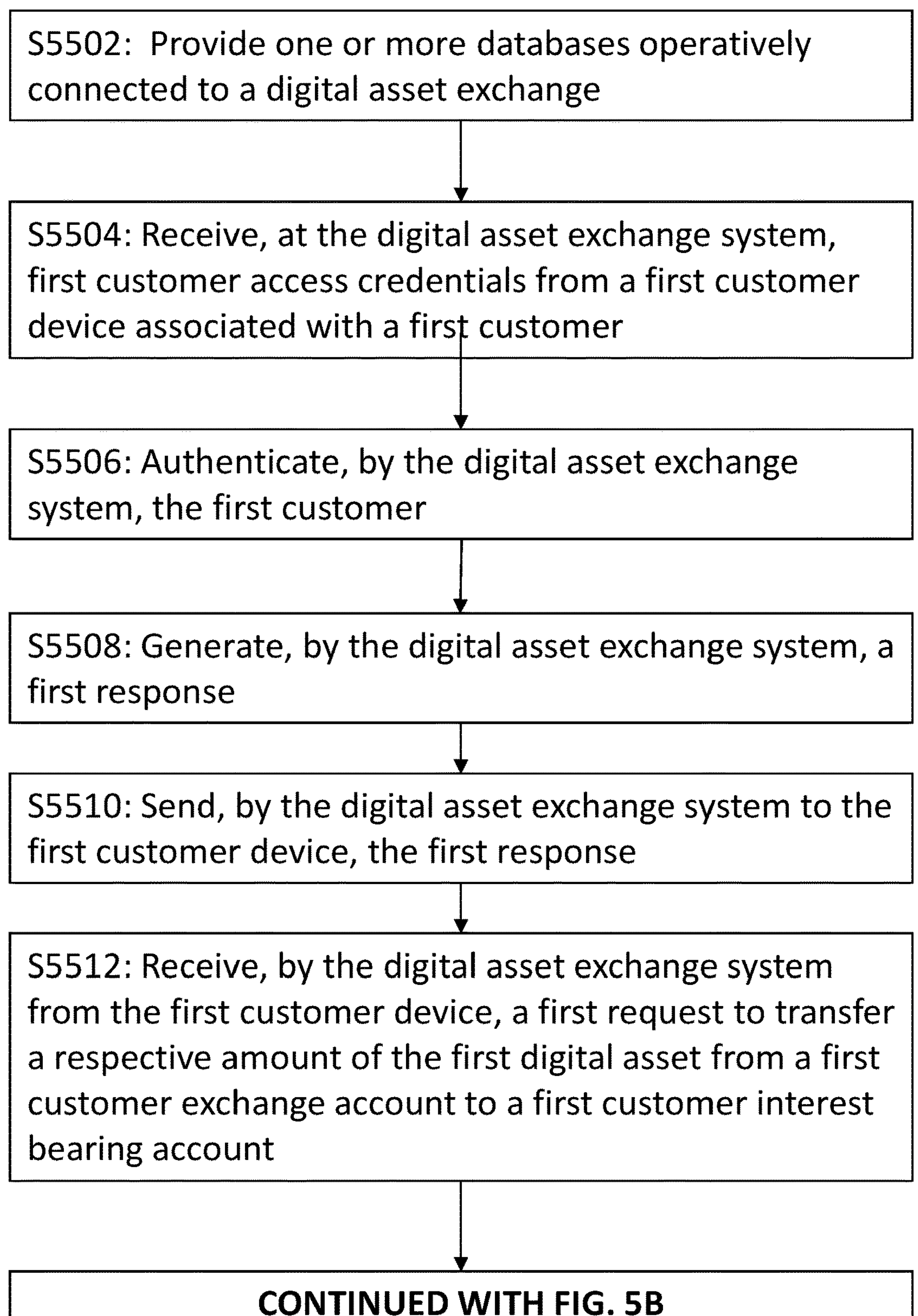

An exemplary process in accordance with the present invention for providing interest on an amount of digital assets is illustrated in connection with FIG. 5A through FIG. 5C. FIG. 5A illustrates an exemplary process for a digital asset exchange computer system 400 providing interest on one or more digital assets on deposit in the digital asset exchange and tracked, administered, managed and/or maintained by the digital asset exchange computer system 400. At step S5502, in embodiments, one or more databases operatively connected to a digital asset exchange computer system 400 associated with the digital asset exchange, such as the digital asset exchange system 130 discussed above, are provided. As discussed with respect to FIG. 4, the digital asset exchange computer system 400 may include or be operatively connected to exchange digital asset ledger database 410, exchange fiat ledger database 412, exchange interest account database 414, exchange intermediary account ledger database 416, exchange reserve account ledger database 418, and/or a combination or subcombination thereof, to name a few. In embodiments, the digital asset exchange may access the exchange digital asset ledger database 410, exchange fiat ledger database 412, exchange interest account database 414, exchange intermediary account ledger database 416 and/or electronic reserve account ledger database 418 via the digital asset exchange computer system 400. In embodiments, the exchange digital asset ledger database 410, exchange interest account database 414, exchange intermediary account ledger database 416, electronic reserve account ledger database 418 and/or exchange fiat ledger database 412 may each be maintained and/or stored on a first plurality of geographically distributed computer systems in the first blockchain network. In embodiments, the exchange digital asset ledger database 410, exchange interest account database 414, exchange intermediary account ledger database 416, electronic reserve account ledger database 418, exchange fiat ledger database 412, to name a few, may be maintained and/or stored on a blockchain and/or off a blockchain as a sidechain, which may later be published, periodically or aperiodically, to the blockchain.

In embodiments, as discussed with respect to step S5502, the one or more databases discussed herein may not necessarily be provided as part of the exemplary process but may be generated before the exemplary process of the present invention begins. The one or more databases may include an electronic log of all transactions associated with exchange accounts, interest-bearing accounts, intermediary accounts, and/or reserve accounts associated with the plurality of users, including, for example, the source account, the destination account, the timestamp of the transaction, the amount of the transaction (e.g., the amount of the first digital asset), and/or the balance in each account before and/or after the transaction. The one or more databases may include a list of account addresses and balances in each account. In embodiments, the one or more ledgers stored in the one or more databases may be maintained as a sidechain, which is periodically, or aperiodically, published to a blockchain such as the ETHEREUM blockchain. In embodiments, the one or more ledgers may be published directly to the blockchain.

In embodiments, the one or more databases may be stored locally, remotely and/or be accessible by the digital asset exchange computer system 400. A more detailed description of an exemplary embodiment of step S5502, is illustrated in connection with FIG. 5A-1 and FIG. 5A-5.

Referring to FIGS. 5A-1, and 5A-5, in embodiments, the digital asset exchange computer system 400 may be provided with, or operably connected to the plurality of databases discussed above.

The electronic exchange digital asset ledger database 410 may contain a first electronic digital asset ledger associated with a first digital asset including, for each customer of a plurality of customers of the digital asset exchange, exchange account information associated with a respective customer exchange account including a first respective digital asset account balance indicating a balance amount of the first digital asset held in the respective customer exchange account that is available for transfer via the digital asset exchange. The one or more exchange accounts, in embodiments, may each be an account with the digital asset exchange (e.g., a non-interest-bearing account). In embodiments, one or more exchange accounts may be maintained in an omnibus account or an aggregated account including deposits of the first digital asset associated with multiple customers or users. In embodiments, the balance amount may represent an amount of the first digital asset available for transfer via the digital asset exchange. The first digital asset, in embodiments, may be maintained on a distributed public transaction ledger maintained in the form of a first blockchain by a first plurality of geographically distributed computer systems in a first blockchain network.

The electronic exchange digital asset ledger database 410 may also contain a second electronic exchange ledger associated with a second digital asset, including, for each customer of the plurality of customers, second exchange account information associated with the first customer exchange account including a second digital asset account balance indicating a second balance amount of the second digital asset held in the first customer exchange account that is available for transfer via the digital asset exchange (which may be similar in description to the first electronic exchange ledger and the electronic exchange digital asset ledger database 410, the descriptions of which applying herein.) In embodiments, additional electronic exchange ledgers associated with additional digital assets may be included in the electronic exchange digital asset ledger database 410. In embodiments, multiple electronic exchange digital asset ledger databases 410 may be provided with each associated with a different digital asset.

The electronic fiat ledger database 412 may contain an electronic fiat ledger associated with a first fiat, including, for each customer of the plurality of customers of the digital asset exchange, respective fiat account information associated with a respective customer exchange fiat account including a first respective fiat account balance associated with a fiat amount of the first fiat held in the respective customer exchange fiat account. In embodiments, the fiat amount of the first fiat may represent an amount of the first fiat that is available for transfer via the digital asset exchange into the respective customer interest-bearing account. In embodiments, the fiat amount of the first fiat may represent an amount of the fiat that is available to purchase one or more digital assets via the digital asset exchange. The purchased digital assets, in embodiments, may be deposited directly into the respective exchange account associated with the first customer. In embodiments, the purchased digital assets may be deposited directly into the respective customer interest-bearing account (a more detailed description of which is located below in connection with the description of the process illustrated in FIG. 5A-6 and FIG. 5A-7, the descriptions of which applying herein). In embodiments where fiat is transferred from and/or into the respective customer exchange fiat account associated with fiat, the digital asset exchange computer system 400 may update the electronic fiat ledger to reflect transfer of the amount of first fiat transferred in and/or out of the respective customer exchange account. The first fiat, for example, may be USD, Euro, Afghan afghani, Russian Ruble, Armenian Dram, Peso, Canadian Dollar, Georgian Lari, Iraqi Dinar, Moldovan Leu, Rwandan Franc, Seychellois Rupee, Turkmenistan Manat, British Pound, and/or Zambian Kwacha, to name a few. In embodiments, additional electronic fiat ledgers may be provided in the exchange fiat ledger database 412, each of which may be associated with a different fiat. In embodiments, additional exchange fiat ledger databases 412 may be provided, each of which may be associated with a separate fiat.

The electronic exchange interest account ledger database 414 may include an electronic exchange interest account ledger associated with the first digital asset and may include, for each customer of the plurality of customers of the digital asset exchange, respective interest-bearing account information associated with a respective customer interest-bearing account including a respective digital asset interest account balance associated with an interest amount of the first digital asset held in the respective customer interest-bearing account and respective interest information (e.g., electronic exchange interest account database 414) associated therewith. In embodiments, one or more interest-bearing accounts may be an omnibus account including deposits of the first digital asset associated with the respective one or more users. The interest information, in embodiments, may include one or more sum amounts of interests (e.g., a first sum amount of interest, a second sum amount of interest . . . an Nth sum amount of interest). In embodiments, the one or more sum amounts of interest may be a fixed amount of interest to be transferred to the one or more customer interest-bearing account. In embodiments, the interest information may include one or more of the following: a sum amount of interest denominated in the first digital asset, a sum amount of interest denominated in fiat, a sum amount of interest denominated in a second digital asset (e.g., a stable value token, an asset backed token, a fiat backed token, to name a few), and/or in both the first digital asset and the second digital asset, a first interest rate, a second interest rate, and/or a combination thereof. The first interest rate, in embodiments, may be applicable for a first period of time. In embodiments, the second interest rate may be applicable for a second period of time. The first period of time and the second period of time, in embodiments, may be the same or different from one another. In embodiments, the first period of time and/or the second period of time may, for example, be applicable daily, every 30 days, monthly, year to date, and/or over the lifetime of the transfer to the respective customer interest-bearing account, to name a few). In embodiments, the interest information may include one or more interest amounts associated with the respective customer interest-bearing account. For example, the interest information may include one or more interest payments (e.g., the first interest amount and/or the second interest amount described below in connection with step S5522) associated with the respective customer interest-bearing account. In embodiments, one or more elements of the interest information may be calculated or specified. In embodiments, the interest amount of the first digital asset may be associated with the respective interest information, which may be different than that associated with other amounts of the first digital asset associated with the customer. In embodiments, a first interest amount of the first digital asset may be associated with a first interest rate while a second interest amount of the first digital asset may be associated with a second interest rate. In embodiments, additional electronic exchange interest account ledgers may be provided in the electronic exchange interest account ledger database 414, each of which may be associated with different digital asset. In embodiments, additional electronic exchange interest account ledger database 414 may be provided, each of which associated with a different digital asset.

The electronic exchange intermediary account ledger database 416 may contain a an electronic intermediary ledger associated with a first intermediary, including, for each customer of the plurality of customers of the digital asset exchange, respective intermediary account information associated with a respective customer intermediary account including a respective digital asset balance indicating an intermediary amount of the first digital asset held in the respective customer intermediary account and respective return information associated therewith. In embodiments, each respective customer intermediary account may be an account tracked by the digital asset exchange and tracked, managed, administered and/or maintained by the first intermediary, third-party institution, and/or the digital asset exchange. In embodiments, one or more intermediary accounts may be an omnibus account including deposits of one or more amounts of the first digital asset associated with one or more users of the plurality of users. In embodiment, the intermediary amount of the first digital asset is an amount of the first digital asset loaned to one or more third parties (e.g., a third-party institution). In embodiments, intermediary amount of the first digital asset is an amount of the first digital asset traded on the digital asset exchange or another digital asset exchange by one or more third parties (e.g., the third-party institution) associated with the first intermediary and/or the respective one or more intermediary accounts.

In embodiments, the return information may indicate a return to be provided to the respective user for allowing the loan of the intermediary amount of the first digital asset. The return information, in embodiments, may indicate a return (e.g., one or more payments based on the intermediary amount of digital assets) to be provided to the respective one or more users for allowing the trade of at least a portion of the intermediary amount of the first digital asset. In embodiments, the return information may include a first return amount, a first return rate, a return payment schedule, and/or a combination thereof, to name a few. The first return amount, in embodiments, may be: denominated in the first digital asset, denominated in fiat, denominated in a second digital asset and/or a combination thereof. In embodiments, the second digital asset may be a stable value token. The first return rate, in embodiments, may include a first return rate for a third period of time, a second return rate for a fourth period of time, and/or a combination thereof. In embodiments, the respective interest rate that is applicable to the amount of the first digital asset transferred to the respective customer interest-bearing account may be based on the first return rate and/or the second return rate applicable to the respective amount of the first digital asset transferred to the respective customer intermediary account. The return payment schedule, in embodiments, may indicate when (e.g., a calendar date, day, month, year, and/or time, to name a few) all or a portion of a return amount (e.g., a payment, the first return amount) is scheduled to be made to the respective one or more users. The payment schedule may indicate when and how much of the return amount is to be dispersed to the respective user. In embodiments, the return payment schedule may indicate that disbursements (all or a portion of the return amount) are to be made periodically or aperiodically. In embodiments, the return amount may include the intermediary amount of the first digital asset transferred to the respective customer intermediary account and the first interest payment amount to be made. In embodiments, the return amount may include only the first interest payment amount. In embodiments, one or more customer interest-bearing accounts may be associated with one or more intermediary systems. The one or more intermediary systems, in embodiments, may be associated with one or more brokers, one or more lenders, one or more agents of one or more brokers, one or more agents of one or more lenders, and/or combinations thereof, to name a few.

The exchange intermediary account ledger database 416 may contain a second electronic intermediary ledger associated with a second intermediary, including, for each customer of the plurality of customers of the digital asset exchange, second respective intermediary account information associated with a second respective customer intermediary account including a respective digital asset account balance indicating an second intermediary of the first digital asset held in the second respective customer intermediary account. In embodiments, additional electronic intermediary account ledgers may be associated with additional intermediaries. In embodiments, the additional exchange intermediary account databases may be provided with each associated with a different intermediary.

The electronic reserve account ledger database 418 may contain an electronic reserve ledger associated with a respective digital asset, including, for each customer of the plurality of customers, respective reserve account information associated with a first customer reserve account including a reserve digital asset balance indicating a reserve amount of the first digital asset held in the first customer reserve account. In embodiments, one or more reserve accounts may be an omnibus account including deposits of the first digital asset associated with one or more users or customers. In embodiments, the reserve digital asset account balance may be denominated in fiat, a first digital asset, a second digital asset and/or combinations of the above. In embodiments, the one or more reserve accounts adhere to one or more reserve rules accessible by the digital asset exchange. The one or more reserve rules, in embodiments, may be designed to maintain a ratio between the interest amount of the first digital asset (e.g., the amount of the first digital asset, which is lent to intermediaries and/or third parties) and another amount of the first digital asset, which is not lent to intermediaries and/or third parties. The one or more reserve rules, in embodiments, may be designed to maintain a ratio between the interest amount of the first digital asset and an amount of fiat. In embodiments, the electronic reserve account ledger database 418 may include additional reserve ledgers associated with other digital assets. In embodiments, additional electronic reserve account ledger databases 418 may be provided with each associated with a different digital asset. In embodiments, the exchange digital asset ledger database 410, the exchange interest account database 414, the exchange intermediary account ledger database 416, and/or the exchange reserve account ledger database 418 may be combined and/or dispersed between one or more databases. For example, at least two databases may include the exchange digital asset ledger database 410, the exchange interest account database 414, the exchange intermediary account ledger database 416, the electronic reserve account ledger database 418, and/or a combination thereof. As another example, the exchange digital asset ledger database 410, the exchange interest account database 414, and/or exchange reserve account ledger database 418 may be stored in a first database and/or the exchange intermediary account ledger database 416 may be stored in a second database.

Referring back to FIG. 5A, in embodiments, the process may continue with step S5504. In exemplary embodiments, the process may also include step S5504. In embodiments, the one or more provided databases discussed herein may not necessarily be provided as part of the exemplary process and may instead exist before the exemplary process begins. At step S5504, in embodiments, the digital asset exchange computer system 400 may receive first customer access credentials from a first customer device (e.g., first user device 105-1) associated with a first user (first customer) of the plurality of users (customers of the digital asset exchange). First customer (e.g., first user) access credentials may include one or more of a username, password, biometric data access, (e.g. a user's finger print), card scan (e.g., swipe of a card associated with the digital asset exchange 130 and having a magnetic strip), customer facial recognition, and/or a pin (e.g., a number provided via SMS, other text message service, or email for multi-factor authentication), to name a few. For example, the first customer access credentials may include login information comprising a username and password associated with the first user. In embodiments, multi-factor authentication may be used for the first user to access the first user's accounts with the digital asset exchange. In embodiments, the multi-factor authentication may include the use of an authorization code that is sent to a user device, e-mail address, or mobile phone number, to name a few, associated with the first user, for example, as used in AUTHY® (AUTHY® is a registered trademark of Twilio, Inc.). In embodiments, other multi-factor verifications may be used, such as identification of a user device associated with the first user based on phone number or mobile network, location information and shared secret verification, to name a few.

Once the first customer access credentials are received by the digital asset exchange computer system 400, the digital asset exchange computer system may authenticate the received access credentials (at step S5506), and, if verified, grant the first user access. In embodiments, the digital asset exchange may authenticate the first customer access credentials by matching first user access credentials and/or associating the first user access credentials with at least one of a respective customer digital asset exchange account, a respective customer interest-bearing account, a respective customer reserve account, and/or a combination thereof. In embodiments, if the first user access credentials are not or cannot be authenticated, the digital asset exchange computer system 400 may prevent access and notify the first user of the denied access (e.g., via a notification). In embodiments, the digital asset exchange may store credential information associated with respective customer digital asset exchange account in one or more databases, such as a credential database, and/or digital asset ledger database, to name a few.

Referring back to step S5506, in embodiments, the process may continue with step S5506A. Referring to FIG. 5A-8, at step S5506A, in embodiments, the digital asset exchange computer system 400 may receive from the user device an authentication request including first user credential information associated with the first user. At step S5506B, in embodiments, the digital asset exchange computer system 400 may determine that the first user device is authorized to access the digital asset exchange computer system based at least in part on the first user credential information. At step S5506C, in embodiments, the digital asset exchange computer system 400 may generate first machine-executable instructions including first graphical user interface information associated with a first graphical user interface. At step S5506D, the digital asset exchange computer system 400 may transmit from the digital asset exchange computer system to the first user device, the first machine-executable instructions. In embodiments, upon execution of the first machine-executable instructions, the first user device may display a first graphical user interface.

The process of FIG. 5A through FIG. 5C, in embodiments, may continue with step S5508. At step S5508, in embodiments, the digital asset exchange computer system 400 may generate a first response to the authentication of the first customer. The first response, in embodiments, may include executing computer-readable instructions by the first user device, to cause the first user device to display a first graphical user interface on a display associated with the first user device. The first graphical user interface, in embodiments, may include information associated with the first user and/or the accounts associated with the first user and the digital asset exchange. For example, referring to FIG. 5A-2, the first graphical user interface (of the first request) displayed may include: customer identification information associated with the first user (e.g., one or more of an identification including letters, numbers and/or symbols; a public address associated with the respective user; a username; the respective user's name; the respective user's address; intermediary selection information (described below in more detail in connection with FIG. 5C, the description of which apply herein) and/or all or part of the respective user's social security number, by way of example), a first digital asset account balance associated with the first user; a second digital asset account balance associated with the first user; a transfer option to transfer one or more digital assets into a customer interest-bearing account associated with the first user (e.g., the account associated with the second digital asset account balance); interest information associated with the account associated with the second digital asset account balance; an option to purchase and directly deposit into an interest-bearing account associated with the first user, and/or a combination thereof, to name a few.

The first customer may provide an input to the first user device using the first graphical user interface, such as inputting a request to purchase digital assets into an account.

An exemplary request to transfer a respective amount of a first digital asset from a customer exchange account to a customer interest-bearing account is illustrated in connection with FIG. 5A-3. Referring to FIG. 5A-3, in embodiments, an exemplary first request 5510 includes the following: a customer identification (customer identification No. 1234), a first digital asset account balance (10 digital assets), a first digital asset interest rate (interest 1), a second digital asset account balance (100 digital assets); a second digital asset interest rate (interest 2), and a transfer option. As shown in FIG. 5A-3, exemplary first request 5510's transfer option may enable the respective user to choose an account to transfer from (e.g., account 1 or account 2) and an account to transfer to (e.g., account 1 or account 2). In embodiments, the Exemplary first request may include an option to transfer a portion (e.g., 100%, 50%, maximum allowable) of a digital asset into an interest-bearing account.

Figures 1, 2, 3, 6B, 6C:
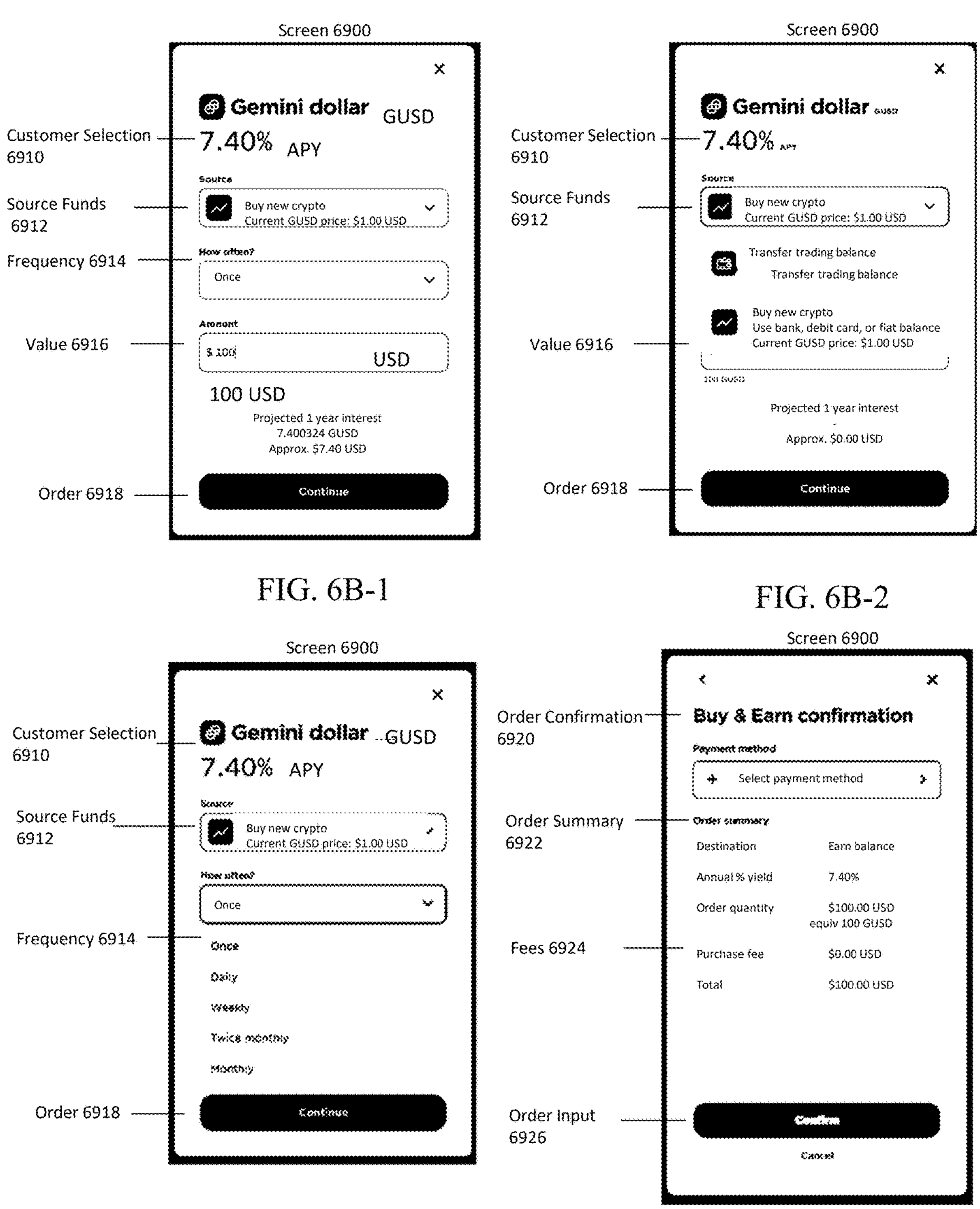
Figures 2, 8C:
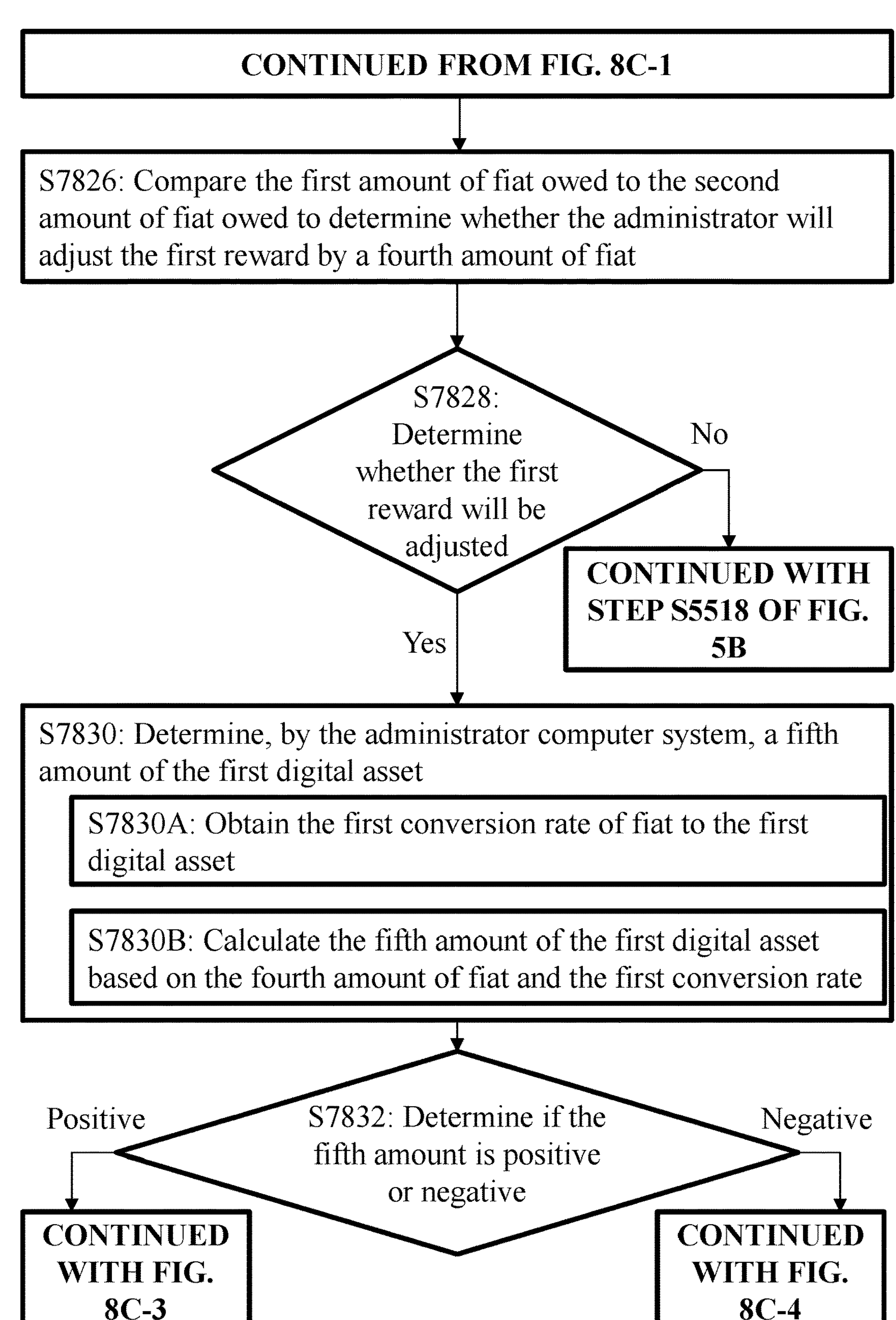

An exemplary request screen 6900 to purchase and directly deposit digital assets into a customer interest-bearing account is illustrated in connection with FIG. 6A. Referring to FIG. 6A, in embodiments, the exemplary request screen 6900 may include various information including one or more base assets 6902 (e.g., first digital asset 6902A, second digital asset 6902B, third digital asset 6902C . . . nth digital asset 6902*n*), associated rates 6904 (e.g., the offered interest rate for the respective base asset 6902), associated balances 6906 (e.g., the respective customer balance associated with the respective base asset 6902), input buttons 6908 used to select the digital asset 6902, and/or a combination thereof, to name a few. Additional exemplary request screens are further illustrated in connection with FIGS. 6B-1 and 6B-2. Referring to FIG. 6B-1 through 6B-3, the screen 6900 illustrates a customer selection (e.g., the first digital asset 6902A) where the customer selects a source 6912 for the purchase and/or transfer, selects a frequency 6914 of purchase (e.g., as FIG. 6B-3 depicts, once, daily, weekly, twice monthly, monthly, to name a few), a value 6916 (e.g., $100)), places the order 6918 and/or a combination thereof, to name a few. The source funds 6912, in embodiments, may refer to funds held in a digital asset exchange account associated with the respective customer (e.g., the respective digital asset exchange account), a fiat account associated with the respective customer, a third-party bank account (e.g., for a wire transfer), a credit card, a debit card, and/or a combination thereof, to name a few. In embodiments, each order may be confirmed prior to execution. For example, the digital asset exchange computer system 400 may generate and send order confirmations after receiving the inputted response to the first request.

For example, referring to FIG. 6C, a screen is showing an order confirmation 6920 may include order summary 6922, which may include the quantity, value, and/or any applicable fee(s) 6924. The order confirmation 6920, in embodiments, may include a box to check to confirm the order. The order confirmation 6920, in embodiments, may include an input for the customer to select (e.g., order input 6926) to indicate the order is confirmed.

In embodiments, the process may continue with the first customer device generating and sending a request to transfer an amount (e.g., a fourth amount) of the one or more first digital assets (e.g., the first digital asset) from an exchange account associated with the first customer (e.g., the respective customer exchange account) to an interest-bearing account associated with the first customer (e.g., the respective customer interest-bearing account). The request, in embodiments, may be generated via the transfer option of the first request. In embodiments, the request may be sent by the first customer device to the digital asset exchange computer system 400 via network 15.

In embodiments, the process may continue with step S5512. At step S5512, in embodiments, the digital asset exchange computer system 400 may receive, from the first customer device, a first request. The first request, in embodiments, may be to transfer a respective amount of the first digital asset from a first customer exchange account associated with the first customer to a first customer interest-bearing account associated with the first customer. The first request, for example, may include identification information associated with the first digital asset (e.g., information indicating the type of digital asset), the respective amount of the first digital asset, first source information associated with the first customer exchange account, first destination information associated with the first customer interest-bearing account, first customer access credentials, a first public address (e.g., a third digital address) on the blockchain associated with the first customer, a second public address (e.g., a first digital address) on the blockchain associated with the first customer and/or the digital asset exchange, and/or a combination thereof, to name a few. In embodiments, the first source information may include a third digital address (e.g., the first public address) associated with the first blockchain network of the first digital asset and/or the first customer exchange account associated with the first customer. The third digital address, in embodiments, may be associated with an omnibus account associated with the plurality of users and/or customers, and/or a segregated account associated with the first customer, to name a few. The first destination information, in embodiments, may include a first digital address (e.g., the second public address) associated with the first blockchain network and/or the first customer interest-bearing account associated with the first customer. The first digital address, in embodiments, may be associated with a digital asset exchange private key associated with the first digital asset held by the digital asset exchange on behalf of the respective customer, an omnibus account associated with the plurality of users, and/or a segregated account associated with the first customer, to name a few.

In alternative embodiments, step S5510 may be followed by step S5512'. Referring to FIG. 5A-6, at step S5512', in embodiments, the digital asset exchange computer system 400 may receive a second request to purchase a respective amount of the first digital asset and to deposit the respective amount of the first digital asset directly into the first customer interest-bearing account associated with the first customer. For example, the first customer may want to purchase the respective amount of the first digital asset and deposit it into the first customer interest-bearing account. The purchase, in embodiments, may be a request to purchase the respective amount of the first digital asset, using a balance of a respective fiat account associated with the first customer (e.g., the sixth account balance). The second request, may include the respective amount of the first digital asset, first source information associated with the respective fiat customer exchange account, first destination information associated with the first customer interest-bearing account, the first customer access credentials, a first public address on the blockchain associated with the first customer, a second public address on the blockchain associated with the first customer and/or the digital asset exchange, and/or a combination thereof, to name a few. The description of the second request herein may be similar to the description of the first request in connection with step S5512 of FIG. 5A, the description of which applies herein.

In embodiments, step S5514' may follow step S5512'. At step S5514', in embodiments, the digital asset exchange computer system 400 may verify the second request. In embodiments, at step S5514'A, the digital asset exchange computer system may verify the second request by calculating a corresponding amount of fiat based on a conversion rate of the first type of digital asset to the first type of fiat and the respective amount of the first digital asset. The conversion rate, in embodiments, may be accessible via the digital asset exchange computer system 400 associated with the digital asset exchange. In embodiments, the conversion rate may be obtained from a third-party and/or a trust third-party. In embodiments the conversion rate may be an average and/or weighted average of one or more conversion rates sourced from multiple parties including, in embodiments, the digital asset exchange. In embodiments, step S5514'B may follow step S5514'A where the digital asset exchange computer system 400 may confirm that the corresponding amount of fiat is less than or equal to the respective account balance associated with the first user such that the customer fiat account has sufficient funds to purchase the respective amount of the first digital asset. Confirming the first customer has sufficient funds, in embodiments, may include step S5514'B-1 where the corresponding amount of fiat is calculated based on the conversion rate. The corresponding amount of fiat, in embodiments, may include fiat for the purchase of the respective amount of the first digital asset. The corresponding amount of fiat, in embodiments, may be obtained from the customer fiat account. In embodiments, the corresponding amount of fiat may be obtained from the digital asset exchange. In embodiments, at step S5514'B-2, the digital asset exchange computer system 400 determines a total amount of fiat based on the corresponding amount of fiat and the respective amount of the first digital asset. The total amount of fiat, in embodiments, may include fiat for the purchase of the respective amount of the first digital asset and fees associated with one or more transactions to obtain the respective amount of the first digital asset. In embodiments, the total amount of fiat may be the corresponding amount of fiat. The confirmation of sufficient funds, in embodiments, may continue with step S5514'B-3 where the digital asset exchange computer system may confirm the customer fiat account has sufficient funds for the second request. For example, the digital asset exchange computer system 400 may confirm the customer fiat account has a balance equal to or greater than the seventh amount of fiat. As another example, the digital asset exchange computer system 400 may confirm the customer fiat account has a balance equal to or greater than the sixth amount of fiat.

If, in embodiments, the customer fiat account has an insufficient balance, that is, when there is no confirmation of sufficient funds in step S5514'B-3, the digital asset exchange computer system 400 may, for example, decline the transaction, and, in further embodiments, may generate and send a notification to the first customer device indicating the transaction was declined and/or why the transaction was declined. As another example, the digital asset exchange computer system 400 may partially execute the transaction, utilizing the balance of the customer fiat account, and, in further embodiments, may generate and send a notification to the first customer device indicating the partially executed transaction and/or why the transaction was partially executed. As another example, the digital asset exchange computer system 400 may partially execute the transaction, utilizing the balance of the customer fiat account. Continuing the example, the difference between the balance of the customer fiat account and the total amount of fiat may be made up of one or more digital assets in the customer exchange account. Continuing the example, the digital asset exchange computer system 400, in embodiments, may generate and send a notification to the first customer device indicating the partially executed transaction and/or the digital assets used to make up the difference.

Referring to FIG. 5A-7, in embodiments, step S5516' may follow step S5514'. At step S5516', in embodiments, when the digital asset exchange may purchase the interest amount of the first digital asset to the first customer interest-bearing account associated with the first customer. Step S5516', in embodiments, may include step S5516'A where the digital asset exchange computer system 400 transfers the total amount of fiat from the respective customer fiat account to an exchange fiat account associated with the digital asset exchange. In embodiments, the total amount of fiat may be transferred via a ledger transaction (which may be similar to the ledger transactions described throughout this application, the description of which applying herein). In embodiments, the purchase of the interest amount of the first digital asset may be a blockchain transaction (which may be similar to the blockchain transactions described throughout this application, the description of which applying herein). In embodiments, step S5516'B may follow step S516'. At step S5516'B, in embodiments, the digital asset exchange computer system 400 may transfer the interest amount of the first digital asset from the first customer account to the first customer interest-bearing account associated with the first customer. In embodiments, the interest amount of the first digital asset may be transferred via a ledger transaction (which may be similar to the ledger transactions described throughout this application, the description of which applying herein). In embodiments, the interest amount of the first digital asset may transferred via a blockchain transaction (which may be similar to the blockchain transactions described throughout this application, the description of which applying herein). In embodiments, step S5516' may continue with step S5518 of FIG. 5B.

In embodiments, returning to FIG. 5A through FIG. 5C, the process may continue with step S5514 as depicted in FIG. 5B. At step S5514, in embodiments, the digital asset exchange computer system 400 may verify that the interest amount of the first digital asset is less than or equal to a first digital asset account balance (balance amount) associated with the first customer. The request, in embodiments, may be verified by determining whether the first customer has sufficient funds to cover the first request. In embodiments, the digital asset exchange may verify access credentials associated with the first user to verify the first request. If, for example, the first request cannot be verified, the digital asset exchange computer system 400 may deny the first request and/or notify the first customer of the reason(s) why the first request was denied.

In embodiments, the process may continue with step S5516 where the digital asset exchange computer system 400 may execute the verified first request by transferring the interest amount of the one or more first digital assets. For example, the digital asset exchange computer system may transfer the interest amount of the first digital asset from the respective customer exchange account to the first customer interest-bearing account associated with the first customer.

In embodiments, the transfer of the interest amount of the first digital asset may be executed via a ledger (e.g., the first electronic exchange ledger stored in the exchange digital asset ledger database 410). For example, transferring the interest amount of the first digital asset may include the digital asset exchange computer system 400 updating the first electronic exchange ledger, which may be included in the exchange digital asset ledger database 410 to reflect the transfer of the interest amount of the first digital asset out of the respective customer exchange account (and/or the interest amount plus the reserve amount) and/or updating the second electronic interest account ledger to update the first customer interest-bearing account. In embodiments, the digital asset exchange computer system 400 may update the second electronic interest account ledger, which may be included in the exchange interest account database 414, to reflect the transfer of the interest amount of the first digital asset into the respective customer interest-bearing account. In embodiments, the second electronic interest account ledger may be updated to reflect the respective interest information associated with the interest amount of the first digital asset (and/or the interest amount less the reserve amount). In embodiments where the system includes the electronic reserve ledger, which may be included in the electronic reserve account ledger database 418, the example may continue with the digital asset exchange computer system 400 calculating a reserve amount associated with the interest amount of the first digital asset. The reserve amount, in embodiments, may be calculated based on at least one reserve requirement (e.g., the one or more reserve rules described above) and the interest amount of the first digital asset. In embodiments, the calculation of the reserve amount of the first digital asset may be based on at least one reserve requirement and the interest amount of the first digital asset. Continuing the example, the calculated reserve amount may be transferred by updating the electronic reserve ledger, which may be included in the exchange reserve account ledger database 418 to reflect transfer of the reserve amount to the first customer reserve account. In embodiments, the digital asset exchange computer system 400 may update the electronic interest account ledger, which may be included in the exchange interest account database 414 to reflect the transfer of the interest amount of the first digital asset less the reserve amount into the respective customer interest-bearing account. In embodiments, the electronic reserve ledger may not be used at all and there may be no respective customer reserve account for each customer of the digital asset exchange.

In embodiments, still referring to step S5516, transferring the interest amount of the first digital asset may include the digital asset exchange computer system 400 generating a transfer message (e.g., a second transfer message) including instructions to transfer the interest amount of the first digital asset from the third digital address to the first digital address. In embodiments, the digital asset exchange computer system 400 may publish the second transfer message to the first blockchain network. In embodiments, the first plurality of geographically distributed computer systems in the first blockchain network may implement the instructions to transfer the interest amount of the first digital asset from the third digital address to the first digital address. The process of generating and publishing a message to the first blockchain network is discussed further with respect to step S5518.

In embodiments, the process may continue to step S5518. At step S5518, in embodiments, the digital asset exchange computer system 400 may transfer the interest amount of the first digital asset from the first customer interest-bearing account associated with the first customer to a first customer intermediary account associated with the first customer, a first intermediary between the digital asset exchange, and/or one or more third-party institutions. In embodiments, the digital asset exchange computer system 400, for example, may transfer the interest amount of the first digital asset by first updating the electronic interest account ledger, which may be included in the exchange interest account database 414, to reflect the transfer of the interest amount of the first digital asset out of the first customer interest-bearing account. In embodiments, the digital asset exchange computer system 400 may update the electronic intermediary account ledger, which may be included in the exchange intermediary account ledger database 416, to reflect the transfer of the interest amount of the first digital asset into the first customer intermediary account.

As another example, in embodiments where the digital asset exchange computer system 400 includes the electronic reserve ledger, which may be included in the electronic reserve account ledger database 418, the digital asset exchange computer system may transfer the interest amount of the first digital asset by updating the electronic interest account ledger, which may be included in the exchange interest account database 414, to reflect the transfer of the interest amount of the first digital asset less a reserve amount out of the first customer interest-bearing account. In embodiments, the digital asset exchange computer system 400 may transfer the interest amount of the first digital asset by updating the electronic interest account ledger, which may be included in the exchange interest account database 414, to reflect the transfer of the interest amount of the first digital asset plus a reserve amount out of the first customer interest-bearing account. The digital asset exchange computer system 400 may update the electronic intermediary ledger, which may be included in the exchange intermediary account ledger database 416 to reflect the transfer of the interest amount of the first digital asset (or less the reserve amount) into the respective customer intermediary account. The digital asset exchange computer system 400 may update the exchange reserve account ledger database 418 to reflect the transfer of the reserve amount into the respective customer reserve account.

Referring back to step S5518 of FIG. 5B, in embodiments, after updating the electronic interest account ledger to reflect the transfer of the interest amount of the first digital asset out of the first customer interest-bearing account, the digital asset exchange may transfer the interest amount of the first digital asset by generating a first transfer message to transfer the interest amount of the first digital asset. Further, the first transfer message may include a first digital address associated with a first digital asset exchange private key associated with the first digital asset held by the digital asset exchange on behalf of the respective customer. In embodiments, the first transfer message may include a second digital address associated with the first customer intermediary account. The first transfer message, in embodiments, may include instructions to transfer the interest amount of the first digital asset from the first digital address to the second digital address. In embodiments, the first transfer message may include a first digital signature associated with the first digital address. In embodiments, the first digital address may be associated with a second digital asset exchange private key associated with the first digital asset held by the digital asset exchange on behalf of the respective customer. In embodiments, the first digital address may be associated with a plurality of digital asset exchange private keys associated with the first digital asset held by the digital asset exchange on behalf of the respective customer. As discussed throughout the application and incorporated herein, a digital asset account, such as a multi-signature account, may require a plurality of private keys to access it. In embodiments, the first digital address may be associated with a multi-party computing account and/or client. A multi-party computing client may be associated with a plurality of private keys where each private key of the plurality of keys is divided between one or more devices and/or users. Each of these devices has under its control a private key that, when joined with the other private keys of the plurality of keys, enables the use of the funds within the multi-party computing account and/or client.

The first transfer message, in embodiments, may be published by the digital asset exchange computer system 400 to the first blockchain network. In embodiments, the plurality of geographically distributed computer systems in the first blockchain network may implement the instructions to transfer the interest amount of the first digital asset from the first digital address to the second digital address. In embodiments, the published instructions may be verified and/or executed by the plurality of geographically distributed computer systems in the first blockchain network. The executed transactions associated with the first transfer message, in embodiments, may be published by the first plurality of geographically distributed computer systems in the blockchain network.

In embodiments where the digital asset exchange computer system 400 includes the electronic reserve ledger, which may be included in the electronic reserve account ledger database 418, at step S5518, the digital asset exchange computer system may calculate a reserve amount of the first digital asset based on at least one reserve requirement and the interest amount of the first digital asset. In embodiments, the reserve amount is less than the interest amount of the first digital asset. In embodiments, the first transfer message may further include a fourth address associated with a first customer reserve account associated with the first customer. In embodiments, the first transfer message may further include instructions to transfer at least a portion of the interest amount of the first digital asset from the first digital address to the fourth digital address. In embodiments, the first plurality of geographically distributed computer systems in the first blockchain network may implement the instructions to transfer the reserve amount of first digital asset from the first digital address to the fourth digital address.

In another embodiment, the reserve amount may be transferred to the fourth digital address in a separate message from the message to transfer the interest amount of the first digital asset from the first digital address to the second digital address. For example, at step S5518, in embodiments, the digital asset exchange computer system 400 may calculate a reserve amount of the first digital asset based on at least one reserve requirement and the interest amount of the first digital asset. In embodiments, the digital asset exchange computer system 400 may then generate a second transfer message to transfer the reserve amount of the first digital asset from the first customer interest-bearing account to a first customer reserve account. In embodiments, the second transfer message includes the first digital address and a fourth digital address associated with the first customer reserve account associated with the first customer. In embodiments, the second transfer message includes instructions to transfer the reserve amount of the first digital asset from the first digital address to the fourth digital address. In embodiments, the second transfer message may include a second digital signature, which may be associated with the first digital address. In embodiments, the digital asset exchange computer system 400 may publish the second transfer message to the first blockchain network. In embodiments, the first plurality of geographically distributed computer systems in the first blockchain network may implement the instructions to transfer the reserve amount of first digital asset from the first digital address to the fourth digital address. In embodiments, the published instructions may be verified and/or executed by the first plurality of geographically distributed computer systems in the first blockchain network. The executed transactions associated with the second transfer message, in embodiments, may be published by the first plurality of geographically distributed computer systems in the first blockchain network In embodiments, the digital asset exchange or intermediary may be associated with a smart contract including smart contract instructions saved on the blockchain where the smart contract instructions enable decentralized lending of digital assets to one or more users. For example, the digital asset exchange or intermediary may directly or indirectly have access to the private keys associated with the smart contract and/or the smart contract address. In embodiments, the smart contract instructions are associated with a decentralize lending smart contract 5512 and may be saved at a second digital address 5512A. The digital asset exchange computer system 400, in such embodiments, may generate a second message including instructions to transfer at least a portion of the interest amount of the first digital asset from a first digital address associated with a digital exchange private key associated with the first digital asset held by the digital asset exchange on behalf of the respective customer to the second digital address associated with the smart contract. In embodiments, the second digital address may also be associated with a respective customer intermediary account. The second message, in embodiments, may be published by the digital asset exchange computer system 400 to the first blockchain network. In embodiments, the first plurality of geographically distributed computer systems in the first blockchain network may implement the instructions to transfer the interest amount of the first digital asset from the first digital address to the second digital address. The published message, in embodiments, may be verified and/or executed by the first plurality of geographically distributed computer systems in the blockchain network.

In embodiments, the second digital address may be associated with a distributed digital asset transaction ledger 115 (e.g. a blockchain). For example, with reference to FIG. 5A-4, the distributed digital asset transaction ledger 115 (or blockchain) may include the decentralized lending smart contract 5512, which may include a public address 5512A (e.g., the second digital address) and smart contract instructions 5512B. In embodiments, the decentralized lending smart contract public address 5512A may be associated with one or more proxy smart contracts, which may then issue calls to one or more other smart contracts having their own smart contract addresses on the blockchain 6803.

The decentralized lending smart contract instructions 5512B may also include a plurality of instruction modules (e.g., modules 5514-5530), stored as part of the blockchain. In embodiments, the plurality of instruction modules may include processor executable code. In embodiments, the plurality of instruction modules may include compiled code. By way of illustration, in embodiments, such modules may include modules of instructions such as: (1) create tokens module 5514; (2) transfer tokens module 5516; (3) destroy tokens module 5518; (4) redeem tokens module 5520; (5) deposit module 5522; (6) calculate interest module 5524; (7) return module 5526; (8) third-party module 5528; (9) withdrawal module 5530 and/or a combination thereof, to name a few.

In embodiments, the create tokens module 5514 may include one or more instructions related to creating lending tokens associated with decentralized lending. For example, the create tokens module 5514 may include instructions that, when executed, cause the creation of one or more lending tokens that represent the first amount of the first digital asset lent to the decentralized lending smart contract 5512 for third-party lending or trading, in exchange for interest, which may be in the form of a first digital asset. The module 5514 may include further instructions to authorize the creation of the lending tokens under specified conditions, such as in response to the receipt of one or more authorized key pairs or contract addresses. In embodiments, the create tokens module 5514 may include instructions that when executed increase the lending token supply. In embodiments, the create tokens module 5514 may include instructions that when executed create new lending tokens within pre-approved lending token supply limits, create new lending tokens within a pre-approved amount of the lending token supply limits and a predetermined amount of the first digital asset held, and/or assign newly created or "minted" lending tokens to specific designated public addresses or contract addresses on an underlying blockchain associated with the respective customer and/or the digital asset exchange.

In embodiments, the transfer tokens module 5516, may include instructions related to transferring the lending tokens. In embodiments, such transfer instructions when executed apply rules by which certain transfers are allowed or blocked and may specify one or more key pair or contract addresses that may be authorized to perform one or more types of transfer operations. In embodiments, the transfer tokens module 5516 may include authorization instructions related to transferring lending tokens and/or digital assets associated with the lending tokens (e.g., the first digital asset) to specific designated public addresses or contract addresses on the underlying blockchain.

In embodiments, the destroy tokens module 5518 may include instructions related to destroying (e.g., burning) lending tokens. In embodiments, the destroy tokens module 5518 may include instructions related to when, and with what authority, lending tokens associated with one or more specified addresses shall be destroyed or "burned", and thus removed from the lending token supply. In embodiments, lending tokens may be burned or destroyed when they are redeemed by the respective customer and/or the digital asset exchange in exchange for the interest amount of the digital asset. In embodiments, lending tokens may be destroyed upon return of the interest amount of the digital asset and a return amount provided by the intermediary in exchange for lending of the interest amount of digital asset.

In embodiments, the redeem tokens module 5520, may include instructions related to redeeming one or more lending tokens (e.g., the second digital asset) for an amount of digital asset (e.g., the first digital asset). In embodiments, the redeem tokens module 5520 may include instructions that when executed determine a first amount of digital asset to transfer in exchange for redeeming one or more lending tokens. For example, a lending token may be redeemed for the interest amount of the first digital asset. In embodiments, the amount of digital asset to return in exchange for the redemption of one or more lending tokens may be made based on: interest/return information associated with the lending tokens, an amount of digital asset transferred to the decentralized lending smart contract 5512, an amount of time elapsed since the transfer of the amount of digital asset to the decentralized lending smart contract 5512, the types of digital asset transferred to the decentralized lending smart contract 5512, one or more third-party institutions associated with the lending of the amount of the digital asset, one or more reserve rules (e.g., rules stored by the digital asset exchange and/or rules stored on the blockchain as part of the decentralized lending smart contract instructions 5512B), and/or a combination thereof, to name a few. In embodiments, the redeem tokens module 5520 may include instructions that when executed apply when, and with whose authority, lending tokens associated with one or more specified addresses shall be redeemed and, in embodiments, whether the redeemed lending tokens will be destroyed or "burned" as discussed above, and thus removed from the lending token supply. In embodiments, the redeem tokens module 5520 may include authorization instructions related to accessing data supplied by a first authorized third-party database (e.g., an administrator computer system), as discussed in further detail elsewhere.

Further, the deposit module 5522 may include instructions that when executed track and monitor one or more transfers of digital assets to the decentralized lending smart contract 5512. The deposit module 5522, in embodiments, for example, may track the public address(es) associated with each transfer of digital assets to the decentralized lending smart contract 5512, the date of each transfer, the time of each transfer, the amount of each transfer, and/or a combination thereof, to name a few. In embodiments, the deposit module 5522 may include deposit instructions associated with the receipt of digital assets by the decentralized lending smart contract 5512. In embodiments, the deposit module may include instructions or a call that when executed issue one or more lending tokens based on the deposit of the digital assets.

The calculate interest module 5524, in embodiments, may include instructions that when executed calculate interest or a return accrued by the digital assets lent via the decentralized lending smart contract 5512. In embodiments, the calculate interest module 5524 may include instructions that when executed calculate the interest of each deposit of digital assets based on interest information or return information associated with the lending tokens, an amount of digital asset transferred to the decentralized lending smart contract 5512, an amount of time elapsed since the transfer of the amount of digital asset to the decentralized lending smart contract 5512, the types of digital asset transferred to the decentralized lending smart contract 5512, one or more third-party institutions associated with the lending of the amount of the digital asset, one or more reserve rules (e.g., rules stored by the digital asset exchange and/or rules stored on the blockchain as part of the decentralized lending smart contract instructions 5512B), and/or a combination thereof, to name a few.

In embodiments, the return module 5526 may include instructions that when executed calculate and/or authorize payments in exchange for the amount of digital asset transferred and held at the decentralized lending smart contract 5512. For example, the return module 5526 may include authority to access information indicating the type of payment (e.g., one time return and redemption, an interest payment without redemption, payments in accordance with a payment schedule, to name a few). In embodiments, the return module 5526 may communicate with calculate interest module 5524, deposit module 5522, and/or redeem tokens module 5520 to determine the return payment and/or redemption payment. For example, the return module 5526 may confirm the balance of the digital asset and the calculated interest from the deposit module 5522 and the calculate interest module 5524, respectively. In embodiments, the return module 5526 may include return instructions associated with determining a return amount of digital assets to be provided to the first user in exchange for lending the amount of digital assets to the decentralized lending smart contract 5512. In embodiments, the return module 5526 may include return payment instructions associated with transferring a payment amount of the first digital asset to the respective customer interest-bearing account.

In embodiments, the third-party module 5528 may include authorization instructions related to loaning and trading at least a portion of the amount of digital assets held at the fourth contract address by third parties. For example, the third parties may, in embodiments, include third-party institutions associated with a first customer intermediary account associated with the decentralized lending smart contract 5512. In embodiments, the third-party module 5528 may include third-party instructions associated with at least one of: loaning of the at least a portion of the fourth amount of digital assets by third-party institutions associated with the first customer intermediary account and/or trading of the at least a portion of the fourth amount of digital assets by third-party institutions associated with the first customer intermediary account.

In embodiments, the withdrawal module 5530 may include authorization instructions related to withdrawing an amount of digital asset lent to the decentralized lending smart contract 5512. For example, the withdrawal module 5530 may track ownership and custody of digital assets lent to the decentralized lending smart contract 5512. In embodiments, the withdrawal module 5530 may include execution instructions associated with when, and with whose authority, digital assets associated with one or more specified addresses shall be withdrawn. In embodiments, the withdrawal module 5530 may include withdrawal instructions associated with returning the portion of the interest amount of the first digital asset to the respective customer. The withdrawal instructions, in embodiments, may include first return payment instructions associated with returning a return payment amount of the first digital asset to the respective customer interest-bearing account. In embodiments, the amount of digital assets paid under the withdrawal module 5530 may be determined in conjunction with the return module and the calculate interest module.

In embodiments, decentralized lending smart contract instructions 5512B may include authorization instructions. The authorization instructions, in embodiments, may include authorization instructions related to functions associated with decentralized lending. In embodiments, decentralized lending smart contract instructions 5512B may also include instructions that when executed authorize requests received, the requests, in embodiments, being transaction requests from administrators, user public addresses, and/or other smart contracts, to name a few. The decentralized lending smart contract 5512, in embodiments, may include tokens, which may reflect other types of tokens, such as tokens associated with a security, a bond, a financial instrument, a contract, stock, gas tokens, and/or some other kind of token, which the parties to the transaction reflect as an appropriate collateral.

Returning to FIG. 5B, in embodiments, the process may continue with step S5520. At step S5520, in embodiments, the digital asset exchange computer system 400 may determine a first interest payment amount for one or more of the plurality of users/customers (e.g., the first user of the plurality of users, to name a few). In embodiments, the digital asset exchange computer system 400 may determine the first interest payment amount based on respective interest information, an amount of digital asset held in an interest-bearing account, an amount of time the amount of digital asset is held in the customer interest-bearing account, the types of digital asset held in the interest-bearing account, one or more intermediaries, the one or more third-party institutions, an interest amount associated with the customer interest-bearing account balance of the first digital asset, an interest rate and a period of time that the interest amount of the first digital asset is held in the respective customer interest-bearing account, one or more reserve rules, and/or a combination thereof, to name a few. For example, the first interest payment may be an agreed upon percentage of the balance of digital assets in an interest-bearing account over a period of time (e.g., 2% of 10 BTC over 6 months). In embodiments, the first interest payment amount may be an agreed upon amount to be paid after an agreed period of time or multiple periods of time. For example, the first interest payment amount may be a first sum amount of interest (e.g., 2 BTC of interest for 10 BTC principal over 6 months).

In embodiments, more than one interest rate may be utilized by the digital asset exchange computer system 400. For example, the first interest rate may be applied when the interest amount of the first digital asset has been held in the first customer interest-bearing account for a time period that falls within the first period of time. Continuing the example, a second interest rate may be applied when the interest amount of the first digital asset has been held in the first customer interest-bearing account for a time period that falls within the second period of time.

In embodiments, still referring to step S5520, the digital asset exchange computer system may determine the first interest payment amount by calculating a net interest payment. The net interest payment, in embodiments, may be calculated by subtracting the reserve amount based on the digital asset balance from a gross interest payment. The net interest payment, in embodiments, may represent the first interest payment amount. In embodiments, the net interest payment minus fees may be the interest payment amount.

In embodiments, the first interest payment amount may be a first payment of two or more payments associated with the initial transfer of the amount of the first digital asset to a respective customer interest-bearing account. For example, an interest payment may be made to the first user at the end of each month for a year. As another example, an interest payment may be made annually each year the first user has an account balance over 0 in the respective customer interest-bearing account. In embodiments, an interest payment may be made aperiodically. For example, the interest payment may be determined after an account balance of a respective customer interest-bearing account reaches a predetermined amount. As another example, the interest payment amount may be determined and monitored by the digital asset exchange computer system 400. Continuing the example, when the interest payment amount reaches a predetermined amount, the digital asset exchange computer system 400 may distribute the interest payment to the first user.

The one or more users, in embodiments, may have an account balance from a different transfer (e.g., not included with the interest amount of the first digital asset) of the first digital asset (e.g., an interest balance amount of the first digital asset) and/or may have an account balance including a second digital asset (e.g., a second interest amount of the second digital asset). In embodiments, the digital asset exchange computer system 400 may determine a second interest payment amount for the first user based on the account balance of the different transfer. The determination of a second interest payment amount, in embodiments, may be made based on interest information associated with the interest balance amount of the first digital asset held in the respective customer interest-bearing account, interest information associated with the interest balance amount of the second digital asset, respective interest information, an amount of digital asset held in an interest-bearing account, an amount of time the amount of digital asset is held in the interest-bearing account, the types of digital asset held in the interest-bearing account, the one or more third-party institutions, an interest rate and a period of time that the interest balance amount of the first digital asset is held in the respective customer interest-bearing account, one or more reserve rules, and/or a combination thereof, to name a few. In embodiments, the second interest payment amount may be further based on a second interest sum amount. The second interest payment amount, in embodiments, may be the same as the first interest payment amount (e.g., as part of a payment schedule) and/or different than the first interest payment amount. In embodiments, the second interest payment may be further based on a second interest rate and another period of time that the interest balance amount of the first digital asset (or the second digital asset) is held in the first customer interest-bearing account. In embodiments, the second interest payment amount and the first interest payment amount may be combined by the digital asset exchange to form one total interest payment amount. In embodiments, the second interest payment amount may be stored in the second electronic interest account ledger and may be associated with the first customer.

In embodiments, prior to step S5520, the digital asset exchange computer system 400 may determine that the first customer interest-bearing account received a first total return from the first customer intermediary account. The first total return may reflect a payment of interest from the intermediary. In such embodiments, for example, the digital asset exchange computer system 400 may determine the one or more interest payments based on the first return, respective interest information associated with the interest (and/or interest balance) amount of the first (and/or second) digital asset, the types of digital asset held in the interest-bearing account, the one or more third-party institutions, an interest rate and a period of time that the interest amount of the first digital asset is held in the respective customer interest-bearing account, one or more reserve rules, and/or a combination thereof, to name a few. In embodiments, the first (and/or second) interest payment amount is at least a portion of the first total return. In embodiments, one or more interest payment amounts may be determined at one or more predetermined times by the digital asset exchange computer system 400. One or more interest payment amounts, in embodiments, may be determined aperiodically by the digital asset exchange computer system 400.

In embodiments, the one or more returns may be in the following denomination: fiat, the first digital asset, a second digital asset, and/or a combination thereof, to name a few.

In embodiments, the process continues with S5522. At step S5522, in embodiments, the digital asset exchange computer system 400 may store the first interest payment amount in the electronic interest account ledger (e.g., in the exchange interest account database 414). In embodiments where more than one interest payment amount is determined by the digital asset exchange computer system 400, each of the two or more interest payments may be stored by the digital asset exchange computer system in the electronic interest account ledger (e.g., in the exchange interest account database 414). The digital asset exchange computer system 400, in embodiments, may store the one or more interest payment amounts such that the one or more interest payment amounts are associated with the first user. The one or more interest payment amounts, in embodiments may be stored in the exchange interest account database 414, memory operatively connected to the digital asset exchange computer system 400, and/or a combination thereof, to name a few. In embodiments, the first interest payment amount of the first digital asset may be reinvested in the first customer intermediary account such that the first user may collect an additional return based on the increased deposit.

In embodiments, one or more steps S5502 through S5522 may be performed in a different order or omitted. In embodiments, additional steps may be added.

Turning now to FIG. 5C, which may follow FIG. 5B in embodiments, the process may continue with step S5524. At step S5524, in embodiments, the digital asset exchange computer system 400 may confirm receipt of the first interest payment amount at the first digital address. In embodiments, the first intermediary may request to transfer one or more interest payment amounts of the first digital asset from the first customer intermediary account to the first customer interest-bearing account. The digital asset exchange computer system 400, in such embodiments, may generate a transfer message including instructions to transfer one or more interest payment amounts of the first digital asset from the second digital address associated with the first customer intermediary account to the first digital address. This transfer message, in embodiments, may be published by the digital asset exchange computer system 400 to the first blockchain network. In embodiments, the first plurality of geographically distributed computer systems in the first blockchain network may implement the instructions to transfer the one or more interest payment amounts of the first digital asset from the second digital address to the first digital address. The published message, in embodiments, may be verified and/or executed by the first plurality of geographically distributed computer systems in the first blockchain network. In embodiments, the first interest payment amount may be at least a portion of the one or more interest payment amounts. In embodiments, the one or more interest payment amounts may include at least a first interest payment amount, and/or a second interest payment amount. In embodiments, the one or more payments may include an interest payment amount (e.g., all or a portion of the first interest payment amount) in the first digital asset, an interest payment amount (e.g., all or a portion of the first interest payment amount) in the second digital asset a redemption payment of the amount of digital asset transferred to the first customer interest-bearing account (e.g., the second amount of the first digital asset), and/or a combination thereof, to name a few.

In embodiments, the process may continue with step S5526. At step S5526, the digital asset exchange computer system 400 may update the electronic intermediary ledger, which may be included in the exchange intermediary account ledger database 416 to reflect the transfer of the first interest payment amount out of the first customer intermediary account. In embodiments, the process may continue with step S5528. At step S5528, the digital asset exchange computer system 400 may update the electronic interest account ledger, which may be included in the exchange interest account database 414 to reflect receipt of the first interest payment amount into the first customer interest-bearing account. In embodiments, steps S5524, S5526, and S5528 may be performed separately, together, or in any order independent of one another.

In embodiments, the process may continue with step S5530. At step S5530, the digital asset exchange computer system 400 may transfer the first interest payment amount from the first customer interest-bearing account to the first customer digital exchange account. In embodiments, the transferring may include updating the second electronic interest account ledger, which may be included in the exchange interest account database 414 to reflect the transfer of the first interest payment amount out of the first customer interest-bearing account. In embodiments, the transferring may include updating the electronic exchange ledger, which may be included in the exchange digital asset ledger database 410 to reflect receipt of the first interest payment amount of the first digital asset into the first customer digital exchange account. In embodiments, the first customer may be associated with one or more accounts, including two or more customer digital exchange accounts. For example, the first customer may be associated with a first customer digital exchange account and a second customer digital exchange account. In embodiments, the first customer may transfer digital assets from the first customer digital exchange account to the first customer interest-bearing account. At step S5530, continuing the example, in embodiments the digital asset exchange computer system 400 may transfer the first interest payment amount from the first customer interest-bearing account to one or more of the first customer digital exchange account and/or the second customer digital exchange account.

In embodiments, at step S5530, the digital asset exchange computer system 400 may execute the transfer by updating the exchange interest account database 414, the electronic exchange ledger database 410, the exchange fiat ledger database 412, the electronic intermediary ledger database 416, and/or a combination thereof, where applicable, to execute the transfer. For example, if the transfer includes fiat, the first digital asset, and the second digital asset, the digital asset exchange computer system 400 may update the exchange digital asset ledger database 410, the electronic digital asset exchange ledger, and the electronic fiat exchange ledger to execute the transfer in this example. The transfer may be executed, in embodiments, by the digital asset exchange computer system 400 updating the electronic digital asset exchange ledger to reflect receipt of the first interest payment amount of the first digital asset into the first customer digital asset exchange account. In embodiments, step S5530 may include updating the electronic interest account ledger and the electronic digital asset exchange ledger to reflect transfer of the first interest payment amount of the second digital asset from the first customer interest-bearing account to the first customer exchange account.

In embodiments, steps S5520-S5530 may be performed based on a payment schedule. For example, in embodiments, the digital asset exchange computer system 400 may determine when to disburse a first interest payment amount (e.g., a first time) to the first customer. For example, the respective return information associated with the first interest payment amount may include a return payment schedule. The return payment schedule, continuing the example, may include information (e.g., a date and/or time), which indicates when to distribute the first interest payment amount to the digital asset exchange and/or the first customer interest-bearing account. In embodiments, the determination of the first time may be based on a payment schedule, the first interest payment amount (e.g., the amount of the first interest payment), the first total return amount, an amount of time elapsing, user settings, the third-party institution(s), the first intermediary, a second intermediary, the type of digital asset, the amount of digital asset, the amount of interest-bearing accounts associated with the one or more users, and/or a combination thereof, to name a few. In embodiments, the first time may include one or more calendar dates, one or more times, one or more ranges of calendar dates, one or more ranges of time, and/or a combination thereof, to name a few. In embodiments, the return information may indicate that interest payments are to be made periodically or aperiodically. In embodiments, the return payment schedule may indicate that interest payments are to be made periodically or aperiodically. In embodiments, the return information may indicate that interest payments are to be made based on receipt by the respective customer interest-bearing account and/or a return from the respective customer intermediary account. In embodiments, the payment schedule indicates that interest payments are made based on receipt by the respective customer interest-bearing account and/or a return from the respective customer intermediary account.

In embodiments, the return information may indicate that the interest payment(s) are to be made upon a request that is received by the one or more users (and/or someone acting on the one or more user's behalf). For example, to receive the first interest payment amount, the first customer device may generate and send a new request to the digital asset exchange computer system 400. The request, in embodiments, may include a request for an interest payment associated with the first customer interest-bearing account. The digital asset exchange computer system 400 may receive the request (e.g., which may be similar to the description of step S5512) and verify that the first interest payment amount is less than or equal to the second respective interest account balance (e.g., which may be similar to step S5514, the description of which applying herein). This request, in embodiments, may be similar to the first request discussed in connection with FIG. 5A through FIG. 5B and the exemplary first request 5510 (see FIG. 5A-3), the descriptions of each applying herein. In embodiments, as described herein, the digital asset exchange may be associated with the decentralized lending smart contract 5512 (see FIG. 5A-4). In such embodiments, the first interest payment amount (and/or subsequent interest payments) may be made to the decentralized lending smart contract public address 5512A (FIG. 5A-4).

In embodiments, the digital asset exchange may determine a second interest payment amount at a second time based on the payment schedule. The second time, in embodiments, may be associated with the second interest payment amount or a second interest rate. In embodiments, the second time may be determined in a manner similar to the determination of the first time, the description of which applying herein. In embodiments, the timing of the second interest payment amount may be determined by the digital asset exchange computer system 400 when the digital asset exchange computer system is determining the timing of the first interest payment amount (e.g., completed in the same step). In embodiments, the timing of the second interest payment may be determined after the first interest payment amount is transferred to one or more accounts associated with the one or more users. In embodiments, the payment schedule may indicate that the second interest payment amount is to be paid periodically. In embodiments, the payment schedule may indicate that the second interest payment amount is to be paid aperiodically. In embodiments, the payment schedule may indicate that the second interest payment amount is to be paid based on receipt in the first customer interest-bearing account of a return from the first customer intermediary account. In embodiments, the payment schedule may indicate that the second interest payment amount is to be paid upon a request received from the first customer.

In embodiments, the digital asset exchange may transfer the first interest payment amount by generating a third transfer message. The third transfer message, in embodiments, may include instructions to transfer the first interest payment amount of the first digital asset from the first digital address to the third digital address, to transfer the first interest payment amount less an amount (e.g., reserve, and/or fees) of the first digital asset from the first digital address to the third digital address, to transfer the amount of the first digital asset from the first digital address to the fourth digital address, to transfer the amount of the first digital asset from the first digital address to a fifth digital address associated with the digital asset exchange, the first intermediary, a second intermediary, and/or third-party institutions, to name a few, and/or a combination thereof. In embodiments, the third transfer message may include instructions to transfer an amount of the first digital asset including the first interest payment amount of the first digital address from the first digital address to the third digital address. In embodiments, the amount of the first digital asset is the same as the first interest payment amount. In embodiments, the third transfer message may include a third digital signature associated with the first digital address. In embodiments, the amount of the first digital asset includes at least a portion of the first interest payment amount. In embodiments, the amount of the first digital asset includes a second interest payment amount. Continuing the example, the third transfer message, in embodiments, may be published by the digital asset exchange computer system 400 to the first blockchain network. In embodiments, the first plurality of geographically distributed computer systems in the first blockchain network may implement the instructions to transfer the amount of the first digital asset from the first digital address to the third digital address. In embodiments, the published instructions may be verified and/or executed by the first plurality of geographically distributed computer systems in the first blockchain network. The executed transactions associated with the third transfer message, in embodiments, may be published by the first plurality of geographically distributed computer systems in the first blockchain network.

In embodiments, the second digital asset may be maintained on a second distributed public transaction ledger in the form of a second blockchain by a second plurality of geographically distributed computer systems in a second blockchain network. The second distributed public transaction ledger, in embodiments, may be the same as the first distributed public transaction ledger. In embodiments, the second distributed public transaction ledger is different than the first distributed public transaction ledger.

In embodiments, the first interest payment amount may be denominated in the second digital asset. In embodiments, to transfer the first interest payment amount of the second digital asset from the first customer interest-bearing account to the first customer exchange account associated with the first user, the digital asset exchange computer system 400 may generate a fourth transfer message including instructions to transfer the first interest payment amount of the second digital asset from the first digital address to the third digital address. In embodiments, the fourth transfer message may include a fourth digital signature associated with the first digital address. The fourth transfer message, in embodiments, may be published by the digital asset exchange computer system 400 to the second blockchain network. In embodiments, the instructions are implemented by the second plurality of geographically distributed computer systems in the second blockchain network. In embodiments, the published message may be verified and/or executed by the second plurality of geographically distributed computer systems in the second blockchain network. In embodiments, the transferring step S5530 of the first interest payment amount of the second digital asset to the first customer exchange account associated with the first user may include updating the second electronic interest account ledger, which may be included in the exchange interest account database 414 and the electronic exchange ledger to reflect transfer of the first interest payment amount of the second digital asset from the first customer interest-bearing account to the first customer exchange account.

In embodiments, the first interest payment amount may be denominated in both the first digital asset and the second digital asset. In embodiments, the transferring step S5530 of the first interest payment amount from the first customer interest-bearing account to the first customer digital exchange account may include updating the second electronic interest account ledger, which may be included in the exchange interest account database 414 and the first electronic exchange ledger, which may be included in the exchange digital asset ledger database 410 to reflect transfer of a first portion of the first interest payment amount associated with the first digital asset from the first customer interest-bearing account to the first customer exchange account. In embodiments, the transferring may include updating the second electronic interest account ledger, which may be included in the exchange interest account database 414 and the electronic exchange ledger to reflect transfer of a second portion of the first interest payment amount associated with the second digital asset from the first customer interest-bearing account to the first customer exchange account.

In embodiments, transferring step S5530 of the first portion and the second portion of the first interest payment amount may include the digital asset exchange generating a fifth transfer message including instructions to transfer the first portion of the first interest payment amount of the first digital asset from the first digital address to the third digital address and the second portion of the first interest payment of the second digital asset from the first digital address to the third digital address. In embodiments, the fifth transfer message may include a fifth digital signature associated with the first digital address. The fifth transfer message, in embodiments, may be published by the digital asset exchange computer system 400 to the first blockchain network. In embodiments, the fifth transfer message may be published by the digital asset exchange computer system to the second blockchain network. In embodiments, the first plurality of geographically distributed computer systems in the first blockchain network may implement the instructions to transfer the first portion of the first interest payment amount of the first digital asset from the first digital address to the third digital address. In embodiments, the second plurality of geographically distributed computer systems in the second blockchain network may implement the instructions to transfer the second portion of the first interest payment amount of the second digital asset from the first digital address to the third digital address. The instructions associated with the fifth transfer message, in embodiments, may be verified and/or executed by the first plurality of geographically distributed computer systems and the second plurality of geographically distributed computer systems in the first blockchain network and the second blockchain network.

In embodiments, the first interest payment amount may be denominated in a first fiat (the previous descriptions of which applying herein). In embodiments, the transferring (step S5530) of the first interest payment amount from the first customer interest-bearing account to the first customer digital exchange account may include updating the sixth electronic fiat ledger, which may be included in the exchange fiat ledger database 412 (FIG. 5A-4), to include the first interest payment amount of the first fiat in a first customer exchange fiat account associated with the first customer.

In embodiments, as described in connection with FIG. 5A through FIG. 5C, one or more intermediary systems may act as an intermediary between the third-party institutions or otherwise be associated with the third-party institutions and the digital asset exchange. In embodiments, prior to and/or as part of each transfer digital assets to and/or from each respective interest-bearing account, the digital asset exchange computer system 400 may select one or more intermediary accounts from a plurality of intermediary accounts to act as an intermediary between the digital asset exchange and one or more third-party institutions. The digital asset exchange computer system 400 may select one or more intermediary systems based on one or more of the following factors (e.g., selection information): (i) whether the respective intermediary systems are affiliated with one another; (ii) client preference information; (iii) client exclusion information; and/or (iv) an amount of digital asset (first digital asset, second digital asset, and/or combined, to name a few) and/or fiat associated with the respective intermediary (e.g., as compared to a predetermined limit, as compared to other intermediary systems of the plurality of intermediary systems, to name a few), to name a few.

In embodiments, for example, the electronic intermediary ledger (the previous description of which applying herein) may be associated with a second intermediary. In embodiments for example, a second customer intermediary account may be associated with the first customer and the first digital asset held by the second intermediary on behalf of the first customer. In embodiments, the first request in step S5512 may include intermediary selection information identifying at least one of the first intermediary and the second intermediary. In embodiments, as described in connection with FIG. 5A through FIG. 5C, one or more intermediary systems may act as an intermediary between the third-party institutions and the digital asset exchange. In embodiments, prior to and/or as part of each transfer digital assets to and/or from each respective interest-bearing account, the digital asset exchange computer system 400 may select one or more intermediary systems from a plurality of intermediary systems to act as an intermediary between the digital asset exchange and one or more third-party institutions. As noted above, in embodiments, multiple intermediaries may participate in the system.

Following the selection (and/or during the selection process) of the first intermediary, second intermediary, and/or one or more other intermediary systems, at the transferring step S5516, transferring may include transferring the interest amount of the first digital asset from the first customer exchange account to the first interest-bearing account when the intermediary selection information identifies the first intermediary and/or a second customer interest-bearing account associated with the first customer when the intermediary selection information identifies the second intermediary. In embodiments, the digital asset exchange may update the electronic interest account ledger, which may be included in the exchange interest account database 414 to reflect the transfer of the interest amount of the first digital asset from the first customer exchange account to at least one of the first customer interest-bearing account and the second customer interest-bearing account.

At step S5518, the transferring may further include generating a sixth transfer message to transfer at least a second portion of the interest amount of the first digital asset. In embodiments, the sixth transfer message may include the first digital address and a fifth digital address associated with the second customer intermediary account. In embodiments, the sixth transfer message may include instructions to transfer the at least a second portion of the interest amount of the first digital asset from the first digital asset to the fifth digital address. In embodiments, the sixth transfer message may include a sixth digital signature associated with the first digital address. In embodiments, the sixth transfer message may be published by the digital asset exchange computer system 400 to the first blockchain network. In embodiments, the first plurality of geographically distributed computer systems in the first blockchain network may implement the instructions to transfer the at least a second portion of the interest amount of the first digital asset from the first digital address to the fifth digital address. The instructions associated with the sixth transfer message, in embodiments, may be verified and/or executed by the first plurality of geographically distributed computer systems in the first blockchain network. In embodiments, when the second intermediary requests to transfer the first interest payment amount (the process of step S5524 applying herein) to the first customer interest-bearing account, the digital asset exchange computer system 400 may update the seventh electronic intermediary ledger to reflect the transfer of the first interest payment amount out of the second customer intermediary account.

In embodiments, the respective destination account for interest payments may be selected by the digital asset exchange. In embodiments, the selection, for example, may be based on a minimum account balance requirement, a maximum account balance requirement, a minimum amount of transaction requirement, a maximum amount of transaction requirement, user preferences, and/or a combination thereof, to name a few. For example, the digital asset exchange computer system 400 may monitor one or more of the customer exchange interest-bearing accounts to determine whether one or more account balances (e.g., the account balances associated with the first and second respective customer interest-bearing accounts) comply with a minimum account balance requirement by comparing the respective account balance with a predetermined minimum account balance. In embodiments, the digital asset exchange computer system 400 may transfer the first interest payment amount and/or the interest amount of the first digital asset to the first customer interest-bearing account when the first customer interest-bearing account balance is below the predetermined minimum balance (and/or the second customer interest-bearing account when the second customer interest-bearing account balance is below the predetermined minimum balance). Continuing the example, if neither the first or the second respective customer interest-bearing accounts are below the predetermined minimum balance, the digital asset exchange computer system 400 may select either and/or move onto other factors (e.g., maximum account balance, min/max transactions) to select the account. As another example, the digital asset exchange computer system 400 may monitor one or more of the customer exchange interest-bearing accounts to determine whether one or more account balances (e.g., the account balances associated with the first and second respective customer interest-bearing accounts) comply with a maximum account balance requirement by comparing the respective account balance with a predetermined maximum account balance. In embodiments, the digital asset exchange computer system 400 may transfer the first interest payment amount and/or the interest amount of the first digital asset to the second customer interest-bearing account when the first customer interest-bearing account balance is above the predetermined maximum balance (and/or the first customer interest-bearing account when the second customer interest-bearing account balance is above the predetermined maximum balance). Continuing the example, if neither the first or the second respective customer interest-bearing accounts are above the predetermined maximum balance, the digital asset exchange may select either and/or move onto other factors (e.g., min/max transactions) to select the account. In embodiments, the digital asset exchange computer system 400 may select by default either the first or second respective customer interest-bearing account and, if that default account complies with account requirements, the fourth amount of the first digital asset may be transferred to the default account.

In embodiments, one or more of the interest-bearing accounts may be associated with a minimum account balance requirement, a maximum account balance requirement, a minimum amount of transaction requirement, a maximum amount of transaction requirement, and/or a combination thereof, to name a few. For example, the digital asset exchange computer system may monitor one or more of the customer interest-bearing accounts to determine whether one or more account balances complies with a minimum account balance requirement by comparing the respective account balance with a predetermined minimum account balance. In embodiments, the second interest-bearing account may drop below the predetermined minimum account balance. Continuing the example, the balance of the second customer interest-bearing account may be transferred to the first customer interest-bearing account. In embodiments, the digital asset exchange computer system 400 may charge a penalty fee from the first and/or second customer interest-bearing account when the first and/or second customer interest-bearing account balance is below the predetermined minimum account balance. As another example, the digital asset exchange computer system 400 may monitor one or more of the customer interest-bearing accounts to determine whether one or more account balances complies with a maximum account balance requirement by comparing the respective account balance with a predetermined maximum account balance. In embodiments, the first customer interest-bearing account may exceed a predetermined maximum account balance. Continuing the example, the difference between the first customer interest-bearing account balance and the predetermined maximum may be transferred into the second customer interest-bearing account (and/or a third customer interest-bearing account may be created to accommodate the difference).

Referring back to FIG. 5C, which may follow from FIG. 5B in embodiments, as mentioned above in connection with step S5524, the one or more payments may include an interest payment amount (e.g., all or a portion of the first interest payment amount) in the first digital asset, an interest payment amount (e.g., all or a portion of the first interest payment amount) in the second digital asset, a redemption payment of the amount of digital asset transferred to the first customer interest-bearing account (e.g., the second amount of the first digital asset), and/or a combination thereof, to name a few. As another example, referring to FIG. 5D, which may follow FIG. 5B in the alternative, the process may optionally continue with step S5524-2. In embodiments, at step S5524-2, the digital asset exchange computer system 400 may determine a time period (e.g., a calendar date and/or associated time) to disburse a first interest payment amount (e.g., the first time) to the first customer. The time period, in embodiments, may be determined based on an associated payment schedule. For example, the return information associated with the first interest payment amount may include a payment schedule, which indicates the first time as noted above.

In embodiments, the return information may indicate that the interest payment(s) and/or redemption payment(s) are to be made upon a request that is received from the one or more users (and/or someone acting on the one or more user's behalf). For example, to receive the first interest payment amount (including the first redemption payment), the first customer device may generate and send a second request to the digital asset exchange computer system 400. The second request, in embodiments, may include a request for another amount of the first digital asset, which may include an interest payment amount and redemption payment amount associated with the first customer interest-bearing account (e.g., a request for the balance of the first customer interest-bearing account and/or the first interest payment amount). The digital asset exchange computer system 400 may receive the request (e.g., which may be similar to the description of step S5512, the description of which applying herein) and verify that the requested amount of the first digital asset is less than or equal to the interest payment amount and the redemption payment amount (e.g., which may be similar to step S5514, the description of which applying herein). The second request, in embodiments, may be similar to the first request discussed herein in connection with FIG. 5A through FIG. 5B and the exemplary first request 5510 (see FIG. 5A-3), the descriptions of each applying herein. In embodiments, requests for return of the first interest payment amount and/or redemption payment amount (in total or in part) may only be accepted when a predetermined amount of time has elapsed. For example, the generated and sent second request may be verified by the digital asset exchange computer system 400 by first determining whether a predetermined amount of time associated with the first interest payment (and/or redemption payment) has elapsed. If the predetermined amount of time has elapsed, the digital asset exchange may verify the request similar to the verification process in step S5514, the description of which applying herein. In embodiments, if the predetermined amount of time has not elapsed, the digital asset exchange computer system 400 may refuse the request and/or notify the one or more users associated with the second request of the refusal (and/or reasons for said refusal).

In embodiments, the process of FIG. 5D may continue with step S5526-2. At step S5526-2, in embodiments, by the digital asset exchange computer system 400 may update the first interest payment amount of the first digital asset based on a current time period. For example, the first interest payment amount may be based on the amount of time that has elapsed since the one or more users transferred the second amount of the first digital asset into the first customer interest-bearing account. Continuing with the example, the digital asset exchange computer system 400 may update the calculated first interest payment amount to include the interest accrued to the time of the first interest payment amount and/or redemption payment amount.

In embodiments, the process of FIG. 5D may continue with step S5528-2. In embodiments at step S5528-2, the digital asset exchange may transfer the first interest payment amount and the first redemption payment amount (first interest payment amount plus the fourth amount of the first digital asset) from the first customer interest-bearing account to the first customer exchange account associated with the first user (i.e., executing payment of the first interest payment amount and the redemption payment amount). In embodiments, the first customer may be associated with one or more accounts, including two or more customer exchange accounts. For example, the first customer may be associated with a first customer exchange account and a second customer exchange account. In embodiments, the first customer may transfer digital assets from the first customer exchange account to the first customer interest-bearing account. At step S5528-2, continuing the example, in embodiments, the digital asset exchange computer system 400 may transfer the first interest payment amount and the first redemption payment amount from the first customer interest-bearing account to one or more of the first customer exchange account and/or the second customer exchange account.

Still referring to FIG. 5D, at step S5528-2, in embodiments, the digital asset exchange computer system 400 may execute the transfer by updating the second electronic interest account ledger (e.g., of the exchange interest account database 414, to reflect the transfer of the first interest payment amount and the fourth amount of digital asset (e.g., the first redemption payment amount) out of the first customer interest account. In embodiments, the digital asset exchange computer system 400 may update the Exchange interest account database 414, the electronic ledger database, the electronic fiat database, the electronic intermediary ledger database, and/or a combination thereof, where applicable, to execute the transfer. For example, if the transfer includes fiat, the first digital asset, and the second digital asset, the digital asset exchange computer system 400 may update the exchange digital asset ledger database 410, the electronic exchange ledger, and the electronic fiat exchange ledger to execute the transfer in this example. As another example, the first electronic exchange ledger (e.g., the exchange digital asset ledger database 410 (FIG. 5A-1)) may be updated to reflect receipt of the interest amount of the first digital asset and the first interest payment amount in the first customer digital asset exchange account associated with the first customer. The transfer may be executed, in embodiments, by the digital asset exchange computer system 400 updating the electronic digital asset exchange ledger to reflect receipt of the first interest payment amount of the first digital asset and the fourth amount of the first digital asset into the first customer digital asset exchange account. In embodiments, step S5528-2 may include updating the electronic interest account ledger and the electronic digital asset exchange ledger to reflect transfer of the first interest payment amount and/or equivalent value to the interest amount of the first digital asset in the form of the second digital asset from the first customer interest-bearing account to the first customer exchange account. In embodiments, the digital asset exchange computer system 400 may calculate the exchange rate between the first digital asset and the second digital asset.

In embodiments, the digital asset exchange may transfer the first interest payment amount and/or the first redemption payment amount by generating another transfer message. The another transfer message, in embodiments, may include instructions to transfer the first interest payment amount of the first digital asset from the first digital address to the third digital address, to transfer the first interest payment amount less an amount (e.g., reserve, and/or fees) of the first digital asset from the first digital address to the third digital address, to transfer the first redemption payment amount (e.g., the interest amount of the first digital asset) from the first digital address to the third digital address, to transfer the first redemption payment amount less an amount (e.g., reserve, and/or fees) from the first digital address to the third digital address, to transfer the reserve amount of the first digital asset from the first digital address to the fourth digital address, to transfer the fourth amount of the first digital asset and/or the first interest payment amount from the first digital address to a fifth digital address associated with the digital asset exchange, the first intermediary, a second intermediary and/or third-party institutions, to name a few; and/or a combination thereof. In embodiments, the transfer message may include a digital signature associated with the first digital address. Continuing the example, the transfer message, in embodiments, may be published by the digital asset exchange computer system 400 to the first plurality of geographically distributed computer systems in the first blockchain network. In embodiments, the first plurality of geographically distributed computer systems may implement the instructions to transfer the first interest payment amount and the fourth amount of the first digital address from the first digital address to the third digital address. In embodiments, the published instructions may be verified and/or executed by the first plurality of geographically distributed computer systems in the first blockchain network. The executed transactions associated with the eighth transfer message, in embodiments, may be published by the first plurality of geographically distributed computer systems in the first blockchain network.

In embodiments, the first interest payment amount and/or the first redemption payment amount may be in a denomination of: fiat, the first digital asset, a second digital asset, and/or of a combination thereof, to name a few. In embodiments, the second digital asset may be maintained on a second distributed public transaction ledger in the form of a second blockchain a blockchain network by a second plurality of geographically distributed computer systems in a second blockchain network. The second public transaction distributed ledger, in embodiments, may be the same as the first distributed public transaction ledger. In embodiments, the second distributed public transaction ledger is different than the first distributed public transaction ledger.

In embodiments, as described herein, the digital asset exchange may be associated with the decentralized lending smart contract 5512. In embodiments, the first interest payment amount and/or redemption payment amount may be made to the decentralized lending smart contract public address 5512A. In embodiments, to transfer the first interest payment amount from the first customer interest-bearing account to the first customer exchange account associated with the first user, the digital asset exchange computer system 400 may generate a ninth transfer message including instructions to transfer the first interest payment amount and/or the redemption payment amount of the second digital asset from the first digital address to the third digital address. The ninth transfer message, in embodiments, may be published by the digital asset exchange to the second distributed public transaction ledger in the form of the second blockchain. In embodiments, the instructions are executed by the second plurality of geographically distributed computer systems in the second blockchain network. In embodiments, the published message may be verified and/or executed by the second plurality of geographically distributed computer systems in the second blockchain network.

In embodiments, the respective destination account for interest payments and/or redemption payments or the first amount of the first digital asset may be selected by the digital asset exchange, as described in connection with the respective destination account for interest payment above.

In embodiments, the order of the steps of the processes described in connection with FIG. 5A through FIG. 5C may be rearranged and/or one or more of the steps may be omitted.

Recurring Payments

In embodiments, one or more customers of a digital asset exchange (e.g., Digital Asset Exchange 130 illustrated in FIG. 4) may be responsible for one or more recurring payments. A recurring payment, in embodiments, may be one or more charges on a predetermined schedule (e.g., twice a day, once a day, once a week, once a month, and/or once a quarter, to name a few). For example, a first customer may be responsible for a credit card payment once a month. The first customer may, in embodiments, pay one or more of the monthly credit card payments automatically using one or more exchange accounts associated with the digital asset exchange 130 (e.g., interest-bearing customer exchange accounts, customer exchange accounts, customer fiat accounts, and/or a combination thereof, to name a few). In embodiments, the first user may set up one or more recurring payments via an electronic device associated with the first user (e.g., customer's user device 105).

One or more exemplary processes for the set-up and execution of a recurring payment is illustrated in connection with FIG. 7A-1, FIG. 7A-2, FIG. 7A-3, FIG. 7B, FIG. 7C, and FIG. 7C-2. Referring to FIG. 7A-1, a process for the set-up and execution of a recurring payment may, in embodiments, begin at step S7700A, with the digital asset exchange computer system 400 receiving first user access credentials from a first user device (e.g., Customer's User Device 105) associated with a first user. The first user access credentials, in embodiments, may be substantially similar to those provided above with regards to step S5504, and the description of which applying herein.

At step S7700B, in embodiments, the digital asset exchange computer system 400 may authenticate the received first user access credentials. In embodiments, the digital asset exchange may verify the first user access credentials by associating the first user access credentials with at least one of the following: a respective customer digital asset exchange account, a respective customer interest-bearing account, a respective customer reserve account, and/or a combination thereof, to name a few. If verified, in embodiments, the digital asset exchange may grant the first user access in step S7700C-1. In embodiments, if the first user access credentials are not or cannot be authenticated, the digital asset exchange computer system 400 may, at step S7700C-2, prevent access and/or notify the first user (e.g., via a predetermined device, physical address, and/or electronic address, to name a few) of the denied access (e.g., via a notification). In embodiments, the first user access credentials may be similar to user identification data and/or user authentication data described above in connection with FIG. 5A, the description of which applying herein.

In embodiments, the process for the setup and/or execution of recurring payments may begin and/or continue with step S7702 in FIG. 7A-2. At step S7702, in embodiments, a digital asset exchange computer system (e.g., the digital asset exchange computer system 400) may receive a first request to schedule a first automatic payment. The first request, in embodiments, may be from the first user device associated with the first user and include one or more of: a request to set up the first automatic payment, identification information associated with the first user, identification associated with the first user device, and/or a combination thereof, to name a few.

The process, in embodiments, may continue with step S7704. At step S7704, in embodiments, the digital asset exchange computer system 400 may generate first computer-executable instructions to display a first graphical user interface (GUI). The first GUI may include a second request for information indicating a first user account associated with the first user, a payment type, a preliminary payment amount, a payment date, identification associated with the third-party to which the recurring payment is owed (e.g., company name, address, account information associated with the third-party, instructions on how to pay the third-party, to name a few), a time limitation on the recurring payment, third-party information associated with the third-party to which the recurring payment is owed (e.g., company name, address, account information associated with the third-party, instructions on how to pay the third-party, to name a few), third-party account information associated with the first user and the third-party to which the recurring payment is owed (e.g., company name, address, account information associated with the third-party, instructions on how to pay the third-party, to name a few) and/or a combination thereof, to name a few. In embodiments, the second request may prompt responses from the user—for example—by asking for specific information. The specific information, in embodiments, may be supplied when the user chooses an option from a drop-down menu, selects a point on a sliding scale, fills in an answering field, and/or a combination thereof, to name a few. For example, the digital asset exchange may, in response to the first request, generate a response that includes one or more prompts for the user to input information associated with the automatic payment. The automatic payment, in embodiments, may be set up through an API with an automatic payment service associated with the digital asset exchange. The request for information may include a request for identification information associated with a credit card (e.g., name on the card, credit card number, expiration date, CVV number, barcode, and/or a combination thereof, to name a few)—e.g., a credit card associated with the automatic payment and/or a credit card associated with a payment method for the automatic payment, to name a few.

The first user account, in embodiments, may refer to one or more accounts associated with the first user. For example, the first user account may be interest associated with an interest-bearing account associated with the first user and an exchange account associated with the first user. In embodiments, the first user may select a preference as to which accounts to pay with. Continuing the example, the first user may select a preference to pay with interest associated with a particular interest-bearing account associated with the first user, and, if the interest has an insufficient balance, pay with the exchange account associated with the user, and/or if the exchange account associated with the user has an insufficient balance, pay with a fiat account. As another example, the first user account may be one or more interest-bearing accounts (the balance and/or interest accrued) associated with the first user. As another example, the first user account may be one or more exchange accounts (e.g., accounts with a balance of one or more types of digital asset) associated with the first user. As another example, the first user account may be a first public address on the blockchain (associated with the first customer, a second public address on the blockchain associated with the first customer and/or the digital asset exchange, and/or a combination thereof, to name a few.

The preliminary payment amount, in embodiments, may be an amount the user has selected to pay. In embodiments, the preliminary payment amount may be a selected option. For example, the first user may select and/or instruct the digital asset exchange computer system 400 to "make a minimum payment." As another example, the first user may select and/or instruct the digital asset exchange computer system 400 to "pay the full balance." As another example, the first user may select and/or instruct the digital asset exchange computer system 400 to "pay the interest associated with the recurring bill." As another example, the first user may select and/or instruct the digital asset exchange computer system 400 to "pay a percentage of my balance"—inputting and/or selecting a percentage (e.g., 2%, 10%, 20%, 30%, 47%, 73%, 99%, etc.). In embodiments, the preliminary payment amount may be measured in fiat, digital asset, and/or a combination thereof.

The payment date, in embodiments, may refer to: a calendar date (e.g., day, month, and/or year), multiple calendar dates (e.g., the $1^{st}$ of a month and the $15^{th}$ of a month), a specific day(s) of the month (e.g., the $3^{rd}$ Thursday, the $1^{st}$ Monday and $3^{rd}$ Tuesday, the $1^{st}$ and $3^{rd}$ Friday, etc.), a time (e.g., at 4:40 PM, by 5 PM, before 9 AM, to name a few), a time of day (e.g., morning, afternoon, night, etc.), on or before a due date (e.g., a selected option-pay before my due date, pay on my due date, to name a few), a first variable-when the interest accrued in an interest-bearing account reaches a predetermined amount (e.g., the value of the payment, a predetermined amount, a predetermined percentage of the payment, to name a few), a second variable-when the value of one or more balances associated with one or more accounts reaches a predetermined amount (e.g., the value of the payment, a predetermined amount, a predetermined percentage of the payment, to name a few), other variables, and/or a combination thereof, to name a few.

Limitations on the automatic payment, in embodiments, may refer to: payment scheduled for a predetermined amount of time (e.g., 1 week, 1 month, 6 months, 1 year, 5 years, the remainder of a year, the remainder of a month, the remainder of a week, one time automatic payment, pay only on specific days (e.g., pay on November $1^{st}$ and December $4^{th}$), etc.), payment scheduled for a predetermined amount of payments (e.g., 1 payment 3 payments, 10 payments, etc.), and/or a combination thereof, to name a few.

The first computer-executable instructions, in embodiments at step S7706, may be sent by the digital asset exchange computer system 400 to the first user device. In embodiments, the first user device may execute the first computer-executable instructions such that the first GUI is displayed by the first user device. In embodiments, the first computer-executable instructions may be executed by the first user device upon receipt. The first computer-executable instructions, in embodiments, may be executed by the first user device upon an action (e.g., unlocking the first user device, selecting a notification, etc.) by the first user. In embodiments, the first request to schedule the first automatic payment may include information indicating a first user account associated with the first user, a payment type (e.g., digital asset, multiple kinds of digital assets, digital asset and fiat, and/or a combination thereof, to name a few), a preliminary payment amount, a payment date, identification associated with the third-party to which the recurring payment is owed, a time limitation on the recurring payment, third-party information associated with the third-party to which the recurring payment is owed, third-party account information associated with the first user and the third-party to which the recurring payment is owed, and/or a combination thereof, to name a few. In such embodiments, the digital asset exchange computer system 400 may generate and send the first computer-executable instructions prior to receiving the first request. In embodiments, the payment information may include identification information associated with a credit card (e.g., name on the card, credit card number, expiration date, CVV number, barcode, and/or a combination thereof, to name a few)—e.g., a credit card associated with the automatic payment and/or a credit card associated with a payment method for the automatic payment, to name a few.

At step S7708, in embodiments, the digital asset exchange computer system 400 may receive a first response to the second request. The first user device, in embodiments, may generate a first response to the second request (e.g., the first computer-executable instructions). In embodiments, the first user may input and/or select one or more responses to the one or more prompts in the second request. For example, the first response may include any information as described with respect to the first request to schedule, the description of which applying herein, as well as one or more of the following: (a) a first user account associated with the first user; (b) a payment type (e.g., digital asset, multiple kinds of digital assets, digital asset and fiat, and/or a combination thereof, to name a few); (c) a preliminary payment amount; (d) a payment date; (e) identification associated with the third-party to which the recurring payment is owed; (f) a time limitation on the recurring payment; (g) third-party information associated with the third-party to which the recurring payment is owed; (h) third-party account information associated with the first user and the third-party to which the recurring payment is owed; (i) identification information associated with a credit card (e.g., name on the card, credit card number, expiration date, CVV number, barcode, and/or a combination thereof, to name a few) and/or (j) a combination thereof, to name a few. The first user device (and/or another device associated with the first user), may send the first response to the digital asset exchange computer system 400.

The process, in embodiments, may continue with step S7710. At step S7710, in embodiments, the digital asset exchange computer system 400 may verify the first response to the second request. In embodiments, the digital asset exchange computer system 400 may verify the first response by determining whether the first user has sufficient funds to cover the first request (e.g., in the one or more accounts identified by the first user in the first response). For example, the digital asset exchange computer system 400 may confirm that the one or more identified accounts have a combined value equal to or greater than the value associated with the payment amount. In embodiments, the digital asset exchange may verify access credentials associated with the first user to verify the first response. In embodiments, the digital asset exchange computer system 400 may verify the first response by determining whether credit associated with the first user is sufficient. In embodiments, the digital asset exchange computer system 400 may verify the first response adheres to format requirements. For example, the format requirements may require the information associated with the first response was input correctly. As another example, the format requirements may verify the information is sufficient to set up an automatic payment. In embodiments, if the first response cannot be verified, the digital asset exchange computer system 400 may take additional action. For example, in embodiments, the digital asset exchange computer system 400 may decline the automatic payment transaction, request additional information, notify the first user of the reason(s) why the first response was declined, notify the first user of the reason(s) why and/or what additional information is required and/or a combination thereof, to name a few.

The process, in embodiments, may continue with step S7712. At step S7712, in embodiments, the digital asset exchange computer system 400 may determine first automatic payment information associated with the first automatic payment based on the first request, the second request, and/or the first response. The first automatic payment information, in embodiments, may include a portion (and/or all) of the information associated with the first request, the second request, and/or the first response. In embodiments, the first automatic payment information may be generated by extracting information from the first request, the second request, and/or the first response. The first automatic payment information, in embodiments, may be generated by populating data fields (and/or data tables) with data based on the first request, the second request, and/or the first response.

The first automatic payment information, in embodiments at step S7714, may be stored by the digital asset exchange computer system 400 in memory operatively connected to the digital asset exchange computer system. In embodiments, the first automatic payment information may be referenced to monitor, prepare for, and/or execute automatic payments. For example, the digital asset exchange computer system 400 may reference the first automatic payment information to monitor payment dates associated with one or more automatic payments. As another example, the first automatic payment information may be used by the digital asset exchange computer system 400 to populate data fields in a generated transaction.

In embodiments, the digital asset exchange computer system 400 may employ a third-party to monitor payment dates associated with one or more automatic payments, e.g., based on first automatic payment information. In such embodiments, the digital asset exchange computer system 400 may generate and send monitoring information to a third-party computer system associated with the third-party via a network (e.g., network 15, a blockchain network, a combination thereof, to name a few). The monitoring information, in embodiments, may include the first automatic payment information, the first request, the second request, the first response, a public address associated with the first automatic payment information, and/or a combination thereof, to name a few. In embodiments, the third-party computer system may monitor the payment dates of one or more users, and, as payment dates approach, notify the digital asset exchange computer system 400 and/or the first user device of the upcoming automatic payment. The notification, in embodiments, may include one or more of the following: the third-party to which the payment is due, the payment date, the preliminary payment amount, a current payment amount (e.g., where the user has selected a preference-pay the full amount, pay the minimum amount, to name a few), the one or more user accounts that will be used for the automatic payments, current balance(s) associated with the one or more user accounts, and/or a combination thereof.

In embodiments, the digital asset exchange computer system 400 may employ a third-party computer system, which may monitor one or more public addresses associated with the first user, based on e.g., first automatic payment information. If, for example, the balance associated with the one or more public addresses drops below a predetermined amount, the third-party computer system may notify the digital asset exchange computer system 400 and/or the first user device. The predetermined amount, in embodiments, may be one or more of the following: the preliminary payment amount, a current payment amount, a percentage above the preliminary payment amount and/or a current payment amount, a percentage below the preliminary payment amount and/or a current payment amount, an amount above the preliminary payment amount and/or a current payment amount, an amount below the preliminary payment amount and/or a current payment amount, and/or a combination thereof, to name a few. If, for example, one or more balances drop below the predetermined amount, the digital asset exchange computer system 400 may notify the first user, decline the first automatic payment, and/or a combination thereof, to name a few.

The process, in embodiments, may continue with step S7716 of FIG. 7A-3. Referring to FIG. 7A-3, at step S7716, the digital asset exchange computer system 400 may determine a first payment date associated with the first automatic payment indicates the first automatic payment is due. The determination, in embodiments, may be based on one or more of the following: the first automatic payment information, the first response to the second request, the first request, the second request, and/or a combination thereof. In embodiments, the determination may be based on a notification received from a third-party computer system. The notification, in embodiments, may indicate the first automatic payment is due. Step S7716, in embodiments, may be repeated until the first automatic payment is due (e.g., by monitoring the first automatic payment).

An exemplary process for determining when the first automatic payment is due may include step S7716A. At step S7716A, in embodiments, the digital asset exchange computer system 400 may obtain the first automatic payment information associated with the first automatic payment to determine a first payment date associated with the first automatic payment. The first automatic payment date, in embodiments, may be the payment date associated with the first response to the second request. At step S7716B, in embodiments, the digital asset exchange computer system 400 may compare a current date and the first payment date. The comparison, in embodiments, may be to determine the difference between the dates. The difference, in embodiments, may be 0 (e.g., the due date is the current date), may be less than zero (e.g., the due date is before the current date, in other words, it has already past), and/or may be greater than 0 (e.g., the due date is after the current date). In embodiments, an automatic payment may require an amount of time to prepare and/or execute. In such embodiments, the first automatic payment may be "due" before the due date to account for the latency. In embodiments, as noted above with the description of monitoring, the digital asset exchange may repeat steps S7716A and S7716B (e.g., monitor) until the difference between the dates is either zero or is above zero.

The process, in embodiments, may continue with step S7718. In embodiments, at step S7718, the digital asset exchange computer system 400 may determine a first payment amount associated with the first payment date. The first payment amount, in embodiments, may be the preliminary payment amount. The first payment amount may, in embodiments, be measured in the same units as the payment type associated with the first automatic payment. For example, the first payment amount and the payment type may be a first digital asset. In embodiments, the first payment amount may be measured in different units as the payment type associated with the first automatic payment. For example, the first payment amount may be in fiat, and the payment type may be in a first type of digital asset. In embodiments, the first payment amount may be associated with a selection—e.g., pay the minimum, pay the balance, to name a few. In such embodiments, the digital asset exchange may determine the first payment amount by determining a current balance of the account associated with the first user and the third-party to which the first automatic payment is owed. The current balance may be measured in the same units as the payment type associated with the first automatic payment. In embodiments, the current balance may be measured in different units than the payment type associated with the first automatic payment. In embodiments, the determination may be based on a notification received from a third-party computer system. The notification, in embodiments, may indicate the first payment amount.

An exemplary process for determining the first payment amount may include step S7718A. At step S7718A, in embodiments, the digital asset exchange computer system 400 may obtain a first conversion rate of fiat to the type of digital asset. The process may continue with step S7718B. At step S7718B, in embodiments, the digital asset exchange may determine an actual payment amount associated with the first automatic payment. The actual payment amount, in embodiments, may be the preliminary payment amount. In embodiments, the actual payment amount may include fees associated with the first automatic payment. In embodiments, as described above, the first payment amount may be associated with a selection—e.g., pay the minimum, pay the balance, to name a few. In such embodiments, the first actual payment may be determined by the digital asset exchange by determining a current balance of the account associated with the first user and the third-party to which the first automatic payment is owed. The process may continue with step S7718C. At step S7718C, in embodiments, the digital asset exchange may calculate the first payment amount measured in the payment type (e.g., the type of digital asset). The digital asset exchange, in embodiments, may convert the actual payment amount (e.g., measured in fiat) to a second amount (e.g., measured in the type of digital asset associated with the payment type) based on the obtained first conversion rate.

The process, in embodiments, may continue with step S7720. In embodiments, at step S7720, the digital asset exchange computer system 400 may verify that a balance associated with the one or more accounts includes at least the first payment amount. In embodiments, the digital asset exchange computer system 400 may verify that the aforementioned balance is greater than or equal to the first payment amount. For example, if the first payment amount is 1 BITCOIN, the digital asset exchange computer system 400 would verify that one or more accounts associated with the first user includes at least 1 BITCOIN. In embodiments, the balance associated with one or more accounts associated with the first user may be less than the first payment amount. In such embodiments, for example, the digital asset exchange computer system 400 may decline the transaction. Continuing the example, the digital asset exchange computer system 400, in embodiments, may generate and send a notification to the first user device indicating the first automatic payment was declined and/or why the first automatic payment was declined. As another example, the digital asset exchange computer system 400 may partially execute the transaction, utilizing the remaining balance (and/or a predetermined amount of the balance) of the one or more accounts associated with the first user. Continuing the example, the digital asset exchange computer system 400, in embodiments, may generate and send a notification to the first customer device indicating the partially executed transaction and/or why the transaction was partially executed. As another example, the digital asset exchange computer system 400 may partially execute the transaction, utilizing the remaining balance (and/or a predetermined amount of the balance) of the one or more accounts associated with the first user. Continuing the example, the difference between the balance of the one or more accounts and the first payment amount may be made up by balances of one or more additional accounts associated with the first user (e.g., digital asset exchange accounts, fiat exchange accounts, one or more public addresses associated with the first user and/or a combination thereof, to name a few). In embodiments, the digital asset exchange computer system 400 may generate and send a request to the first user device requesting authorization to use the balance of the one or more additional accounts. Continuing the example, the digital asset exchange computer system 400, in embodiments, may generate and send a notification to the first customer device indicating the partially executed transaction and/or the digital assets used to make up the difference. As another example, if the balance of the one or more accounts includes sufficient funds, the digital asset exchange computer system 400 may pay the minimum payment associated with the first automatic payment.

In embodiments, the first payment will be made using digital assets and/or fiat associated with a customer exchange account and/or customer fiat exchange account, respectively. Such embodiments, for example, may continue with step S7722B of FIG. 7B.

At step S7722B, in embodiments, the digital asset exchange computer system 400 sells the first amount of the first type of digital asset for a second amount of fiat. In embodiments, the second amount of fiat may be greater than or equal to the first payment amount. In embodiments, the second amount of fiat may account for one or more fees associated with the first automatic transaction. In embodiments, the digital asset exchange computer system 400 may sell the first amount of the first type of digital asset via a ledger transaction (e.g., using one or more of digital asset electronic ledger 7112, a first fiat currency electronic ledger 7114, and/or a second fiat currency electronic ledger 7116, to name a few). In embodiments, the proceeds from the sale of the first amount of the first type of digital asset may be received by a fiat account associated with the digital asset exchange. The proceeds from the sale, in embodiments, may be received by a fiat account associated with the first user.

In embodiments, the digital asset exchange computer system 400 may sell the first amount of the first type of digital asset via a blockchain transaction. An exemplary process associated with selling the first amount of the first type of digital asset via a blockchain transaction may include step S7722B-1. At step S7722B-1, in embodiments, the digital asset exchange computer system 400 may generate a first transaction request including instructions to transfer a third amount of the first type of digital asset from a first account to a second account. The third amount, in embodiments, may account for an amount of fiat to replenish a liquidity reserve account associated with the digital asset exchange. The third amount, in embodiments, may be an amount greater than or equal to the first amount of the first type of digital asset. In embodiments, the third amount may be an amount equal to one or more automatic payments associated with one or more users associated with the digital asset exchange. The first account, in embodiments, may be a public address on a blockchain associated with the first user. In embodiments, the first account may be a public address on a blockchain associated with the digital asset exchange. In embodiments, the second account may be a public address on a blockchain associated with the digital asset exchange. In embodiments, the second account may be a public address on a blockchain associated with a third-party purchasing the third amount of the first type of digital asset. In embodiments, the transaction request may be digitally signed using a private key associated with the first user. In embodiments, the transaction request may be digitally signed with a private key associated with the digital asset exchange. The process may continue with step S7722B-2 where the digital asset exchange computer system 400, in embodiments, publishes the first transaction request to a blockchain. The publishing of the first transaction request, in embodiments, may result in the execution of the first transaction request, which may result in the third amount of the first type of digital asset being transferred from the first account to the second account. The execution of the transaction request, in embodiments, may result in, at step S7722B-3, the digital asset exchange receiving, at an exchange account associated with the digital asset exchange, the second amount of fiat.

The process, in embodiments, may continue with step S7724B. At step S7724B, in embodiments, the digital asset exchange computer system 400 may transfer a fourth amount of fiat from the exchange account to an account associated with the first user (e.g., one of the one or more accounts from the first automatic payment information). The fourth amount of fiat may be the second amount of fiat. The fourth amount of fiat may be based on a current value of the first type of digital asset (e.g., the third amount of the first type of digital asset may be worth more or less than the second amount of fiat at the time of the sale).

The process, in embodiments, may continue with step S7726B. At step S7726B, the digital asset exchange computer system 400 may execute the first payment in accordance with the first automatic payment information. The first payment may be executed by an automated payment service operatively connected to and/or associated with the digital asset exchange. In embodiments, the first payment may be executed via an ACH payment.

In embodiments, once the first payment is executed, the digital asset exchange computer system 400 may generate a confirmation message indicating execution of the first payment and/or a confirmation number associated with the first payment. The confirmation message, in embodiments, may be sent from the digital asset exchange computer system 400 to the first user device. In embodiments, the first payment may not be executed. In such embodiments, the digital asset exchange computer system 400 may generate a message indicating the failure of the first payment and/or reason(s) for the failure of the first payment). The message, in embodiments, may be from the digital asset exchange computer system 400 to the first user device.

In embodiments, the steps described in connection with FIG. 7A-1, 7A-2, FIG. 7A-3, and FIG. 7B may be performed in a different order or omitted.

Returning to FIG. 7A-3, in embodiments, as described above, the process alternatively may continue from step S7720 with step S7722C of FIG. 7C. Referring to FIG. 7C, in embodiments, at step S7722C, the digital asset exchange computer system 400 may sell the first amount of the first type of digital asset for a fifth amount of fiat. The first amount of the first type of digital asset, in embodiments, may be digital assets associated with a customer interest-bearing account associated with the first user. In embodiments, the first amount may be proceeds from the digital assets associated with the customer interest-bearing account associated with the first user. The fifth amount of fiat, in embodiments, may refer to the second amount of fiat. In embodiments, the fifth amount of fiat may be less than the second amount of fiat. For example, the first payment may be only partially made by proceeds of the customer interest-bearing account. The remaining portion of the first payment, continuing the example, may be made using digital assets held in a customer digital asset account associated with the first user. In embodiments, the fifth amount of fiat may be greater than the second amount of fiat. In embodiments, the fifth amount of fiat may account for fees associated with the first automatic payment and/or an increase in the first payment as compared to the preliminary payment information (raises in the minimum payment, raises in the balance owed, etc.), and may include an amount of the first digital asset to account for a plurality of customers including the first customer, to name a few.

An exemplary process for selling the first amount of the first type of digital asset for a fifth amount of fiat may include step S7722C-1. At step S7722C-1, in embodiments, the digital asset exchange computer system 400 may generate a third request to withdraw a sixth amount of the first type of digital asset. The third request, in embodiments, may include instructions to transfer the sixth amount of the first type of digital asset from a public address on a blockchain and associated with a third-party computer system to a first designated public address on the blockchain associated with the digital asset exchange. In embodiments, the third request may include a digitally signed transaction request (e.g., by a private key associated with the digital asset exchange and/or the first user), including instructions to transfer the sixth amount of the first type of digital asset from the public address associated with a third-party computer system to the first designated public address associated with an intermediary computer system (e.g., associated with the exchange intermediary account ledger database 416) and/or the digital asset exchange. The sixth amount of the first type of digital asset, in embodiments, may refer to the first amount of the first type of digital asset. In embodiments, the sixth amount of the first type of digital asset may be less than the first amount of the first type of digital asset. For example, the first payment may be only partially made by proceeds of the customer interest-bearing account. The remaining portion of the first payment, continuing the example, may be made using digital assets held in a customer digital asset account associated with the first user. In embodiments, the sixth amount of the first type of digital asset may be greater than the first amount of the first type of digital asset. In embodiments, the sixth amount of the first type of digital asset may account for fees associated with the first automatic payment and/or an increase in the first payment as compared to the preliminary payment information (raises in the minimum payment, raises in the balance owed, etc.), and may include an amount of the first digital asset to account for a plurality of customers including the first customer, to name a few.

The process, in embodiments, may continue with step S7722C-2. At step S7722C-2, in embodiments, the digital asset exchange computer system 400 may send the third request to a third-party computer system. The third-party computer system, in embodiments, may refer to a third-party associated with the customer interest-bearing account associated with the first user (e.g., a third-party lender). The request, in embodiments, may also, or alternatively, be, published by the digital asset exchange computer system 400 to a blockchain. In embodiments, the publication of the transaction may result in the sixth amount of the first type of digital asset being transferred from the public address associated with the third-party computer system to the designated public address associated with the intermediary computer system and/or the digital asset exchange computer system 400.

In embodiments, the digital asset exchange computer system 400 may monitor the sent (and/or published) request to determine at step S7722C-3 that the third request was executed by the third-party computer system. In embodiments, the digital asset exchange computer system 400 may monitor the third request by monitoring transactions involving the intermediary computer system. For example, the digital asset exchange computer system 400 may employ a third-party to monitor transactions involving the intermediary computer system. In such embodiments, the digital asset exchange computer system 400 may generate and send monitoring information to a third-party computer system associated with the third-party via a network (e.g., network 15, a blockchain network, a combination thereof). The monitoring information, in embodiments, may include one or more accounts associated with the intermediary computer system, the third request, the third-party computer system, the published transaction request, and/or a combination thereof, to name a few. In embodiments, the third-party computer system may monitor the payment dates of one or more users, and, as payment dates approach, notify the digital asset exchange computer system 400 and/or the first user device of the upcoming automatic payment. The notification, in embodiments, may include the third-party to which the payment is due, the payment date, the preliminary payment amount, a current payment amount (e.g., where the user has selected a preference-pay the full amount, pay the minimum amount, to name a few), the one or more user accounts that will be used for the automatic payments, current balance(s) associated with the one or more user accounts, and/or a combination thereof.

In embodiments, the digital asset exchange may determine the third request was executed by the third-party computer system by determining an intermediate account associated with the first user and the intermediary received a seventh amount of the first type of digital asset. The seventh amount of the first type of digital asset, in embodiments, may refer to the first amount of the first type of digital asset. In embodiments, seventh amount of the first type of digital asset may be less than the first amount of the first type of digital asset. For example, the first payment may be only partially made by proceeds of the customer interest-bearing account. The remaining portion of the first payment, continuing the example, may be made using digital assets held in a customer digital asset account associated with the first user. In embodiments, the seventh amount of the first type of digital asset may be greater than the first amount of the first type of digital asset. In embodiments, the seventh amount of the first type of digital asset may account for fees associated with the first automatic payment, an increase in the first payment as compared to the preliminary payment information (raises in the minimum payment, raises in the balance owed, etc.), may include an amount of the first digital asset to account for a plurality of customers including the first customer, and/or a combination thereof, to name a few.

The process, in embodiments, may continue with step S7722C-4. At step S7722C-4, in embodiments, the digital asset exchange computer system 400 may transfer an eighth amount of the first type of digital asset from the customer intermediate account to an interest-bearing account associated with the first user (e.g., a customer intermediate account associated with the first customer, an intermediary between the digital asset exchange, and/or one or more third-party institutions). The digital asset exchange computer system 400, for example, may transfer the eighth amount of the first digital asset by first updating an electronic ledger (e.g., exchange interest account database 414) to reflect the transfer of the eighth amount of the first type of digital asset into an account associated with the first user (e.g., a customer interest-bearing account, a customer digital asset exchange account, to name a few). As another example, in embodiments, the digital asset exchange computer system 400 may transfer the eighth amount of the first type of digital asset by updating the electronic ledger, which may be included in the exchange interest account database 414 to reflect the transfer of the eighth amount of the first type of digital asset less a reserve amount. The reserve amount transferred to a reserve account associated with the digital asset exchange, continuing the example, may be accounted for by the digital asset exchange computer system 400 updating an additional electronic ledger, which may be included in the exchange intermediary account ledger database 416 (which may be followed by a transfer of the reserve amount into a customer reserve account—e.g., via the electronic reserve account ledger database 418).

In embodiments, the eighth amount of the first digital asset may be sold by the digital asset exchange via a ledger transaction (e.g., using one or more of digital asset electronic ledger, a first fiat currency electronic ledger, and/or a second fiat currency electronic ledger). In embodiments, the proceeds from the sale of the eighth amount of the first type of digital asset (e.g., the second amount fiat) may be received by a fiat account associated with the digital asset exchange. The proceeds from the sale, in embodiments, may be received by a fiat account associated with the first user.

In embodiments, the eighth amount of the first digital asset may be sold by the digital asset exchange via a blockchain transaction. An exemplary process associated with selling the eighth amount of the first type of digital asset via a blockchain transaction may include (and continuing the process described in FIG. 7C) step S7722C-5. At step S7722C-5, in embodiments, the digital asset exchange computer system 400 may generate a second transaction request including instructions to transfer a ninth amount of the first type of digital asset from a first public address to a second public address. The ninth amount, in embodiments may account for an amount of fiat to replenish a liquidity reserve account associated with the digital asset exchange. The ninth amount, in embodiments, may be an amount greater than or equal to the first amount of the first type of digital asset. In embodiments, the ninth amount may be an amount equal to one or more automatic payments associated with one or more users associated with the digital asset exchange. The first public address, in embodiments, may be a public address on a blockchain and associated with the first user. In embodiments, the first public address may be a public address on a blockchain and associated with the digital asset exchange. In embodiments, the second account may be a public address on a blockchain associated with the digital asset exchange. In embodiments, the second public address may be a public address on a blockchain and associated with a third-party purchasing the third amount of the first type of digital asset. In embodiments, the second public address may be a public address on a blockchain and associated with the digital asset exchange. In embodiments, the transaction request may be digitally signed using a private key associated with the first user. In embodiments, the transaction request may be digitally signed with a private key associated with the digital asset exchange.

An exemplary process associated with selling the eighth amount of the first type of digital asset via a blockchain transaction may include step S7722C-5. At step S7722C-5, in embodiments, the digital asset exchange computer system 400 may generate a second transaction request including instructions to transfer a ninth amount of the first type of digital asset from a first public address to a second public address. The ninth amount, in embodiments may account for an amount of fiat to replenish a liquidity reserve account associated with the digital asset exchange. The ninth amount, in embodiments, may be an amount greater than or equal to the first amount of the first type of digital asset. In embodiments, the ninth amount may be an amount equal to one or more automatic payments associated with one or more users associated with the digital asset exchange. The first public address, in embodiments, may be a public address on a blockchain and associated with the first user. In embodiments, the first public address may be a public address on a blockchain and associated with the digital asset exchange. In embodiments, the second account may be a public address on a blockchain associated with the digital asset exchange. In embodiments, the second public address may be a public address on a blockchain and associated with a third-party purchasing the third amount of the first type of digital asset. In embodiments, the second public address may be a public address on a blockchain and associated with the digital asset exchange. In embodiments, the transaction request may be digitally signed using a private key associated with the first user. In embodiments, the transaction request may be digitally signed with a private key associated with the digital asset exchange.

The process may continue with step S7722C-6 where the digital asset exchange computer system 400, in embodiments, publishes the second transaction request to a blockchain. The publishing of the second transaction request, in embodiments, may result in the execution of the second transaction request, which may result in the ninth amount of the first type of digital asset being transferred from the first account to the second account. The execution of the transaction request, in embodiments, may result in, at step S7722C-7, the digital asset exchange receiving, at an exchange account associated with the digital asset exchange, the fifth amount of fiat.

The process, in embodiments, may continue with step S7724C of FIG. 7C-2. Referring to FIG. 7C-2, in embodiments, at step S7724C the digital asset exchange computer system 400 transfers a tenth amount of fiat from the exchange account to a second user account associated with the first user (e.g., a fiat exchange account associated with the first user). The transfer, in embodiments, may be a ledger transaction. The tenth amount of fiat may be the fifth amount of fiat. The tenth amount of fiat may be based on a current value of the first type of digital asset (e.g., the third amount of the first type of digital asset may be worth more or less than the second amount of fiat at the time of the sale). The tenth amount of fiat may be the fifth amount of fiat plus fees required for the first payment. The tenth amount of fiat may be the fifth amount of fiat less fees that are required for the first payment.

The process, in embodiments, may continue with step S7726C. At step S7726C, the digital asset exchange computer system 400 may execute the first payment in accordance with the first automatic payment information. The first payment may be executed by an automated payment service operatively connected to and/or associated with the digital asset exchange. In embodiments, the first payment may be executed via an ACH payment.

In embodiments, once the first payment is executed, the digital asset exchange computer system 400 may generate a confirmation message indicating execution of the first payment and/or a confirmation number associated with the first payment. The confirmation message, in embodiments, may be sent from the digital asset exchange computer system 400 to the first user device. In embodiments, the first payment may not be executed. In such embodiments, the digital asset exchange computer system 400 may generate a message indicating the failure of the first payment and/or reason(s) for the failure of the first payment). The message, in embodiments, may be from the digital asset exchange computer system 400 to the first user device.

The above description regarding charges that are to be paid by automatic payments (e.g., paying a monthly credit card payment) was for exemplary purposes. The one or more charges may, in embodiments, include other forms of charges, such as charges for goods, charges for services, credit card payments, mortgage payments, utilities, charges for fines, charges for charity, transfers to another account associated with the respective customer, transfers to another account associated to a third-party, and/or a combination thereof, to name a few.

In embodiments, one or more steps described in connection with FIG. 7A-1, FIG. 7A-2, FIG. 7A-3, FIG. 7C, and FIG. 7C-2 may be performed in a different order or omitted.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method comprising:

receiving, from a first customer device, a first request to transfer a first amount of a first digital asset from a first customer exchange account associated with a first customer to a first customer interest-bearing account associated with the first customer;

transferring, utilizing a smart contract comprising computer-code configured to execute on multiple nodes of a decentralized computing network representing a blockchain automatically upon satisfaction of a condition, the first amount of the first digital asset from the first customer exchange account to the first customer interest-bearing account, wherein the transferring includes:

updating a first electronic exchange ledger to reflect transfer of the first amount of the first digital asset out of the first customer exchange account;

updating a first electronic interest account ledger to reflect the transfer of the first amount of the first digital asset into the first customer interest-bearing account, wherein the first electronic interest account ledger is associated with the first digital asset and includes, for customers of a digital asset exchange, respective interest-bearing account information associated with a respective customer interest-bearing account; and generating a lending token associated with the first amount of the first digital asset;

generating, by a destroy tokens component, instructions related to destroying the lending token, wherein the instructions indicate when and with what authority lending tokens are to be destroyed, wherein the authority includes an indication that the lending token is to be destroyed upon return of a given interest payment amount in exchange for lending of the digital asset;

transferring, utilizing the smart contract, a second amount of the first digital asset from the first customer interest-bearing account to a customer intermediary account associated with the first customer and the first digital asset held by a first intermediary on behalf of the first customer, wherein the transferring incudes:

updating the first electronic interest account ledger to reflect the transfer of a second amount of the first digital asset out of the first customer interest-bearing account;

generating a first transfer message to transfer at least a portion of the second amount of the first digital asset;

publishing, to a first peer-to-peer network, the first transfer message, wherein computer systems of first geographically distributed computer systems in a first peer-to-peer network implement instructions to transfer at least a portion of the second amount of the first digital asset from a first digital address to a second digital address; and updating an electronic intermediary ledger associated with the first intermediary, wherein the electronic intermediary ledger includes, for customers of the digital asset exchange, first respective intermediary account information associated with a respective customer intermediary account including a third respective digital asset balance indicating a fourth amount of the first digital asset held in the respective customer intermediary account and respective return information, wherein at least two of the first electronic exchange ledger, the first electronic interest account ledger and the electronic intermediary ledger are provided in at least two different databases;

determining a first interest payment amount for the first customer based at least on interest information associated with the digital asset exchange;

storing the first interest payment amount in the first electronic interest account ledger;

confirming receipt of the first interest payment amount at the first digital address;

destroying, utilizing the destroy tokens component and based at least in part on the instructions indicating the authority has been satisfied, the lending token in response to confirming receipt of the first interest payment amount at the first digital address, wherein destroying the lending token improves functioning of the blockchain and increases security of the blockchain;

updating the electronic intermediary ledger to reflect the transfer of the first interest payment amount out of the first customer intermediary account;

updating the first electronic interest account ledger to reflect receipt of the first interest payment amount into the first customer interest-bearing account; and transferring, utilizing the smart contract, the first interest payment amount from the first customer interest-bearing account to the first customer digital exchange account.

2. The method of claim 1, wherein the first customer interest-bearing account is an omnibus account including deposits of the first digital asset associated with the customers of the digital asset exchange.

3. The method of claim 1, wherein at least a portion of the first amount of the first digital asset is loaned to third parties and return information indicates a respective return to be provided to a respective customer for loaning of the at least a portion of the first amount of the first digital asset.

4. The method of claim 1, wherein at least a portion of the first amount of the first digital asset is traded on the digital asset exchange by a third-party associated with the customer intermediary account and respective return information indicates a respective return amount to be provided to a respective customer for trading of the at least a portion of the first amount of the first digital asset.

5. The method of claim 4, wherein the respective return information includes a return payment schedule indicating when disbursements of the respective return amount are to be made to the respective customer.

6. The method of claim 1, wherein the first digital address is associated with an omnibus account associated with a plurality of customers of the digital asset exchange.

7. A system comprising:

one or more processors; and non-transitory computer-readable media storing instructions that, when executed by the one or more processors, cause the one or more processors to perform operations comprising:

receiving, from a first customer device, a first request to transfer a first amount of a first digital asset from a first customer exchange account associated with a first customer to a first customer interest-bearing account associated with the first customer;

transferring, utilizing a smart contract comprising computer-code configured to execute on multiple nodes of a decentralized computing network of a blockchain automatically upon satisfaction of a condition, the first amount of the first digital asset from the first customer exchange account to the first customer interest-bearing account, wherein the transferring includes:

updating a first electronic exchange ledger to reflect transfer of the first amount of the first digital asset out of the first customer exchange account;

updating a first electronic interest account ledger to reflect the transfer of the first amount of the first digital asset into the first customer interest-bearing account, wherein the first electronic interest account ledger is associated with the first digital asset and includes, for customers of a digital asset exchange, respective interest-bearing account information associated with a respective customer interest-bearing account; and generating a lending token associated with the first amount of the first digital asset;

generating, by a destroy tokens component, instructions related to destroying the lending token, wherein the instructions indicate when and with what authority lending tokens are to be destroyed, wherein the authority includes an indication that the lending token is to be destroyed upon return of a given interest payment amount in exchange for lending of the digital asset;

transferring, utilizing the smart contract, a second amount of the first digital asset from the first customer interest-bearing account to a customer intermediary account associated with the first customer and the first digital asset held by a first intermediary on behalf of the first customer, wherein the transferring incudes:

updating the first electronic interest account ledger to reflect the transfer of the second amount of the first digital asset out of the first customer interest-bearing account;

generating a first transfer message to transfer at least a portion of the second amount of the first digital asset;

publishing, to a first peer-to-peer network, the first transfer message, wherein computer systems of first geographically distributed computer systems in a first peer-to-peer network implement instructions to transfer at least a portion of the second amount of the first digital asset from a first digital address to a second digital address; and updating an electronic intermediary ledger associated with the first intermediary, wherein the electronic intermediary ledger includes, for customers of the digital asset exchange, first respective intermediary account information associated with a respective customer intermediary account including a third respective digital asset balance indicating a fourth amount of the first digital asset held in the respective customer intermediary account and respective return information, wherein at least two of the first electronic exchange ledger, the first electronic interest account ledger and the electronic intermediary ledger are provided in at least two different databases;

determining a first interest payment amount for the first customer based at least on interest information associated with the digital asset exchange;

storing the first interest payment amount in the first electronic interest account ledger;

confirming receipt of the first interest payment amount at the first digital address;

destroying, utilizing the destroy tokens component and based at least in part on the instructions indicating the authority has been satisfied, the lending token in response to confirming receipt of the first interest payment amount at the first digital address, wherein destroying the lending token improves functioning of the blockchain and increases security of the blockchain;

updating the electronic intermediary ledger to reflect the transfer of the first interest payment amount out of the first customer intermediary account;

updating the first electronic interest account ledger to reflect receipt of the first interest payment amount into the first customer interest-bearing account; and transferring, utilizing the smart contract, the first interest payment amount from the first customer interest-bearing account to the first customer digital exchange account.

8. The system of claim 7, wherein the first digital address is associated with a segregated account associated with the first customer.

9. The system of claim 7, wherein the second digital address is associated with a smart contract.

10. The system of claim 7, the operations further comprising:

receiving, from the first customer device, an authentication request including first customer credential information associated with the first customer;

determining that the first customer device is authorized to access a digital asset exchange computer system based at least in part on the first customer credential information;

generating first machine-executable instructions including first graphical user interface information associated with a first graphical user interface; and transmitting, to the first customer device, the first machine-executable instructions, wherein, upon execution of the first machine-executable instructions, the first customer device displays a first graphical user interface.

11. The system of claim 7, the operations further comprising determining a second interest payment amount for the first customer based on respective interest information associated with an amount of the first digital asset in the first customer interest-bearing account that does not include the first amount of the first digital asset.

12. The system of claim 11, wherein the second interest payment amount is stored in the first electronic interest account ledger and is associated with the first customer.

13. The system of claim 7, wherein the first interest payment amount is included in the interest information associated with the first customer interest-bearing account associated with the first customer.

14. A method comprising:

receiving, from a first customer device, a first request to transfer a first amount of a first digital asset from a first customer exchange account associated with a first customer to a first customer interest-bearing account associated with the first customer;

updating a first electronic exchange ledger to reflect transfer of the first amount of the first digital asset out of the first customer exchange account;

updating a first electronic interest account ledger to reflect the transfer of the first amount of the first digital asset into the first customer interest-bearing account, wherein the first electronic interest account ledger is associated with the first digital asset and includes, for customers of a digital asset exchange, respective interest-bearing account information associated with a respective customer interest-bearing account;

transferring, utilizing a smart contract comprising computer-code configured to execute on multiple nodes of a decentralized computing network representing a blockchain automatically upon satisfaction of a condition, a second amount of the first digital asset from the first customer interest-bearing account to a customer intermediary account associated with the first customer and the first digital asset held by a first intermediary on behalf of the first customer, wherein the transferring incudes:

updating the first electronic interest account ledger to reflect the transfer of a second amount of the first digital asset out of the first customer interest-bearing account;

generating a first transfer message to transfer at least a portion of the second amount of the first digital asset;

generating a lending token associated with the first amount of the first digital asset;

generating, by a destroy tokens component, instructions related to destroying the lending token, wherein the instructions indicate when and with what authority lending tokens are to be destroyed, wherein the authority includes an indication that the lending token is to be destroyed upon return of a given interest payment amount in exchange for lending of the digital asset;

publishing, to a first peer-to-peer network, the first transfer message, wherein computer systems of first geographically distributed computer systems in a first peer-to-peer network implement instructions to transfer at least a portion of the second amount of the first digital asset from a first digital address to a second digital address; and updating an electronic intermediary ledger associated with a first intermediary, wherein the electronic intermediary ledger includes, for customers of the digital asset exchange, first respective intermediary account information associated with a respective customer intermediary account including a third respective digital asset balance indicating a fourth amount of the first digital asset held in the respective customer intermediary account and respective return information;

determining a first interest payment amount for the first customer based at least on interest information associated with the digital asset exchange, wherein the first interest payment amount is denominated in a second digital asset maintained on a second distributed public transaction ledger by second geographically distributed computer systems in a second peer-to-peer network;

storing the first interest payment amount in the first electronic interest account ledger;

updating the electronic intermediary ledger to reflect the transfer of the first interest payment amount out of the first customer intermediary account;

updating the first electronic interest account ledger to reflect receipt of the first interest payment amount into the first customer interest-bearing account;

destroying, utilizing the destroy tokens component and based at least in part on the instructions indicating the authority has been satisfied, the lending token in response to confirming receipt of the first interest payment amount at the first customer interest-bearing account, wherein destroying the lending token improves functioning of the blockchain and increases security of the blockchain; and transferring, utilizing the smart contract, the first interest payment amount from the first customer interest-bearing account to the first customer digital exchange account.

15. The method of claim 14, wherein a payment schedule indicates that interest payments are to be made based on receipt, by the first customer interest-bearing account, of a return from the first customer intermediary account.

16. The method of claim 14, further comprising:

generating a second transfer message including instructions to transfer a third amount of the first digital asset including the first interest payment amount from the first digital address to a third digital address associated with the first customer and a first digital signature associated with the first digital address; and publishing, to the first peer-to-peer network, the second transfer message, wherein computer systems of the geographically distributed computer systems implements instructions to transfer the third amount of the first digital asset from the first digital address to the third digital address.

17. The method of claim 14, wherein a second customer intermediary account is associated with the first customer and the first digital asset is held by a second intermediary on behalf of the first customer.

18. The method of claim 17, wherein the first request includes intermediary selection information identifying at least one of the first intermediary and the second intermediary.

* * * * *